(12) United States Patent
Rajagopalan et al.

(10) Patent No.: US 11,458,571 B2
(45) Date of Patent: Oct. 4, 2022

(54) SYSTEMS AND METHODS FOR USE IN WELDING PIPE SEGMENTS OF A PIPELINE

(71) Applicant: CRC-EVANS PIPELINE INTERNATIONAL, INC., Houston, TX (US)

(72) Inventors: Shankar Rajagopalan, Cypress, TX (US); Siddharth Mallick, Spring, TX (US); Brian L. Kirk, Kingwood, TX (US)

(73) Assignee: CRC-EVANS PIPELINE INTERNATIONAL, INC., Houston, TX (US)

( * ) Notice: Subject to any disclaimer, the term of this patent is extended or adjusted under 35 U.S.C. 154(b) by 516 days.

(21) Appl. No.: 15/632,061

(22) Filed: Jun. 23, 2017

(65) Prior Publication Data

US 2018/0001422 A1 Jan. 4, 2018

Related U.S. Application Data

(60) Provisional application No. 62/357,811, filed on Jul. 1, 2016.

(51) Int. Cl.
*B23K 26/282* (2014.01)
*B23K 9/23* (2006.01)
(Continued)

(52) U.S. Cl.
CPC .......... *B23K 26/282* (2015.10); *B23K 9/0026* (2013.01); *B23K 9/0282* (2013.01);
(Continued)

(58) Field of Classification Search
CPC ... B23K 26/282; B23K 26/044; B23K 9/0026
(Continued)

(56) References Cited

U.S. PATENT DOCUMENTS 1,693,064 A 11/1928 Tipton
1,846,470 A 2/1932 Burnish
(Continued)

FOREIGN PATENT DOCUMENTS

CA 1051979 4/1979
CA 1060488 8/1979
(Continued)

OTHER PUBLICATIONS

Second Office Action issued in corresponding Chinese Patent Application No. 201580080511.1, dated Aug. 26, 2019.
(Continued)

*Primary Examiner* — Tu B Hoang
*Assistant Examiner* — Thomas J Ward
(74) *Attorney, Agent, or Firm* — Pillsbury Winthrop Shaw Pittman LLP

(57) ABSTRACT

A system for welding two pipes includes a first pipe clamp, a second pipe clamp, a weld torch, an inspection detector, a motor, one or more processors, and a grinder. The weld torch is configured to create a weld joint between the pipes at an interface region between the pipes. The inspection detector is configured to emit an inspection beam of radiation. The motor is operatively associated with the inspection detector to direct the inspection beam of radiation along the weld joint between the pipes. The one or more processors are operatively associated with the inspection detector to determine a profile of the weld joint between the pipes. The grinder is configured to grind at least a portion of the weld joint between the pipes based on the profile of the weld joint between the pipes.

13 Claims, 57 Drawing Sheets

(51) Int. Cl.

| | |
|---|---|
| *B23K 37/02* | (2006.01) |
| *B23K 9/00* | (2006.01) |
| *B23K 9/028* | (2006.01) |
| *B23K 26/044* | (2014.01) |
| *B23K 9/095* | (2006.01) |
| *B23K 9/127* | (2006.01) |
| *B23K 37/053* | (2006.01) |
| *B23K 101/10* | (2006.01) |
| *B23K 103/04* | (2006.01) |
| *B23K 101/06* | (2006.01) |

(52) U.S. Cl.
CPC .......... *B23K 9/0286* (2013.01); *B23K 9/0956* (2013.01); *B23K 9/1274* (2013.01); *B23K 9/23* (2013.01); *B23K 26/044* (2015.10); *B23K 37/0217* (2013.01); *B23K 37/0276* (2013.01); *B23K 37/0282* (2013.01); *B23K 37/0533* (2013.01); *B23K 2101/06* (2018.08); *B23K 2101/10* (2018.08); *B23K 2103/04* (2018.08); *B23K 2103/05* (2018.08)

(58) Field of Classification Search
USPC .......... 219/44.5, 59.1, 125.1, 137.31; 228/29
See application file for complete search history.

(56) References Cited

U.S. PATENT DOCUMENTS

| | | |
|---|---|---|
| 2,037,962 A | 4/1936 | Brown |
| 2,259,367 A | 10/1941 | Ely |
| 2,308,340 A | 1/1943 | Newlon |
| 2,400,737 A | 5/1946 | Brown, Jr. |
| 2,417,881 A | 3/1947 | Munger |
| 2,780,194 A | 2/1957 | Croswell |
| 2,816,208 A | 12/1957 | Stewart |
| 2,833,910 A | 5/1958 | Stanton |
| 2,887,972 A | 5/1959 | Handley |
| 2,936,517 A | 5/1960 | Brown, Jr. |
| 3,008,037 A | 11/1961 | Harmes |
| 3,009,048 A | 11/1961 | Stanley |
| 3,009,049 A | 11/1961 | Stanley |
| 3,016,856 A | 1/1962 | Cummings |
| 3,044,431 A | 7/1962 | Cummings |
| 3,080,269 A | 3/1963 | Pollock |
| 3,110,277 A | 11/1963 | Dixon |
| 3,164,712 A | 1/1965 | Paton et al. |
| 3,194,466 A | 7/1965 | Davis |
| 3,209,115 A | 9/1965 | Iperen |
| 3,261,529 A | 7/1966 | Pagan |
| 3,369,725 A | 2/1968 | Thomas |
| 3,379,853 A | 4/1968 | Domizi |
| 3,424,887 A | 1/1969 | Fehlman |
| 3,425,455 A | 2/1969 | Kilpert |
| 3,461,264 A | 8/1969 | Nelson et al. |
| 3,508,433 A | 4/1970 | Bustin |
| 3,534,199 A | 10/1970 | Downey et al. |
| 3,539,915 A | 11/1970 | Walters et al. |
| 3,551,636 A | 12/1970 | Nelson |
| 3,561,320 A | 2/1971 | Nelson |
| 3,581,049 A | 5/1971 | Creith |
| 3,611,541 A | 10/1971 | Garrett |
| 3,612,808 A | 10/1971 | Nelson et al. |
| 3,633,813 A | 1/1972 | Looney |
| 3,645,105 A | 2/1972 | Nolan. , Jr. |
| 3,646,309 A | 2/1972 | Smith, Jr. et al. |
| 3,668,359 A | 6/1972 | Emmerson |
| 3,681,560 A | 8/1972 | Stanley |
| 3,727,025 A | 4/1973 | Dibenedetto |
| 3,741,457 A | 6/1973 | Gwin |
| 3,748,426 A | 7/1973 | Stanley |
| 3,750,451 A | 8/1973 | Nolan |
| 3,761,005 A | 9/1973 | Baxter et al. |
| 3,764,056 A | 10/1973 | Edwards et al. |
| 3,765,665 A | 10/1973 | Work |
| 3,806,694 A | 4/1974 | Randolph |
| 3,841,547 A | 10/1974 | Bartley |
| 3,857,162 A | 12/1974 | Hoffmann |
| 3,895,209 A | 7/1975 | Moriki |
| 3,904,845 A | 9/1975 | Minkiewicz |
| 3,920,171 A | 11/1975 | Clavin |
| 3,922,517 A | 11/1975 | Nelson |
| 3,961,741 A | 6/1976 | Klein |
| 3,974,356 A | 8/1976 | Nelson et al. |
| 3,979,041 A | 9/1976 | Kaneyama et al. |
| 3,992,818 A | 11/1976 | Clausen |
| 4,019,016 A | 4/1977 | Friedman et al. |
| 4,039,115 A | 8/1977 | Randolph et al. |
| 4,084,739 A | 4/1978 | Koltz |
| 4,092,950 A | 6/1978 | Hart |
| 4,101,067 A | 7/1978 | Sloan |
| 4,144,992 A * | 3/1979 | Omae .................. B23K 9/0286 219/125.11 |
| 4,145,593 A | 3/1979 | Merrick |
| 4,145,594 A | 3/1979 | Koshiga |
| 4,152,568 A | 5/1979 | Yamaguchi |
| 4,213,345 A | 7/1980 | Dufour |
| 4,215,809 A | 8/1980 | Davis |
| 4,218,604 A | 8/1980 | Masaoka |
| 4,223,197 A | 9/1980 | Imai et al. |
| 4,253,599 A | 3/1981 | Slavens |
| 4,273,985 A | 6/1981 | Paton et al. |
| 4,283,617 A | 8/1981 | Merrick et al. |
| 4,285,460 A | 8/1981 | Clavin |
| 4,306,134 A | 12/1981 | Slavens |
| 4,310,737 A | 1/1982 | Paton |
| 4,340,163 A | 7/1982 | Romashov |
| 4,360,961 A | 11/1982 | Chlebowski |
| 4,380,696 A | 4/1983 | Masaki |
| 4,416,409 A | 11/1983 | Muller |
| 4,436,974 A | 3/1984 | Lebedev |
| 4,436,987 A | 3/1984 | Thalmann |
| 4,443,677 A | 4/1984 | Desaw |
| 4,483,106 A * | 11/1984 | Wachs .................... B24B 23/08 451/310 |
| 4,491,718 A | 1/1985 | Cook et al. |
| 4,500,764 A | 2/1985 | Girodi |
| 4,504,047 A | 3/1985 | Jantzen |
| 4,531,192 A | 7/1985 | Cook |
| 4,542,276 A | 9/1985 | Van Den Berg |
| 4,565,003 A | 1/1986 | McLeod |
| 4,573,666 A | 3/1986 | Nomura et al. |
| 4,575,611 A | 3/1986 | Bertossa |
| 4,582,241 A | 4/1986 | Johnson |
| 4,634,040 A | 1/1987 | Savard |
| 4,638,984 A | 1/1987 | Puisais et al. |
| 4,666,138 A | 5/1987 | Dearman |
| 4,667,936 A | 5/1987 | Hale, Jr. |
| 4,712,720 A | 12/1987 | Tesch |
| 4,715,809 A | 12/1987 | Langhoff et al. |
| 4,716,271 A | 12/1987 | Hulsizer |
| 4,750,662 A | 6/1988 | Kagimoto |
| 4,831,233 A | 5/1989 | Gordon |
| 4,838,477 A | 6/1989 | Roach et al. |
| 4,839,495 A | 6/1989 | Kitera |
| 4,851,639 A | 7/1989 | Sugitani |
| 4,927,091 A | 5/1990 | Weiss et al. |
| 4,959,523 A | 9/1990 | Fihey et al. |
| 5,097,110 A | 3/1992 | Hamada |
| 5,107,387 A | 4/1992 | Orton |
| 5,136,452 A | 8/1992 | Orton |
| 5,148,000 A | 9/1992 | Tews |
| 5,165,160 A | 11/1992 | Poncelet |
| 5,227,601 A | 7/1993 | Black |
| 5,235,152 A | 8/1993 | Jankus |
| 5,288,005 A | 2/1994 | Beakley |
| 5,288,963 A | 2/1994 | Jusionis |
| 5,343,016 A | 8/1994 | Davis et al. |
| 5,435,478 A | 7/1995 | Wood et al. |
| 5,435,479 A | 7/1995 | Puzey et al. |
| 5,474,225 A | 12/1995 | Geier et al. |
| 5,481,085 A | 1/1996 | Kovacevic et al. |
| 5,593,605 A | 1/1997 | Jones |
| 5,601,225 A | 2/1997 | Wood et al. |

(56) References Cited

U.S. PATENT DOCUMENTS

| | | | |
|---|---|---|---|
| 5,667,706 A | 9/1997 | Pirl | |
| 5,669,547 A | 9/1997 | Spring | |
| 5,685,996 A | 11/1997 | Ricci | |
| 5,685,999 A | 11/1997 | Wiedemann et al. | |
| 5,706,863 A | 1/1998 | Matherne et al. | |
| 5,728,992 A | 3/1998 | Swidwa | |
| 5,738,725 A | 4/1998 | Bernstein | |
| 5,796,069 A | 8/1998 | Jones et al. | |
| 5,816,479 A | 10/1998 | Matherne et al. | |
| 5,837,966 A | 11/1998 | Timmons, Jr. | |
| 5,865,430 A | 2/1999 | Conover et al. | |
| 5,925,268 A | 7/1999 | Britnell | |
| 6,022,506 A | 2/2000 | Simmons | |
| 6,027,007 A | 2/2000 | Bosio | |
| 6,044,769 A | 4/2000 | Oka et al. | |
| 6,051,803 A | 4/2000 | Hale, Jr. | |
| 6,075,220 A | 6/2000 | Essien et al. | |
| 6,084,203 A | 7/2000 | Bonigen | |
| 6,098,866 A | 8/2000 | Tsuchiya et al. | |
| 6,109,503 A | 8/2000 | Parker | |
| 6,188,041 B1 | 2/2001 | Kim et al. | |
| 6,220,498 B1 | 4/2001 | Gordon et al. | |
| 6,230,072 B1 | 5/2001 | Powell et al. | |
| 6,290,786 B1 | 9/2001 | Brown | |
| 6,325,277 B1 | 12/2001 | Collie | |
| 6,333,699 B1 | 12/2001 | Zierolf | |
| 6,417,488 B1 | 7/2002 | Takeuchi et al. | |
| 6,450,392 B1 | 9/2002 | Nakamura | |
| 6,515,251 B1 | 2/2003 | Wind | |
| 6,583,386 B1 | 6/2003 | Ivkovich | |
| 6,596,961 B2 | 7/2003 | Ehlers et al. | |
| 6,605,800 B1 | 8/2003 | Schick et al. | |
| 6,752,175 B1 | 6/2004 | Willschuetz et al. | |
| 6,759,968 B2 | 7/2004 | Zierolf | |
| 6,840,433 B2 | 1/2005 | Vermaat | |
| 6,850,161 B1 | 2/2005 | Elliott et al. | |
| 6,909,066 B2 | 6/2005 | Zheng et al. | |
| 6,917,176 B2 | 7/2005 | Schempf et al. | |
| 6,924,452 B2 * | 8/2005 | Kimura | B23K 9/1274 219/61 |
| 6,926,069 B1 | 8/2005 | Roffelsen | |
| 7,014,100 B2 | 3/2006 | Zierolf | |
| 7,032,809 B1 | 4/2006 | Hopkins | |
| 7,091,447 B2 | 8/2006 | Kim | |
| 7,114,881 B2 | 10/2006 | Belloni | |
| 7,159,654 B2 | 1/2007 | Ellison et al. | |
| 7,182,025 B2 | 2/2007 | Ghorbel et al. | |
| 7,205,503 B2 | 4/2007 | Reynolds et al. | |
| 7,277,014 B1 | 10/2007 | Waterhouse et al. | |
| 7,282,663 B2 | 10/2007 | Alford | |
| 7,474,221 B2 | 1/2009 | Den Boer et al. | |
| 7,484,625 B2 | 2/2009 | Scott et al. | |
| 7,510,218 B2 | 3/2009 | Holdren | |
| 7,540,401 B2 | 6/2009 | Vermaat | |
| 7,577,285 B2 | 8/2009 | Schwarz et al. | |
| 7,657,082 B2 | 2/2010 | Kubo et al. | |
| 7,661,574 B1 | 2/2010 | McGushion | |
| 7,675,422 B2 | 3/2010 | Stevens et al. | |
| 7,677,439 B2 | 3/2010 | Zierolf | |
| 7,688,210 B2 | 3/2010 | Staff | |
| 7,713,000 B2 | 5/2010 | Verkuijl et al. | |
| 7,774,917 B2 | 8/2010 | Anderson | |
| 7,780,065 B2 | 8/2010 | Vermaat | |
| 7,798,023 B1 | 9/2010 | Hoyt et al. | |
| 7,802,714 B1 | 9/2010 | Kuchuk-Yatsenko et al. | |
| 7,915,561 B2 | 3/2011 | Kossowan | |
| 7,966,860 B2 | 6/2011 | Dijkstra | |
| 8,016,037 B2 | 9/2011 | Bloom et al. | |
| 8,091,775 B2 | 1/2012 | Zierolf | |
| 8,115,138 B2 | 2/2012 | Jacovetty et al. | |
| 8,205,503 B2 | 6/2012 | Cox | |
| 8,313,016 B2 | 11/2012 | Dagenais | |
| 8,328,071 B2 * | 12/2012 | LaValley | B26D 3/16 228/49.3 |
| 8,350,184 B2 | 1/2013 | Behr et al. | |
| 8,353,443 B2 | 1/2013 | Sugiyama et al. | |
| 8,378,841 B2 | 2/2013 | Stevens et al. | |
| 8,389,902 B2 | 3/2013 | McKinley | |
| 8,534,530 B2 | 9/2013 | Biggs | |
| 8,590,769 B2 | 11/2013 | Lavalley et al. | |
| 8,658,941 B2 | 2/2014 | Albrecht | |
| 8,689,836 B2 | 4/2014 | Hudson | |
| 8,695,198 B2 | 4/2014 | Dagenais | |
| 8,714,433 B1 | 5/2014 | Snead et al. | |
| 8,777,201 B2 | 7/2014 | Dagenais | |
| 8,777,482 B2 | 7/2014 | Pfitzner et al. | |
| 8,782,863 B2 | 7/2014 | Pfeiffer | |
| 8,800,575 B2 * | 8/2014 | Angel | E21B 17/085 134/199 |
| 8,857,700 B2 | 10/2014 | Jackson | |
| 8,864,012 B2 | 10/2014 | Bonelli | |
| 8,955,733 B2 | 2/2015 | Vanderpol et al. | |
| 8,973,244 B2 * | 3/2015 | LaValley | F16L 1/06 29/468 |
| 9,030,324 B2 | 5/2015 | Christiansen et al. | |
| 9,038,670 B2 | 5/2015 | Vinoy | |
| 9,183,222 B2 | 11/2015 | Gale et al. | |
| 9,304,204 B2 | 4/2016 | Krauhausen et al. | |
| 9,821,415 B2 | 11/2017 | Rajagopalan | |
| 2001/0015349 A1 | 8/2001 | Belloni | |
| 2001/0017292 A1 | 8/2001 | Belloni | |
| 2002/0125295 A1 | 9/2002 | Mudge | |
| 2003/0188589 A1 | 10/2003 | Harthorn et al. | |
| 2004/0009042 A1 | 1/2004 | Belloni | |
| 2004/0032597 A1 | 2/2004 | Esmiller | |
| 2004/0099713 A1 | 5/2004 | Laing | |
| 2004/0134970 A1 | 7/2004 | Den Boer | |
| 2005/0087586 A1 | 4/2005 | Vermaat | |
| 2005/0103766 A1 | 5/2005 | Iizuka et al. | |
| 2005/0247686 A1 | 11/2005 | Child | |
| 2006/0070987 A1 | 4/2006 | Daniel | |
| 2007/0000972 A1 | 1/2007 | Koga | |
| 2007/0023185 A1 | 2/2007 | Hall et al. | |
| 2007/0023479 A1 | 2/2007 | Koppert | |
| 2007/0145129 A1 | 6/2007 | Perkin et al. | |
| 2007/0210047 A1 | 9/2007 | Child | |
| 2007/0256288 A1 | 11/2007 | Vermaat | |
| 2008/0237308 A1 | 10/2008 | Den Boer | |
| 2009/0019783 A1 | 1/2009 | Amano | |
| 2009/0078742 A1 | 3/2009 | Pasquali | |
| 2009/0212024 A1 | 8/2009 | Muller | |
| 2009/0230120 A1 | 9/2009 | Yang | |
| 2009/0307891 A1 | 12/2009 | Offer | |
| 2010/0051672 A1 | 3/2010 | Nunnery | |
| 2010/0065614 A1 | 3/2010 | Cittadini Bellini | |
| 2010/0126968 A1 | 5/2010 | Page | |
| 2010/0143041 A1 | 6/2010 | Bregonzio | |
| 2010/0230953 A1 | 9/2010 | Baylot | |
| 2010/0254687 A1 | 10/2010 | George | |
| 2011/0107571 A1 | 5/2011 | Kerdiles | |
| 2011/0192569 A1 | 8/2011 | McKinley | |
| 2011/0198316 A1 | 8/2011 | Legori et al. | |
| 2011/0248072 A1 | 10/2011 | Leiden | |
| 2011/0296923 A1 | 12/2011 | Cataldo | |
| 2011/0297316 A1 | 12/2011 | Jackson et al. | |
| 2012/0031878 A1 | 2/2012 | Rukavina Mikusic | |
| 2012/0061452 A1 | 3/2012 | Wolstenholme | |
| 2012/0074631 A1 | 3/2012 | Dagenais | |
| 2012/0111837 A1 | 5/2012 | Al-Mostaneer | |
| 2012/0126008 A1 | 5/2012 | Binmore | |
| 2012/0174372 A1 | 7/2012 | Dagenais | |
| 2012/0177165 A1 | 7/2012 | Kawase | |
| 2012/0187096 A1 | 7/2012 | Schmid et al. | |
| 2012/0201348 A1 | 8/2012 | Knight et al. | |
| 2012/0213937 A1 | 8/2012 | Lavalley et al. | |
| 2012/0215354 A1 | 8/2012 | Krasny et al. | |
| 2012/0231168 A1 | 9/2012 | Leiden | |
| 2012/0257042 A1 | 10/2012 | McKaigue et al. | |
| 2012/0297652 A1 | 11/2012 | Halvorsen | |
| 2013/0008548 A1 | 1/2013 | Bowers | |
| 2013/0026148 A1 | 1/2013 | Aoyama et al. | |
| 2013/0048619 A1 | 2/2013 | Doyle et al. | |
| 2013/0075380 A1 | 3/2013 | Albrech et al. | |
| 2013/0112677 A1 | 5/2013 | Christopher et al. |

(56) References Cited

U.S. PATENT DOCUMENTS

| | | |
|---|---|---|
| 2013/0119037 A1 | 5/2013 | Daniel |
| 2013/0126497 A1 | 5/2013 | Miller |
| 2013/0126503 A1 | 5/2013 | McKinley |
| 2013/0136540 A1 | 5/2013 | Jones |
| 2013/0200057 A1 | 8/2013 | Miller |
| 2013/0292362 A1 | 11/2013 | Fairchild |
| 2013/0306710 A1 | 11/2013 | Kim |
| 2014/0001166 A1 | 1/2014 | Peters et al. |
| 2014/0006227 A1 | 1/2014 | Griggs et al. |
| 2014/0042207 A1 | 2/2014 | Lavalley et al. |
| 2014/0091129 A1 | 4/2014 | Peters et al. |
| 2014/0107947 A1 | 4/2014 | Papadimitriou et al. |
| 2014/0131333 A1 | 5/2014 | Zhang |
| 2014/0137389 A1 | 5/2014 | Dagenais |
| 2014/0191904 A1 | 7/2014 | Illerhaus |
| 2014/0217154 A1 | 8/2014 | Obaditch |
| 2014/0253263 A1 | 9/2014 | Federmann |
| 2014/0266009 A1 | 9/2014 | Comello et al. |
| 2014/0294285 A1 | 10/2014 | Duckworth et al. |
| 2014/0306445 A1 | 10/2014 | Boyd |
| 2014/0346163 A1 | 11/2014 | Rajagopalan et al. |
| 2015/0034629 A1 | 2/2015 | Sherrill et al. |
| 2015/0044320 A1 | 2/2015 | George |
| 2015/0083785 A1 | 3/2015 | Park |
| 2015/0108223 A1 | 4/2015 | Weitzhandler |
| 2015/0114507 A1 | 4/2015 | Warren |
| 2015/0129579 A1 | 5/2015 | Traver |
| 2015/0146216 A1 | 5/2015 | Krauhausen et al. |
| 2015/0226872 A1 | 8/2015 | Doany et al. |
| 2015/0248569 A1 | 9/2015 | Rushing |
| 2015/0273636 A1 | 10/2015 | Rajagopalan et al. |
| 2015/0298238 A1* | 10/2015 | Van Rensburg ..... B23K 9/0017 219/137.31 |
| 2015/0330551 A1 | 11/2015 | Van Nie et al. |
| 2015/0352653 A1 | 12/2015 | Albrecht |
| 2015/0360332 A1 | 12/2015 | Singh et al. |
| 2016/0032707 A1 | 2/2016 | Bowman |
| 2016/0032713 A1 | 2/2016 | Hallundbak et al. |
| 2016/0114418 A1 | 4/2016 | Jones |
| 2016/0114436 A1 | 4/2016 | Lacome |
| 2016/0221107 A1 | 8/2016 | Kadlec |
| 2016/0256961 A1 | 9/2016 | Clemmons |
| 2016/0375518 A1 | 12/2016 | Revel-Muroz |
| 2017/0080518 A1 | 3/2017 | Toguyeni |
| 2017/0080519 A1 | 3/2017 | Atin |
| 2017/0144256 A1 | 5/2017 | Tao |
| 2017/0182605 A1 | 6/2017 | Rajagopalan et al. |
| 2017/0274467 A1 | 9/2017 | Rajagopalan et al. |
| 2018/0029154 A1 | 2/2018 | Rajagopalan et al. |
| 2018/0031152 A1 | 2/2018 | Rajagopalan et al. |
| 2018/0043452 A1 | 2/2018 | Daney |
| 2018/0117718 A1 | 5/2018 | Rajagopalan et al. |
| 2018/0185951 A1 | 7/2018 | Lanz |
| 2018/0221984 A1 | 8/2018 | Toguyeni |
| 2018/0363809 A1 | 12/2018 | Bang |
| 2019/0009354 A1 | 1/2019 | Atin |
| 2019/0176260 A1 | 6/2019 | Kadlec |

FOREIGN PATENT DOCUMENTS

| | | |
|---|---|---|
| CA | 1239448 | 7/1988 |
| CA | 2141524 | 8/1995 |
| CA | 2721167 | 10/2009 |
| CA | 2838608 | 12/2012 |
| CN | 1069213 | 2/1993 |
| CN | 1468160 | 1/2004 |
| CN | 2825214 | 10/2006 |
| CN | 101332550 | 12/2008 |
| CN | 201273837 | 7/2009 |
| CN | 202188887 | 4/2012 |
| CN | 103495795 | 1/2014 |
| CN | 103826788 | 5/2014 |
| CN | 104010756 | 8/2014 |
| CN | 104209626 | 12/2014 |
| CN | 104602851 | 5/2015 |
| CN | 105675097 | 6/2016 |
| CN | 106425045 | 2/2017 |
| DE | 20 2006 004122 | 5/2006 |
| EP | 0119636 | 9/1984 |
| EP | 0 193 812 | 9/1986 |
| EP | 0300458 | 1/1989 |
| EP | 1100290 | 5/2001 |
| EP | 1985405 | 10/2008 |
| EP | 2 340 908 | 7/2011 |
| EP | 3106951 | 12/2016 |
| FR | 2727643 | 6/1996 |
| GB | 1 261 814 | 1/1972 |
| GB | 1283922 | 8/1972 |
| GB | 1 386 926 | 3/1975 |
| GB | 2214118 | 8/1989 |
| JP | 53113736 | 10/1978 |
| JP | 55027422 | 2/1980 |
| JP | 55040040 | 3/1980 |
| JP | 55156695 | 12/1980 |
| JP | 56148475 | 11/1981 |
| JP | S57142777 | 9/1982 |
| JP | S58122200 | 7/1983 |
| JP | 58145394 | 8/1983 |
| JP | 58-212890 | 12/1983 |
| JP | 59-030495 | 2/1984 |
| JP | 59-92194 | 5/1984 |
| JP | S5994587 | 5/1984 |
| JP | 59110476 | 6/1984 |
| JP | 60-72673 | 4/1985 |
| JP | S6071145 | 4/1985 |
| JP | 60-82284 | 5/1985 |
| JP | S61159275 | 7/1986 |
| JP | 01224167 | 9/1989 |
| JP | 02104474 | 4/1990 |
| JP | 2-127976 | 5/1990 |
| JP | 3-13270 | 1/1991 |
| JP | 3-90282 | 4/1991 |
| JP | 3-90283 | 4/1991 |
| JP | 05000374 | 1/1993 |
| JP | 05069131 | 3/1993 |
| JP | H0740216 | 2/1995 |
| JP | 7-116842 | 5/1995 |
| JP | 7-155949 | 6/1995 |
| JP | H07284927 | 10/1995 |
| JP | 10-244367 | 9/1998 |
| JP | 11-10486 | 1/1999 |
| JP | 2000061691 | 2/2000 |
| JP | 2001-170784 | 6/2001 |
| JP | 2005177801 | 7/2005 |
| JP | 2007-205941 | 8/2007 |
| JP | 2008212994 | 9/2008 |
| JP | 2011177016 | 9/2011 |
| JP | 2012-218031 | 11/2012 |
| JP | 5313025 | 10/2013 |
| KR | 20050040883 | 5/2005 |
| KR | 10-0598523 | 7/2006 |
| KR | 10-2012-0044131 | 5/2012 |
| KR | 10-1143532 | 5/2012 |
| KR | 101308526 | 9/2013 |
| RU | 1779226 | 11/1992 |
| RU | 1815099 | 5/1993 |
| RU | 2074799 | 3/1997 |
| RU | 2116181 | 7/1998 |
| RU | 2120845 | 10/1998 |
| RU | 2136468 | 9/1999 |
| RU | 2139780 | 10/1999 |
| RU | 2218251 | 12/2003 |
| RU | 2003115787 | 12/2004 |
| RU | 2420686 | 6/2011 |
| RU | 2524457 | 7/2014 |
| SU | 1066767 | 1/1984 |
| SU | 1199544 | 12/1985 |
| SU | 1741999 | 6/1992 |
| WO | 8705840 | 10/1987 |
| WO | 1990006205 | 6/1990 |
| WO | WO 90/06205 | 6/1990 |
| WO | 9705983 | 2/1997 |
| WO | 0041488 | 7/2000 |

(56) References Cited

FOREIGN PATENT DOCUMENTS

| WO | 0041845 | 7/2000 |
|---|---|---|
| WO | WO 00/41843 | 7/2000 |
| WO | 01/70446 | 9/2001 |
| WO | WO 02/00385 | 1/2002 |
| WO | 0249799 | 6/2002 |
| WO | WO 2007/097589 | 8/2007 |
| WO | WO 2009/059776 | 5/2009 |
| WO | WO 2010/002269 | 1/2010 |
| WO | 2010/046390 | 4/2010 |
| WO | WO 2011/012998 | 2/2011 |
| WO | 2013172244 | 11/2013 |
| WO | WO 2013/171589 | 11/2013 |
| WO | 2015017938 | 2/2015 |
| WO | WO 2015/148765 | 10/2015 |
| WO | WO 2016/033568 | 3/2016 |
| WO | 2016153562 | 9/2016 |
| WO | WO 2016/153562 | 9/2016 |

OTHER PUBLICATIONS

Decision to Grant issued in corresponding Russian Patent Application No. 2017134991, dated Aug. 29, 2019.
Third Office Action issued in corresponding Chinese Patent Application No. 201580045390.7, dated Sep. 20, 2019.
Preliminary Office Action Report issued in corresponding Brazilian Patent Application No. BR112017020431-2, dated Oct. 1, 2019.
Notice of Allowance issued in corresponding U.S. Appl. No. 15/714,117, dated Oct. 28, 2019.
Notice of Allowance issued in corresponding U.S. Appl. No. 15/441,804, dated Jul. 3, 2019.
Non-Final Office Action issued in corresponding U.S. Appl. No. 15/714,117, dated Jun. 19, 2019.
Official Action issued in corresponding Mexican Patent Application No. MX/a/2017/002690, dated May 7, 2019.
Decision to Grant issued in corresponding Russian Patent Application No. 2015154971, dated Apr. 22, 2019.
Non-Final Office Action issued in corresponding U.S. Appl. No. 15/441,804, dated Jul. 30, 2018.
Non-Final Office Action issued in corresponding U.S. Appl. No. 15/714,117, dated Sep. 17, 2018.
Final Office Action issued in corresponding U.S. Appl. No. 14/272,914 dated Jan. 25, 2018.
Notice of Allowance issued in corresponding U.S. Appl. No. 14/272,914, dated Apr. 6, 2018.
Office Action issued for corresponding Russian Patent Application No. 2017134991/02(061281), dated May 29, 2019.
Technical Examination Report issued for corresponding Brazilian Patent Application No. BR112015029273-9, dated Jun. 20, 2019.
Notice of Acceptance issued for corresponding Australian Patent Application No. 2015236037, dated Jul. 19, 2019.
International Preliminary Report on Patentability issued for corresponding International Application No. PCT/US2017/042612, dated Jul. 30, 2019.
Examination Report issued for corresponding European Patent Application No. 15836899.3, dated Aug. 8, 2019.
Decision to Grant issued in corresponding Russian Patent Application No. 2016142270, dated Feb. 12, 2019.
Official Action issued in corresponding Russian Patent Application No. 2017110223, dated Jan. 31, 2019.
Official Action issued in corresponding Malaysian Patent Application No. PI2015704216, dated Mar. 29, 2019.
Second Office Action issued in corresponding Chinese Patent Application No. 201580045390.7, dated Mar. 4, 2019.
Final Office Action issued in corresponding U.S. Appl. No. 15/714,117, dated Feb. 15, 2019.
Examination Report issued for corresponding European Patent Application No. 14800710.7, dated Feb. 7, 2019.
Office Action issued in corresponding Chinese Patent Application No. 201580016820.2, dated Apr. 4, 2018.

Office Action issued in corresponding Chinese Patent Application No. 201580045390.7, dated Apr. 10, 2018.
Office Action and Search Report issued in corresponding Russian Patent Application No. 2015154971, dated Apr. 27, 2018.
Examination Report issued for corresponding Chinese Patent Application No. 201480029722.8, dated Apr. 4, 2018.
European Search Report issued for corresponding European Patent Application No. 15836899.3, dated May 24, 2018.
Extended Search Report Issued for corresponding European Patent Application No. 15886707.7, dated Nov. 13, 2018.
Office Action issued in corresponding Russian Patent Application No. 2016142270/06(067667), dated Nov. 15, 2018.
Office Action issued in corresponding Chinese Patent Application No. 201580080511.1, dated Dec. 3, 2018.
Examination Report issued for corresponding Australian Patent Application No. 2015236037, dated Jan. 4, 2019.
Final Office Action issued in corresponding U.S. Appl. No. 15/441,804, dated Jan. 23, 2019.
Preliminary Office Action issued in corresponding Brazilian Patent Application No. 112016022229-6, dated Jan. 14, 2020.
Notice of Allowance issued in corresponding U.S. Appl. No. 15/560,954, dated Feb. 13, 2020.
Third Office Action issued in corresponding Chinese Patent Application No. 201580080511.1 , dated Mar. 3, 2020.
Office Action issued in corresponding Canadian Patent Application No. 2,942,368, dated Apr. 2, 2020.
Non-Final Office Action issued in corresponding U.S. Appl. No. 15/506,818, dated Feb. 27, 2020.
Fourth Office Action issued in corresponding Chinese Patent Application No. 2015800453907.7, dated May 26, 2020.
Preliminary Office Action issued in corresponding Brazilian Patent Application No. BR112017003933-8, dated Jun. 2, 2020.
Examination Report issued in corresponding Australian Patent Application No. 2015387441, dated Jun. 9, 2020.
Notice of Allowance issued in corresponding U.S. Appl. No. 15/506,818, dated Jul. 6, 2020.
Examination Report issued in corresponding Australian Patent Application No. 2015308646, dated Jul. 21, 2020.
First Office Action issued in corresponding Chinese Patent Application No. 201910006036.3, dated Nov. 3, 2020.
English Translation of the Official Action issued in corresponding Brazilian Patent Application No. 112016022229-6, dated Dec. 1, 2020.
Second Examination Report issued in corresponding Australian Patent Application No. 2015387441, dated Dec. 21, 2020.
Examination Report issued in corresponding Malaysian Patent Application No. PI 2017700232, dated Dec. 26, 2020.
Fourth Office Action issued in corresponding Chinese Patent Application No. 201580080511.1, dated Aug. 19, 2020.
Second Office Action issued in corresponding Canadian Patent Application No. 2,912,600, dated Sep. 23, 2020.
Office Action issued in corresponding Russian Patent Application No. 2018120317, dated Oct. 5, 2020.
Office Action issued in corresponding Canadian Patent Application No. 2,956,318, dated Jun. 29, 2021.
Preliminary Office Action issued in corresponding Brazilian Patent Application No. BR11201718006177-8, dated Jul. 20, 2021.
Notice of Allowance issued in corresponding U.S. Appl. No. 16/589,637, dated Jul. 9, 2021.
Second Office Action issued in corresponding Chinese Patent Application No. 201780003163.7, dated Nov. 3, 2021.
Official Action issued in corresponding Russian Patent Application No. 2019138447, dated Dec. 7, 2021.
Official Action issued in corresponding Russian Patent Application No. 2021106565, dated Dec. 9, 2021.
"Explorer II—Wireless Self-powered Visual and NDE Robotic Inspection System for Live Gas Pipelines", National Energy Technology Laboratory, DE-FC26-04NT42264, downloaded from URL: http://www.netl.doe.gov/research/oil-and-gas/project-summaries/completed-td/de-fc26-04nt42264 (4 pages).
Non-Final Office Action dated Jun. 20, 2016 in corresponding U.S. Appl. No. 14/228,708 (12 pages).
"Final Report: Explorer-II: Wireless Self-powered Visual and NDE Robotic Inspection System for Live Gas Distribution Mains", Oil &

(56) References Cited

OTHER PUBLICATIONS

Natrural Gas Technology,DE-FC26-04NT-42264, downloaded from URL: https://www.netl.doe.gov/File%20Library/Research/Oil-Gas/NT42264_FinalReport.pdf (120 pages).
Non-Final Office Action dated Aug. 11, 2016 in corresponding U.S. Appl. No. 14/272,914.
International Search Report dated Jul. 23, 2015 in corresponding International Patent Application No. PCT/US2015/022665.
Final Office Action issued in corresponding U.S. Appl. No. 14/272,914 dated Jan. 26, 2017.
International Search Report and Written Opinion of the International Searching Authority dated Mar. 29, 2016 in corresponding International Application No. PCT/US2015/062558 (46 pages).
International Search Report and Written Opinion issued for corresponding International Patent Application No. PCT/US2015/047603, dated Jan. 5, 2016 (16 pages).
International Search Report and Written Opinion issued for corresponding International Patent Application No. PCT/US2015/022665, dated Jul. 23, 2015 (11 pages).
International Preliminary Report on Patentability issued for corresponding International Patent Application No. PCT/US2015/022665, dated Oct. 13, 2016 (10 pages).
Non-Final Office Action issued in corresponding U.S. Appl. No. 14/228,708, dated Mar. 1, 2017.
Extended European Search Report, including Search Opinion, issued in corresponding European Patent Application No. 14800710.7, dated Jan. 23, 2017.
International Preliminary Report on Patentability issued in corresponding International Patent Application No. PCT/US2015/047603, dated Mar. 9, 2017.
Examination Report issued for corresponding Australian Patent Application No. 2014268528, dated Apr. 28, 2017.
Examination Report issued for corresponding Chinese Patent Application No. 201480029722.8, dated May 15, 2017.
Examination Report issued for corresponding Chinese Patent Application No. 201480029722.8, dated Jul. 18, 2016.
Search Report and Written Opinion issued for corresponding International Application No. PCT/US2014/039148, dated Oct. 1, 2014.
International Preliminary Report on Patentability issued for corresponding International Application No. PCT/US2014/039148, dated Dec. 3, 2015.
Non-Final Office Action issued in corresponding U.S. Appl. No. 14/272,914, dated Aug. 24, 2017.
Notice of Allowance issued in corresponding U.S. Appl. No. 14/228,708, dated Jul. 17, 2017.
Office Action issued in corresponding Chinese Patent Application No. 201580016820.2, dated Jul. 19, 2017.
International Preliminary Report on Patentability issued for corresponding International Patent Application No. PCT/US2015/062558, dated Oct. 5, 2017.
Extended European Search Report, including Search Opinion, issued in corresponding European Patent Application No. 15768987.8, dated Oct. 20, 2017.
Search Report and Written Opinion issued for corresponding International Application No. PCT/US2017/042612, dated Nov. 13, 2017.
Search Report and Written Opinion issued for corresponding International Application No. PCT/IB2017/055221, dated Nov. 30, 2017.
"Quick Start of Carbon Dioxide Gas Shielded Welding Technology", Qiu Yanlong, et al., Shanghai Science and Technology Press, pp. 170-174, Jun. 2011.
Extended European Search Report, including Search Opinion, issued in corresponding European Patent Application No. 17914653.5, dated Feb. 25, 2021.
Examination Report issued in corresponding Australian Patent Application No. 2015308646, dated Mar. 4, 2021.
Non-Final Office Action issued in corresponding U.S. Appl. No. 16/589,637, dated Mar. 15, 2021.
Office Action issued in corresponding Brazilian Patent Application No. 11 2017 020431 2, dated Mar. 30, 2021.
First Office Action issued in corresponding Chinese Patent Application No. 201780003163.7, dated Apr. 27, 2021.
Reexamination Notification issued in corresponding Chinese Patent Application No. 201580045390.7, dated Feb. 24, 2022.
Technical Examination Report issued in corresponding Brazilian Patent Application No. BR112018006177-8, dated Apr. 12, 2022.
First Office Action issued in corresponding Chinese Patent Application No. 202011391383.1, dated May 7, 2022.
Third Office Action issued in corresponding Chinese Patent Application No. 201780003163.7, dated May 18, 2022.
Notice of Allowance issued in corresponding Canadian Patent Application No. 2,956,318, dated Jun. 9, 2022.
Reexamination Notification issued in corresponding Chinese Patent Application No. 201580080511.1, dated Jun. 30, 2022.
IMOA (International Molybdenum Association), "Oil Country Tubular Goods," 2 pages.
Non-Final Office Action issued in corresponding U.S. Appl. No. 15/714,054, dated Jul. 21, 2022.

\* cited by examiner

ON
SYSTEMS AND METHODS FOR USE IN WELDING PIPE SEGMENTS OF A PIPELINE

CROSS-REFERENCE TO RELATED APPLICATIONS

This application claims priority and benefits to U.S. Provisional Application No. 62/357,811, filed on Jul. 1, 2016 and entitled "SYSTEMS AND METHODS FOR USE IN WELDING PIPE SEGMENTS OF A PIPELINE", the contents of which are incorporated herein by reference in its entirety.

BACKGROUND

Field

The present patent application relates to systems and methods that are used for welding pipes or pipe segments of a pipeline.

Pipeline systems, which can include long stretches of pipe sections or segments (e.g., miles of pipe segments) comprising steel, stainless steel or other types of metal, are used to transport fluids such as water, oil, and natural gas between two locations (e.g., from a source of origin that may be land or water based to a suitable storage location). Construction of pipeline systems typically involves connection of pipe segments of suitable diameter and lengthwise dimensions together via weld joints, for example, capable of providing a liquid tight seal for the connected pipe segments.

During formation of a weld joint between two pipes or pipe segments (e.g., two pipe segments having the same or similar transverse cross-sectional dimensions), an end of one pipe section or segment is brought into close proximity or contact with an end of a second pipe section or segment. The pipe segments are held in relation to each other and a weld joint is formed to connect the two ends of the pipe segments using a suitable weld process. After the weld is complete and cleaned, the weld may be inspected.

The present patent application provides improvements over prior art systems and methods.

SUMMARY

One aspect of the present patent application provides a system for welding two pipes. The system includes a first pipe clamp, a second pipe clamp, a weld torch, an inspection detector, a motor, one or more processors, and a grinder. The first pipe clamp is configured to engage the exterior surface of a first pipe to enable the first pipe clamp to be fixed relative to the first pipe. The second pipe clamp is configured to engage the exterior surface of a second pipe to enable the second pipe clamp to be fixed relative to the second pipe. The weld torch is configured to create a weld joint between the pipes at an interface region between the pipes. The inspection detector is configured to emit an inspection beam of radiation. The motor is operatively associated with the inspection detector to direct the inspection beam of radiation along the weld joint between the pipes. The one or more processors are operatively associated with the inspection detector to determine a profile of the weld joint between the pipes. The grinder is configured to grind at least a portion of the weld joint between the pipes based on the profile of the weld joint between the pipes.

Another aspect of the present patent application provides a system for welding two pipes. The system includes a pipe clamp assembly, a weld torch and an enclosure. The pipe clamp assembly includes a first pipe clamp and a second pipe clamp. The first pipe clamp is configured to engage the exterior surface of a first pipe to enable the first pipe clamp to be fixed relative to the first pipe. The second pipe clamp is configured to engage the exterior surface of a second pipe to enable the second pipe clamp to be fixed relative to the second pipe. The weld torch is operably connected to the pipe clamp assembly and is configured to create a weld joint between the pipes at an interface region between the pipes. The enclosure is operably connected to the pipe clamp assembly and is configured to enclose the weld torch and the interface region between the pipes.

Another aspect of the present patent application provides a system for welding two pipes. The system includes a first pipe clamp configured to engage the exterior surface of a first pipe to enable the first pipe clamp to be fixed relative to the first pipe; a second pipe clamp configured to engage the exterior surface of a second pipe to enable the second pipe clamp to be fixed relative to the second pipe; a weld torch configured to create a weld joint between the pipes at an interface region between the pipes; and an inspection detector configured to emit an inspection beam of radiation.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy. Just for example, where a single weld torch is described, the same configuration can be used for additional weld torches provided in the same system (e.g., in an external welding system) described herein.

BRIEF DESCRIPTION OF THE DRAWINGS

FIGS. 51 and 52 show the switch triggers being mounted on the guide track channel and corresponding limit switches being mounted on the carriage in accordance with an embodiment of the present patent application, wherein FIG. 52 shows the limit switches being engaged with the switch triggers and the FIG. 51 shows the limit switches being not engaged with the switch triggers;

DETAILED DESCRIPTION OF THE DRAWINGS

Figure 1:
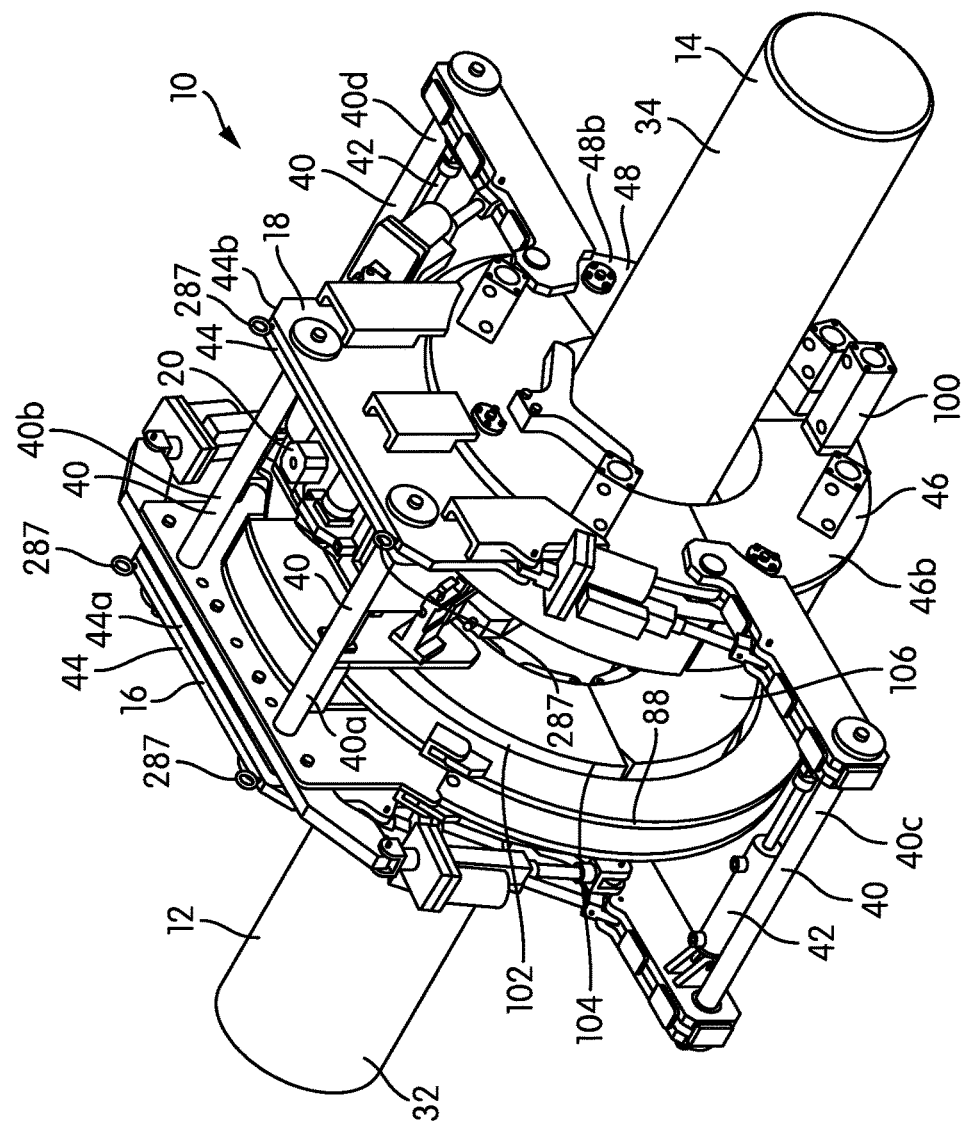
FIG. 1 shows a perspective view of a system for welding two pipes in accordance with an embodiment of the present patent application.
Figure 2:
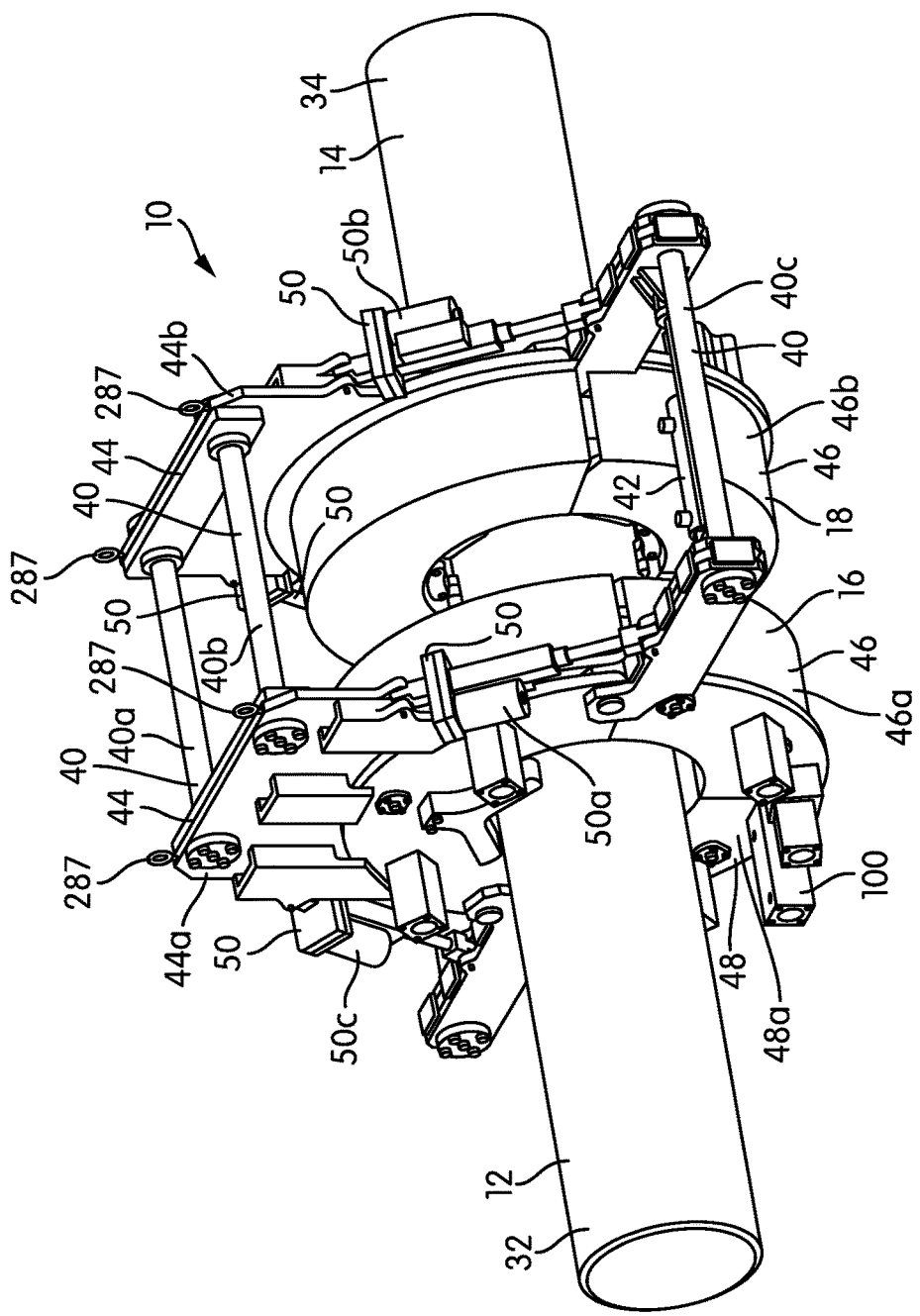
FIG. 2 shows another perspective view of the system of FIG. 1, wherein weld torch and weld torch mounting system are not shown for sake of clarity.

FIGS. 1 and 2 show a system 10 for welding two pipes 12 and 14. The system 10 includes a first pipe clamp 16, a second pipe clamp 18, and a weld torch 20 (as shown in FIGS. 21-27). In one embodiment, as shown in FIGS. 30-33, the system 10 also includes an inspection detector 22, a motor 24, one or more processors 26, and a grinder 30.

In one embodiment, the first pipe clamp 16 is configured to engage the exterior surface 32 of a first pipe 12 to enable the first clamp 16 to be fixed relative to the first pipe 12. In one embodiment, the second pipe clamp 18 is configured to engage the exterior surface 34 of the second pipe 14 to enable the second pipe clamp 18 to be fixed relative to the second pipe 14.

In one embodiment, the weld torch 20 is configured to create a weld joint 36 (FIGS. 21 and 24) between the pipes at an interface region 38 (FIGS. 21 and 24) between the pipes 12 and 14. In one embodiment, the inspection detector 22 is configured to emit an inspection beam of radiation. In one embodiment, the motor 24 is operatively associated with the inspection detector 22 to direct the inspection beam of radiation along the weld joint 36 between the pipes 12 and 14. The one or more processors 26 are operatively associated with the inspection detector 22 to determine a profile of the weld joint 36 between the pipes 12 and 14. The grinder 30 is configured to grind at least a portion of the weld joint 36 between the pipes 12 and 14 based on the profile of the weld joint 36 between the pipes 12 and 14.

The term "profile" as used herein is a generic term in referring to physical attributes of the weld joint between the pipes. The term "profile data" refers to data, corresponding to the profile, that can be derived from the weld joint. For example, such data can be obtained by scanning the weld joint with the inspection detector, such as a laser. The profile data can contain numerous types of information about the profile, such different types of information are referred to herein as "characteristics." In one embodiment, the physical attributes of the weld joint between the pipes may include, for example, one or more of the following: weld shape, weld height, weld symmetry, weld width, weld color, and/or weld smoothness.

In one embodiment, the pipe 12, 14 may interchangeably be referred to herein as pipe segments or pipe sections.

In one embodiment, the first pipe 12 and the second pipe 14 are made of a metal material. In one embodiment, the first pipe 12 and the second pipe 14 are made of a carbon steel material. In one embodiment, the first pipe 12 and the second pipe 14 are made of an alloy steel material. In one embodiment, the first pipe 12 and the second pipe 14 are made of a low-alloy steel material. In one embodiment, the first pipe 12 and the second pipe 14 are made (e.g., completely or in-part) of a Corrosion Resistant Alloy (CRA) material. In one embodiment, the CRA material may include iron-based alloys such as various grades of stainless steel or nickel-based alloys (i.e., typically known by the trade name, Inconel). In one embodiment, the first pipe 12 and the second pipe 14 may be made of a American Petroleum Institute specification (API) 5L grade X52 (i.e., 52000 PSI minimum yield strength and 66000 PSI minimum tensile strength) material. In one embodiment, the first pipe 12 and the second pipe 14 may be made of an API 5L grade X60 (i.e., 60000 PSI minimum yield strength and 75000 PSI minimum tensile strength) material.

In one embodiment, the first pipe 12 and the second pipe 14 may be made of the same material. In one embodiment, the first pipe 12 and the second pipe 14 may be made of the different materials. In one embodiment, the first pipe 12 and the second pipe 14 may be made of bi-metallic materials. In one embodiment, the inner portion of the pipe is made of carbon steel material and the outer portion is made of a CRA material. In another embodiment, the inner portion of the pipe is a CRA material and the outer portion of the pipe may be either carbon steel material or a different CRA material than the inner portion.

In one embodiment, the first pipe 12 and the second pipe 14 each has a length of at least 10 feet. In one embodiment, the first pipe 12 and the second pipe 14 each has a length in the range of about 10 to about 100,000,000 feet. In one embodiment, the first pipe 12 and the second pipe 14 have an exterior diameter of 60 inches or less. In one embodiment, the exterior diameter of the pipe segment may also be referred to as the outer diameter of the pipe segment. In one embodiment, the first pipe 12 and the second pipe 14 each has an exterior diameter in the range of about 8 to about 10 inches.

In one embodiment, the system 10 is an external weld system that is generally configured to weld the pipes 12 and 14 from outside the pipes 12, 14. In one embodiment, the external weld system may be configured to provide shield gas outside (e.g., at joint of) the pipes 12, 14 to be welded.

Figure 30:
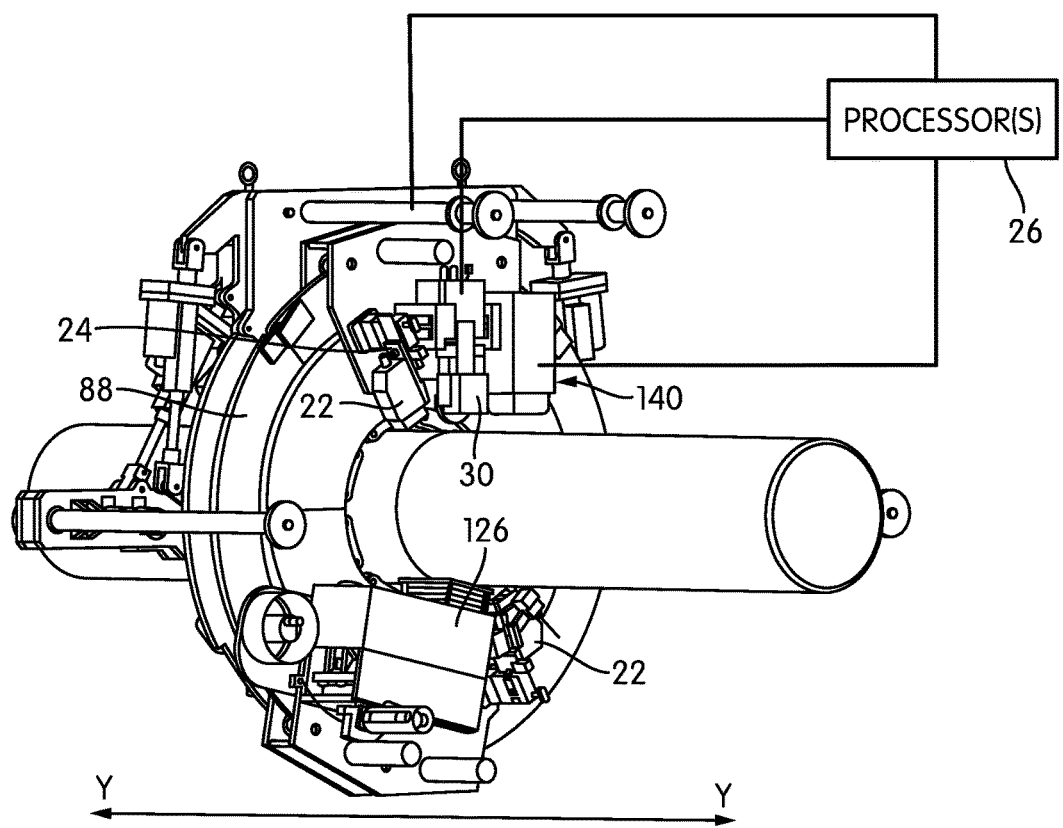
FIG. 30 shows a perspective view of the system, wherein a grinder is positioned at a weld start position and the weld torch is part way through a welding pass and, wherein some of the components of the system are not shown for sake of clarity.

In one embodiment, the external weld system may include a weld material consumption device. In one embodiment, the weld torch 20 is constructed and arranged to feed or guide a consumable electrode wire into the weld area/zone. For example, the wire feeder and spool 187 are shown in FIG. 30. The consumable electrode wire is supplied from a source (e.g., a wire reel or spool) through a wire feed system. In one embodiment, the weld torch 20 is constructed and arranged to be connected to a power supply (e.g., a constant voltage power supply). In one embodiment, an electric arc forms between a consumable electrode wire and the pipes 12, 14, which heats the wire and pipes 12, 14, causing them to melt, and join. In one embodiment, along with the consumable electrode wire, a shield gas is fed through the weld torch 20, which shields the weld procedure from contaminants in the air. In one embodiment, the shield gas is fed to the weld area/zone through the weld torch nozzle that may include a gas cup. In one embodiment, the electrode may extend beyond the end of the gas cup. In one embodiment, the shield gas stored in the system 10 is brought to the wire feed assembly by a hose/shield gas line for distribution to the weld torch 20.

The term "interface region" as used herein refers to the surfaces of the pipes 12, 14 to be welded in the area, and optionally in the adjacent vicinity, where the weld material is to be deposited. The interface region includes at least a portion, or optionally the entirety, of the bevel of both pipes to be welded, if such bevels are provided. In one embodiment, the interface region includes the entirety of the beveled surfaces and also extends beyond the beveled surface, if bevels are provided. In one embodiment, the interface region 38 is an annular interface region. In one embodiment, the interface region 38 is on the exterior of the pipes 12, 14 at regions of the pipes 12, 14 adjacent to where the weld would go.

In one embodiment, the ends of the pipes 12 and 14 are joined together to have a weld groove formed therebetween. In one embodiment, the weld groove may have a V-shaped cross-section configuration, U-shaped cross-section configuration, or other shaped cross-section configurations as would be appreciated by one skilled in the art. In one embodiment, the ends of the pipes 12 and 14 may include bevel surfaces. In one embodiment, a weld material is configured to connect the first pipe 12 and the second pipe 14.

In one embodiment, the weld joint 36 is a complete circumferential weld connecting the pipe 12 and 14 end-to-end circumferentially. In one embodiment, the pipe 12 and 14 are welded together at their beveled end portions.

In one embodiment, the weld joint 36 may include a plurality of layers of weld material disposed on top of each other in a radially outwardly direction. In one embodiment, the plurality of layers of weld material may be referred to as weld pass layers. In one embodiment, different weld passes or weld layers may be formed sequentially by the external weld system 10 from the exterior/outside of the pipes 12 and 14. The weld pass layer(s) may interchangeably be referred to herein as pass layer(s). In one embodiment, the weld pass (e.g., root pass, hot pass, fill pass(es), cap pass) may be a single advancement of the weld tool or weld system 10 along the weld joint 36. In one embodiment, a weld bead or a weld layer is formed as a result of each weld pass.

The term "pipe clamp" as used herein can refer to a clamp structure for fixedly securing to a pipe surface (e.g., exterior surface 32, 34 of the pipe 12, 14, respectively). The clamp, for example, may include one or more clamp shoes 52 or other support structure configured to fixedly engage with a pipe surface (e.g., exterior surface 32, 34 of the pipe 12, 14, respectively) so as to prevent movement thereof.

In one embodiment, the pipe clamp may be a toggle clamp, the structure and operation of this type of clamp are shown in and described with respect to FIGS. 3-11. In another embodiment, the pipe clamp may be a taper clamp, the structure and operation of this clamp are shown in and described with respect to FIGS. 12-17.

Figure 3:
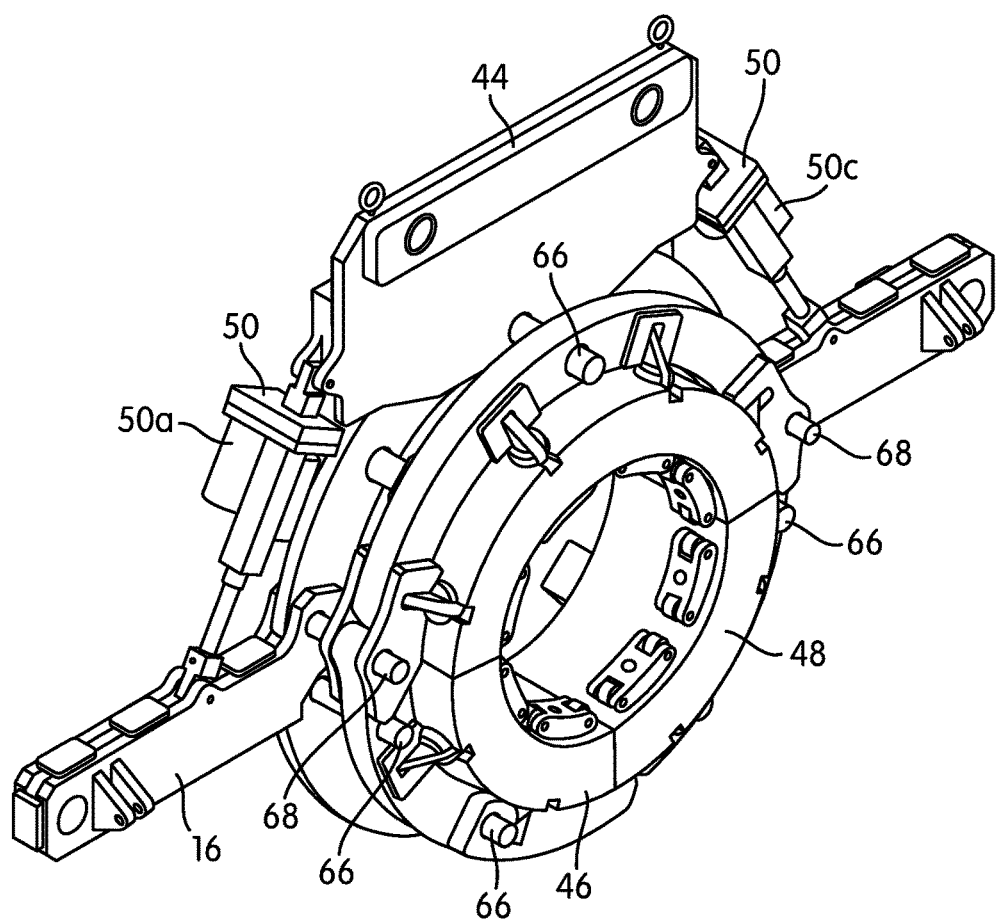
FIG. 3 shows a perspective view of one of two pipe clamps of the system in accordance with an embodiment of the present patent application, wherein the pipe clamp is in its closed position.
Figure 4:
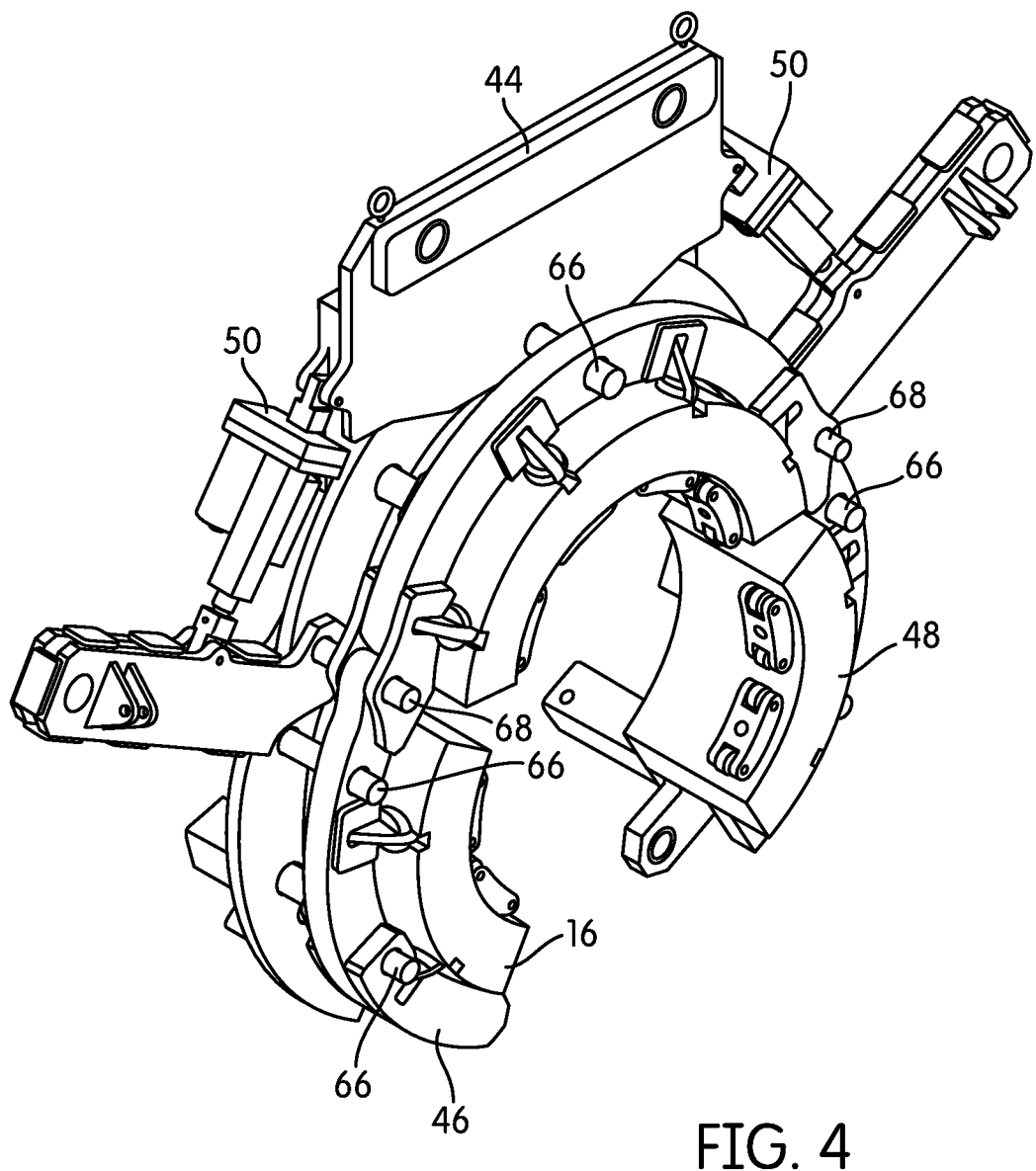
FIG. 4 shows a perspective view of the pipe clamp of FIG. 3 when it is in its open position.

FIGS. 3 and 4 show the first pipe clamp 16. The second clamp 18 is a mirror image of the first pipe clamp 16. In one embodiment, the structure and operation of the second pipe clamp 18 are same as those of the first pipe clamp 16, and hence the structure and operation of the second pipe clamp 18 will not be described in detail here.

In one embodiment, the clamps 16 and 18 of the external weld system 10 may either individually or together be referred to as the brake system of the external weld system 10 that secures the external weld system 10 at a desired location on the pipes 12, 14. In one embodiment, the clamps 16, 18 are radially extending clamps that engage the exterior surfaces of the pipes 12 and 14, respectively to secure the external weld system 10 from movement.

In one embodiment, each of the first and second pipe clamps 16 and 18 includes a non-pivoting (or fixed) portion 44, 44a, or 44b and two pivoting or moveable portions 46, 46a, or 46b and 48, 48a, or 48b. In one embodiment, the non-pivoting portion 44 is positioned on the top portion of the clamp and the two pivoting or moveable portions 46 and 48 are positioned on each side of the non-pivoting portion 44.

In one embodiment, as shown in FIGS. 1 and 2, the top-fixed/non-pivoting portions 44 of the first clamp 16 and the second clamp 18 each may include lifting points 287. In one embodiment, the first clamp 16 and the second clamp 18 may each be lifted by the lifting points 287 from place to place to provide a readily removable clamp. In one embodiment, the first clamp 16 and the second clamp 18 may be lifted and moved from one location to another using an overhead crane or similar lifting mechanism and by attaching cables to the lifting points 287. In one embodiment, the first clamp 16 and the second clamp 18 each can be hoisted to be placed on the pipe or removed from the pipe.

In one embodiment, the two pivoting or moveable portions of the clamp are configured to allow for placement of the clamp on the respective pipe. That is, the two pivoting or moveable portions 46 and 48 are configured to be hinged (e.g., about pivot pins 68) so that the pivoting or moveable portions 46 and 48 swing open to allow the clamp to be placed on the respective pipe and to be removed from the respective pipe. In one embodiment, a linear actuator 50, 50a, 50b, 50c, or 50d is used to control the position of each pivoting or moveable portion 46 and 48 of the clamp. For example, as shown in FIGS. 3 and 4, actuator 50a is used to control the position of the pivoting or moveable portion 46 of the clamp and actuator 50c is used to control the control the position of the pivoting or moveable portion 48 of the clamp. In one embodiment, the actuator 50 may be a hydraulic cylinder/actuator, a pneumatic cylinder/actuator, an electric actuator, or any other actuator as would be appreciated by one skilled in the art.

In one embodiment, the first clamp 16 and the second clamp 18 may be connected to each other using guide member or guide rods 40. In one embodiment, as shown in FIGS. 1 and 2, the first clamp 16 and the second clamp 18 are connected to each other using four guide rods 40a-d.

Two 40a and 40b of the four guide rods 40 are configured to connect non-pivotable portions 44a and 44b of the first clamp 16 and the second clamp 18 to each other. In one embodiment, these two non-pivotable guide rods 44, 44a or 44b are also configured to support a guide track member 88 (as shown in and described with respect to FIGS. 18 and 19) that is configured to support a weld torch module 126 (including the weld torch 20), a grinder module (including the grinder 30), and an inspection module (including the inspection detector 22 and/or the inspection camera 182) thereon.

The remaining two (of the four) guide rods 40c and 40d are configured to connect each of the two pivotable portions 46a and 48a of the first clamp 16 with the corresponding pivotable portions 46b and 48b of the second clamp 18. In one embodiment, the guide rod 40c is configured to connect the pivotable portion 46a of the first clamp 16 with the corresponding pivotable portion 46b of the second clamp 18. In one embodiment, the guide rod 40d is configured to connect the pivotable portion 48a of the first clamp 16 with the corresponding pivotable portion 48b of the second clamp 18.

FIG. 3 shows the two bottom, pivotable portions 46 and 48 of the clamp are in a closed (and locked) position, whereas FIG. 4 shows the two bottom, pivotable portions 46 and 48 of the clamp are in a swing opened position. That is, the two bottom, pivotable portions 46 and 48 of the clamp may be adapted to pivot radially outwardly so that the clamp may swing open to allow the pipe to be positioned under the non-pivotable portion 44. When the pipe is in position, the two bottom, pivotable portions 46 and 48 of the clamp may be swung into a locked position.

In one embodiment, the first procedure in the pipe welding (i.e., welding two pipes together) is pipe holding procedure. In one embodiment, during the pipe holding procedure, the two pipes 12, 14 are held in the correct position for welding. In one embodiment, the pipe holding procedure may include pipe shaping procedure and pipe alignment procedure. In one embodiment, the pipe shaping procedure and pipe alignment procedure are performed by the first and second pipe clamps 16 and 18.

In one embodiment, the pipe shaping procedure and the pipe alignment procedure are not separate and these procedures always happen simultaneously. In one embodiment, the pipe shaping procedure cannot be done without doing the pipe alignment procedure, and vice versa.

In one embodiment, each pipe clamp 16, 18 is configured to perform both the pipe shaping procedure and the pipe alignment procedure. In one embodiment, the pipe shaping procedure is optional and each pipe clamp 16, 18 is configured to perform only the pipe alignment procedure.

During the pipe shaping procedure, the two pipes 12, 14 to be welded together are made to have the same shape. This may be achieved by using the pipe clamps 16, 18 for the respective pipe 12, 14. In one embodiment, as will be explained in detail below with respect to FIGS. 3-17, each pipe clamp 16, 18 includes a series of mechanically linked grippers/clamp shoes 52 that are constructed and arranged to move radially inward toward the corresponding pipe 12, 14. The mechanical links that connect the adjacent grippers/clamp shoes 52 are constructed and arranged to ensure that all of the grippers/clamp shoes 52 are at the same radius at all times.

During the pipe alignment procedure, the two pipes 12, 14 to be welded together are aligned such that the centerlines of the two pipes are coaxial. In one embodiment, the two pipes are also aligned such that a space between the two pipes is set to a predetermined distance. In one embodiment, the predetermined distance may vary from 0 inches (i.e., two pipes 12, 14 touching each other) to a small gap. In one embodiment, the small gap is no more than 0.065 inches. In one embodiment, the two pipes 12, 14 may be pulled together to create a compressive force between the two pipe faces to minimize movement of the weld joint 36 during welding.

In one embodiment, the pipe alignment procedure may also include pipe centers alignment procedure and pipe faces alignment procedure. In one embodiment, during the pipe centers alignment procedure, the two clamps 16 and 18 are connected via a plurality of guide rods 40*a-d* so that the geometric centers of the two sets of grippers/clamp shoes 52 are coaxial.

During the pipe faces alignment procedure, in one embodiment, the first pipe clamp 16 and the second pipe clamp 18 are configured to be moveable with respect to the other of the first pipe clamp 16 and the second pipe clamp 18 so as to control an axial gap between the pipes 12 and 14. That is, one of the clamps 16 and 18 is configured to be slideable along the plurality of guide rods 40, 40*a-d* to change the axial distance between the two sets of grippers/clamp shoes 52. If this alignment is performed while the clamps are holding the respective pipes 12 and 14, then the distance between the pipes 12 and 14 changes as well. In one embodiment, the distance between the clamps 16 and 18 is controlled by two actuators 42 (as shown in FIGS. 1 and 2). The actuators 42 are positioned one on each side of the pipes 12 and 14. In one embodiment, the actuator 42 may be a hydraulic cylinder/actuator, a pneumatic cylinder/actuator, an electric actuator, or any other actuator as would be appreciated by one skilled in the art.

In one embodiment, one of the first pipe clamp 16 and the second pipe clamp 18 is configured to be moveable with respect to the other of the first pipe clamp 16 and the second pipe clamp 18 to create an axial compressive force between the pipes 12, 14.

In one embodiment, pipe angles of the pipes 12, 14 may be aligned relative to each other at the weld joint by lifting the weld joint using an external crane 190. For example, in one embodiment, the first pipe clamp 16 and the second pipe clamp 18 are lifted from one weld joint to the next weld joint by the external crane 190. Since the external crane 190 is configured to remain connected to the first pipe clamp 16 and the second pipe clamp 18 at all times, it is possible to use the external crane 190 to apply a net load to the pipes 12 and 14 to change their relative angles at the weld joint.

Figure 46:
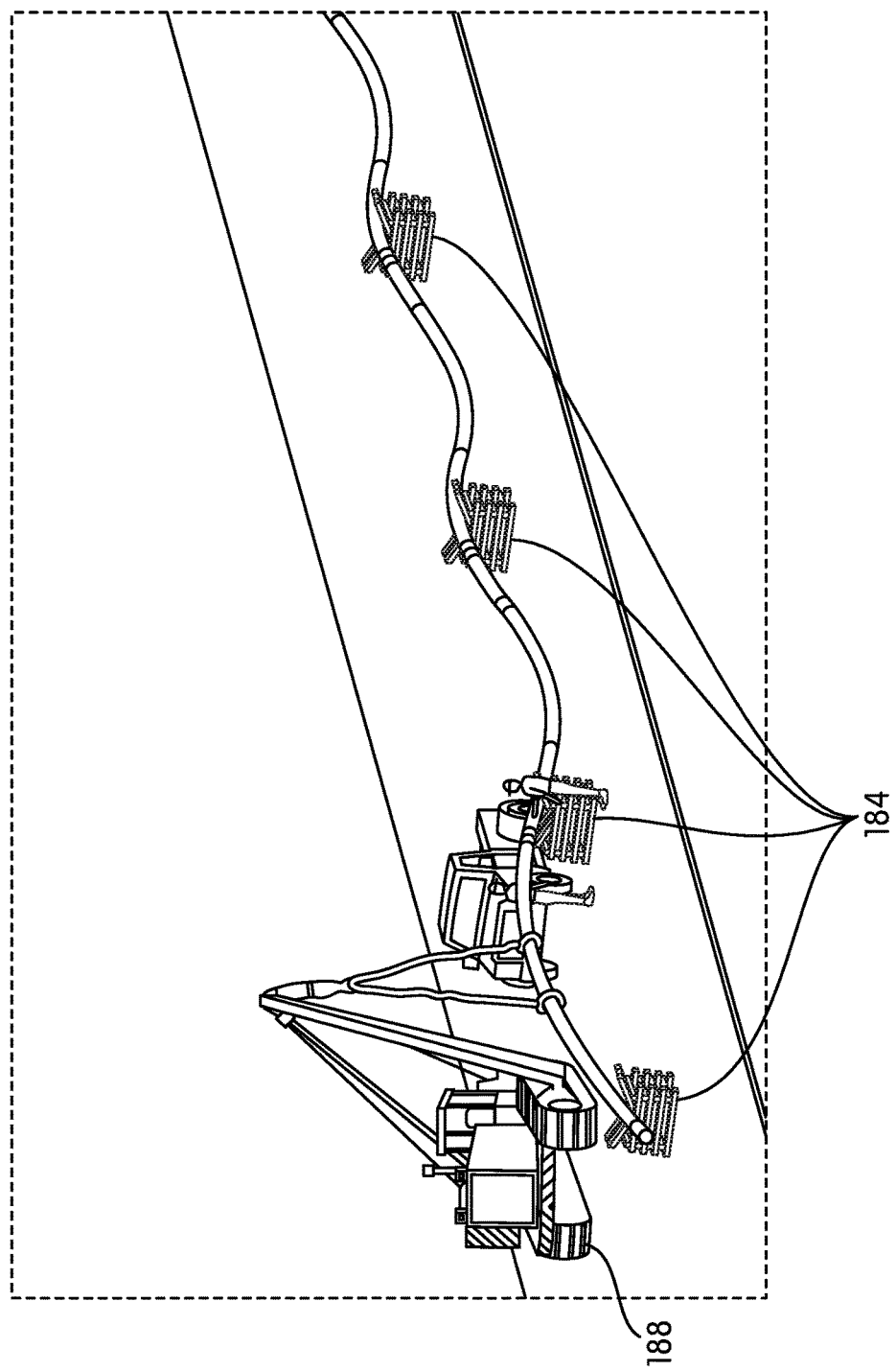
FIG. 46 shows a prior art system for aligning the pipe ends.

The prior art method that is used to align pipe ends generally required the new pipe 186 to be held by a sideboom tractor 188 or other lifting equipment for the entire duration of the root pass weld plus the beginning of the second (hot) pass weld. As each pipe is welded, a pipe support 184 is placed near the free end. The weight of the pipes causes them to sag between the pipe supports 184. This sag forces the free end of the pipe to angle upwards. For example, FIG. 46 shows pipe deflections between the pipes using this prior art method. In order to have a consistent weld joint profile, the pipe ends must be aligned in the vertical, horizontal, and axial directions and in the pitch and yaw angles. In the prior art method, to align the unwelded pipe 186 to the previously welded pipes, the sideboom tractor 188 is used to hold the unwelded pipe 186 in the proper position to align the two pipe ends in position and angle.

Figure 47:
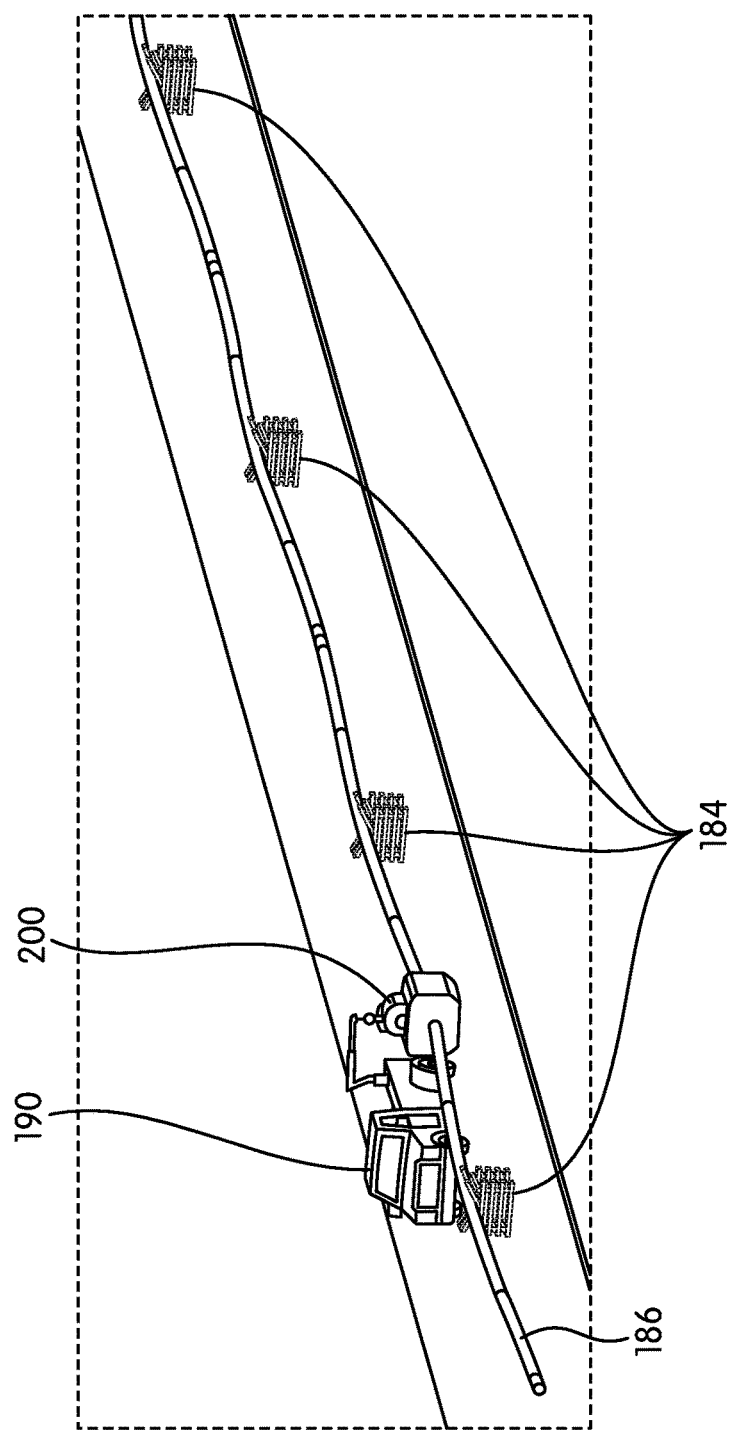
FIG. 47 shows a system for aligning the pipe angles in accordance with an embodiment of the present patent application.
Figure 48:
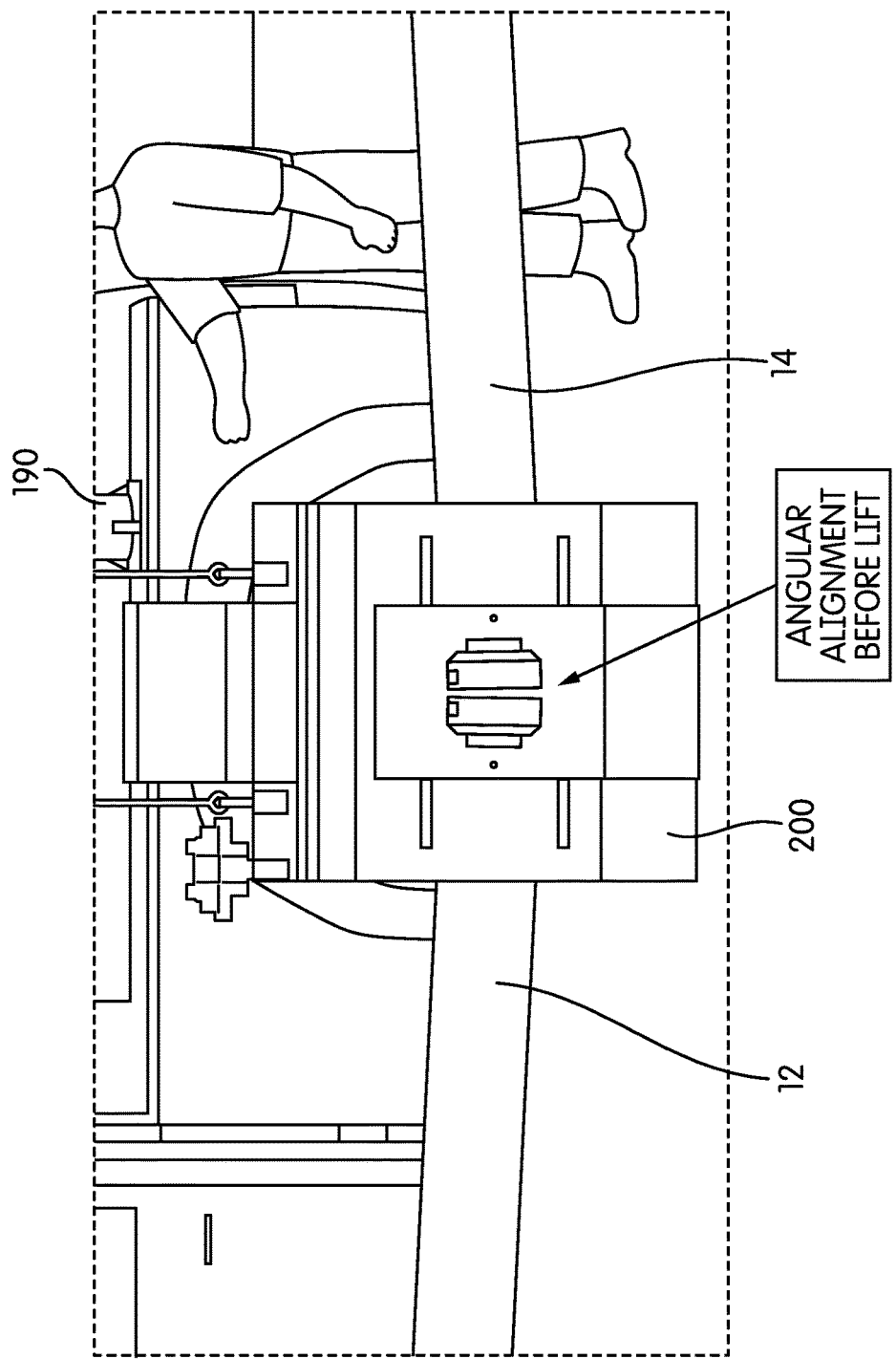
FIGS. 48 and 49 show angular misalignment between the pipe ends (at the weld joint) before and after using the system for aligning the pipe angles in accordance with an embodiment of the present patent application.
Figure 49:
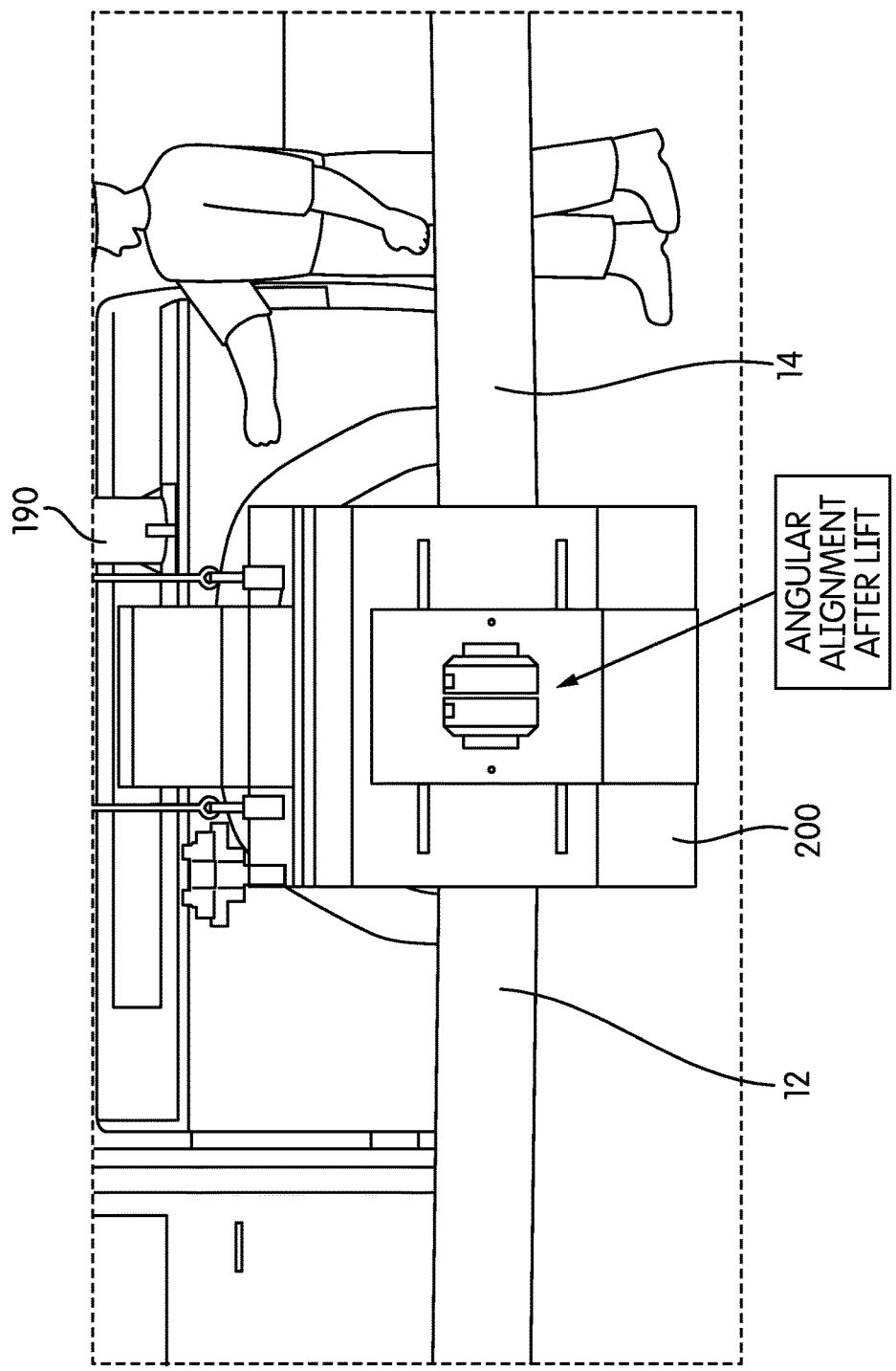

FIG. 47 shows the system of the present patent application that is configured to align pipe angles of the pipes relative to each other by lifting the weld joint by the external crane 190. The system of the present patent application allows the sideboom tractor 188 to place the unwelded pipe 186 near the correct alignment and then move on to other activities without having to wait for the first weld pass (e.g., root weld pass) to be 100% complete. In some embodiments, it may be possible for the sideboom tractor 188 to move on before the first weld pass begins. Referring to FIGS. 47-49, the method of the present patent application begins with placing the pipe supports 184 near the middle of each pipe segment rather than near one end. This allows the ends of two adjacent pipes to sag by similar distances and angles. Once the system of the present patent application has been closed around the pipes, the system can be lifted by the external crane 190 to change the local deflection and angle at the weld joint. The lifting direction need not be in a purely vertical direction but could be at any angle needed to improve the alignment of the two pipe ends as can be appreciated by one skilled in the art. This alignment method, thus, allows for a small gap between the two pipes for the first (root) weld pass. That is, with the external crane 190 able to control the angular alignment of the two pipes 12, 14, it is not necessary for the two pipes 12, 14 to make contact to ensure proper angular alignment. This makes is possible to use the axial actuators between the two clamps to control the relative axial positions of the two pipes 12, 14 such that there is a small gap at the interface between the pipes 12, 14. By properly adjusting the crane 190, the gap at the interface between the two pipes 12, 14 can be made consistent at all points along the interface to within a small tolerance (e.g., less than 10%) as will be appreciated by one skilled in the art.

One of the reasons for being able to preload the pipes 12, 14 together with the sliding clamp 16, 18 is to be able to resist bending forces that would normally act to create a gap on one side of the weld joint. These bending forces can be controlled by adjusting the vertical load from the external crane 190 that is configured to lift the enclosure 200. In one embodiment, once the clamps 16, 18 have engaged the pipes

12, 14, the crane 190 is configured to pull with a force that is greater or less than the weight of the system to create a vertical load on the pipes 12, 14. If that vertical load is properly controlled, any bending forces at the weld joint can be reduced and possibly eliminated.

FIGS. 48 and 49 show a comparison of the angular misalignment between the pipes before and after the system of the present patent application is being lifted to change the local deflection and angle at the weld joint.

Figure 5:
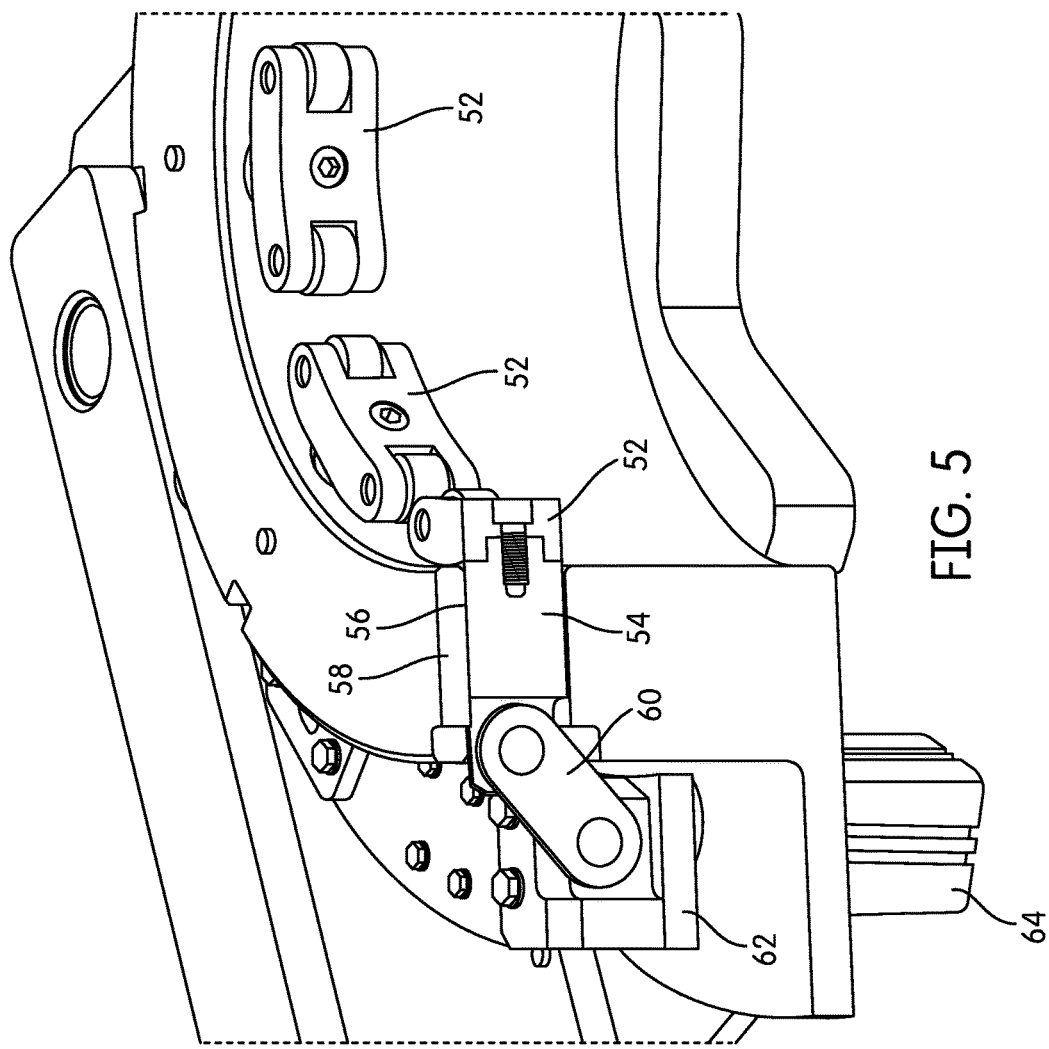
FIGS. 5 and 6 show partial cross-sectional views of the pipe clamp of FIG. 3, wherein actuator and clamp shoes are in their retracted positions in FIG. 5 and the actuator and the clamp shoes are in their extended positions in FIG. 6.
Figure 6:
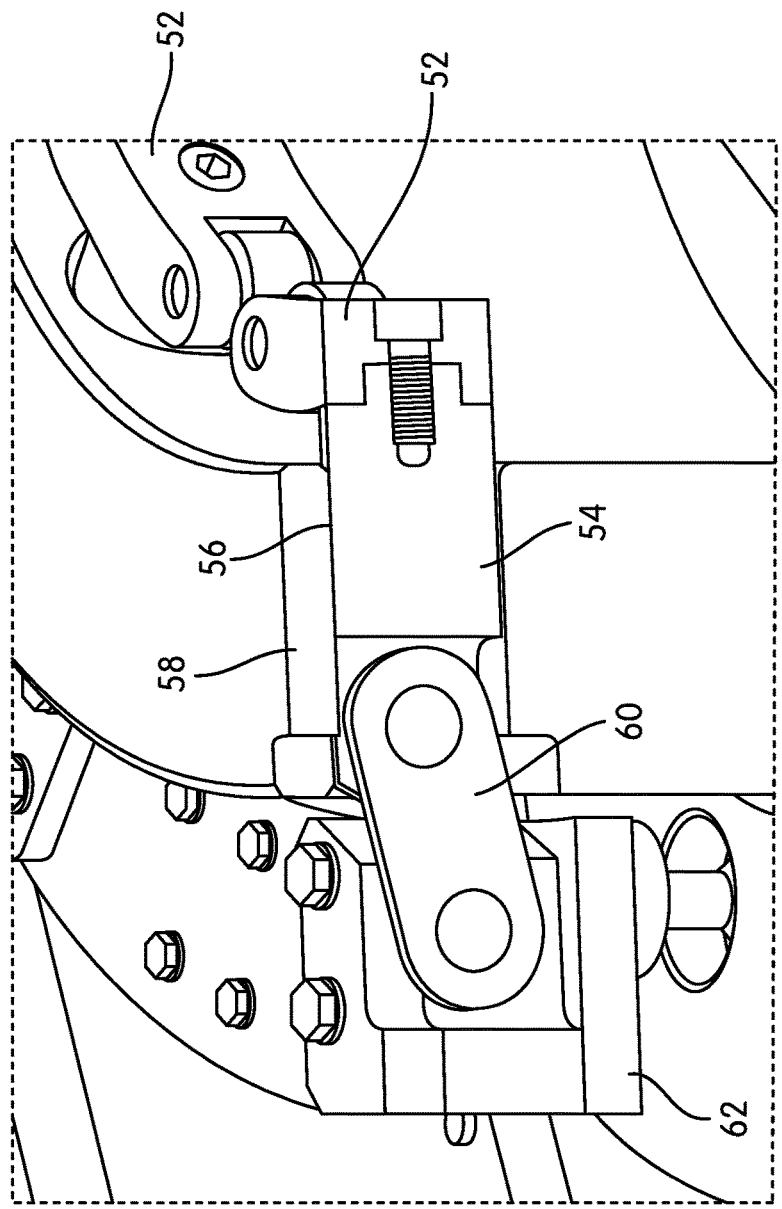

Referring to FIGS. 5 and 6, in one embodiment, each pipe clamp 16 or 18 includes the plurality of clamp shoes 52 that are configured to grip/engage the respective pipe 12, 14. In one embodiment, the clamp shoes 52 may have different heights for different size pipes and may be fine-tuned, for example, with shims or any other adjustment members. In one embodiment, each pipe size (i.e., external diameter) has a corresponding clamp shoe size. In one embodiment, the clamp shoes 52 are interchangeable for different pipe sizes. In one embodiment, the clamp shoes 52 may be self-centering members.

In one embodiment, each clamp shoe 52 includes pipe surface contact members (or surfaces). In one embodiment, the pipe surface contact members are constructed and arranged to frictionally engage, when the clamps 16, 18 are extended, the external/outside surfaces 32, 34 of the pipes 12, 14 on either side of the interface region 38 between the pipes 12, 14.

In one embodiment, each clamp shoe 52 is constructed and arranged to be connected to and positioned on its associated clamp shoe pin member 54. In one embodiment, the clamp shoe pin member 54 is constructed and arranged to extend through its corresponding opening 56 in the housing member 58. In one embodiment, openings 56 in the housing member 58 are constructed and arranged to generally extend radially in the housing member 58 so as to enable a radial movement (e.g., up and down radial movement) of the clamp shoe pin member 54 in the corresponding opening 56 in the housing member 58. In one embodiment, the housing member 58 may be any member that is constructed and arranged to facilitate movement of the clamp shoe pin members 54 such that the clamps apply clamping forces on the exterior/outer surfaces of the pipes 12, 14.

In one embodiment, one end of the clamp shoe pin member 54 is attached to the clamp shoe 52 and the other end of the clamp shoe pin member 54 is connected to the link member 60. In one embodiment, the end of the clamp shoe pin member 54 includes a notch that is constructed and arranged to receive the link member 60 therein. In one embodiment, the end of the clamp shoe pin member 54 also includes openings that are constructed and arranged to receive fastening members to connect the link member 60 to the end of the clamp shoe pin member 54.

In one embodiment, the housing member 58 may include openings that are constructed and arranged to enable the connection between the clamp shoe pin members 54 and the link members 60. In one embodiment, the openings of the housing member 58 are also constructed and arranged to enable the movement of the link member 60 when the clamps are moved between their retracted and extended positions. In one embodiment, the link member 60 is an elongated member with openings formed at its end portions. In one embodiment, the end portions of the link member 60 have generally rounded configurations to enable the movement of the link member 60 when the clamps are moved between their retracted and extended positions.

In one embodiment, one end of the link member 60 is connected to the clamp shoe pin member 54 and the other end of the link member 60 is connected to the actuator member 62. In one embodiment, each clamp shoe 52 is thus connected to the actuator member 62 via its associated clamp shoe pin member 54 and link member 60.

In one embodiment, the actuator member 62 may include notches that are constructed and arranged to enable the connections between the link members 60 and the actuator member 62. In one embodiment, the notches of the actuator member 62 are also constructed and arranged to enable the movement of the link members 60 in the notches when the clamps are moved between their retracted and extended positions.

In one embodiment, the actuator member 62 is constructed and arranged to be connected to a portion of an actuator 64. In one embodiment, the actuator may be a hydraulic cylinder/actuator, a pneumatic cylinder/actuator, an electric actuator, or any other actuator as would be appreciated by one skilled in the art. In one embodiment, the actuation member 62 is configured to move axially relative to the clamp housing. The position of the actuation member 62 may be controlled by the plurality of actuators 64 that are connected to the clamp housing.

In one embodiment, the actuation member 62 is kept centered on the clamp housing by a plurality of guide rods 66 (as shown in FIGS. 3 and 4). Two of the guide rods 68 also function as the pivot point for the hinged segments 46 and 48. This way, the housing segments 46 and 48 and the actuation member segments pivot about the same point and maintain their relative orientation at all times.

The clamps are moved from the retracted position (as shown in FIG. 5) where the clamps are not in contact with the outer surfaces of the pipes 12, 14 to the extended position (as shown in FIG. 6) where the clamps are configured to apply clamp forces on the outer surfaces of the pipes 12, 14, by actuation of the actuator 64. In one embodiment, the axial movement of the portion of the actuator 64 in turn causes an axial movement of the actuating member 62. In one embodiment, the axial movement of the actuating member 62 is translated to a radial movement of the clamp shoe pin members 54 via their link members 60. Thus, the radial clamp forces are generated by the actuator 64 that drives the link members 60 that convert the axial movement of the actuator to a radial movement of the clamp shoes 52.

In one embodiment, the size of the cylinder of the actuator, the applied fluid pressure, and the sizes of various components of the clamps may be changed to control the clamp forces being applied by the clamps on the outer surfaces of the pipes 12, 14.

In one embodiment, the actuation member 62, the link member 60, the shoe pin member 54, and the clamp shoes 52 are all sized so that there is a small clearance between the clamp shoes 52 and the pipe when the actuation member 62 is retracted and there is a small angle between the axis of the link member 60 and the shoe pin member 54 when the actuation member 62 is engaged. In one embodiment, this shallow angle greatly magnifies the force generated by the actuators 64. The radial force on the pipe at the clamp shoes may be 10 times greater than the force generated by the actuators.

In one embodiment, the one or more processors 26 are configured to alter the interface region 38 between the pipes 12, 14 prior to the welding operation by driving the first pipe clamp 16 and/or the second pipe clamp 18 to change the roundness (or ovality) of the first pipe 12 and/or second pipe 14 based on a pre-determined data (e.g., pre-weld profile data of the interface region 38). For example, in one embodiment, the one or more processors 26 are configured to alter the interface region 38 between the pipes 12, 14 prior to the welding operation by selectively driving the one or more clamp shoes 52 of the clamps 16 and/or 18 to change the roundness of the first pipe 12 and/or second pipe 16 based on the pre-weld profile data. In one embodiment, the minimum number of clamp shoes 52 is three. The number of clamp shoes 52 may vary in other embodiments.

In one embodiment, all the clamp shoes of the first clamp always move together. In one embodiment, all the clamp shoes of the second clamp always move together. In one embodiment, the structure and configuration of each clamp enable all of its associated clamp shoes to always move together.

For example, the clamping force may slightly alter the distance between the pipe ends and/or relative radial displacement between the pipe ends at certain (or all) regions of the interface region 38. In addition, the clamping force applied by the clamps may change a roundness of one or both of the pipes (e.g., the first clamp may alter the roundness of the first pipe to be welded and/or the second clamp may alter the roundness of the second pipe to be welded). That is, change the shape of a slightly out of round pipe to one that is more rounded. In one embodiment, for example, the clamp shoes 52 for any one of the clamps 16, 18 are symmetrically provided and evenly circumferentially spaced about the exterior of the pipe being engaged. In addition, the innermost surface of each clamp shoe may be equally spaced from the central axis of the clamp. Until the full clamping force is applied by both clamps, the profile of the interface region is not yet fully determined because of the shape changing possibility. The inspection detector described herein can be used to determine the profile of the interface region and/or weld joint after clamping has been applied.

Figure 7:
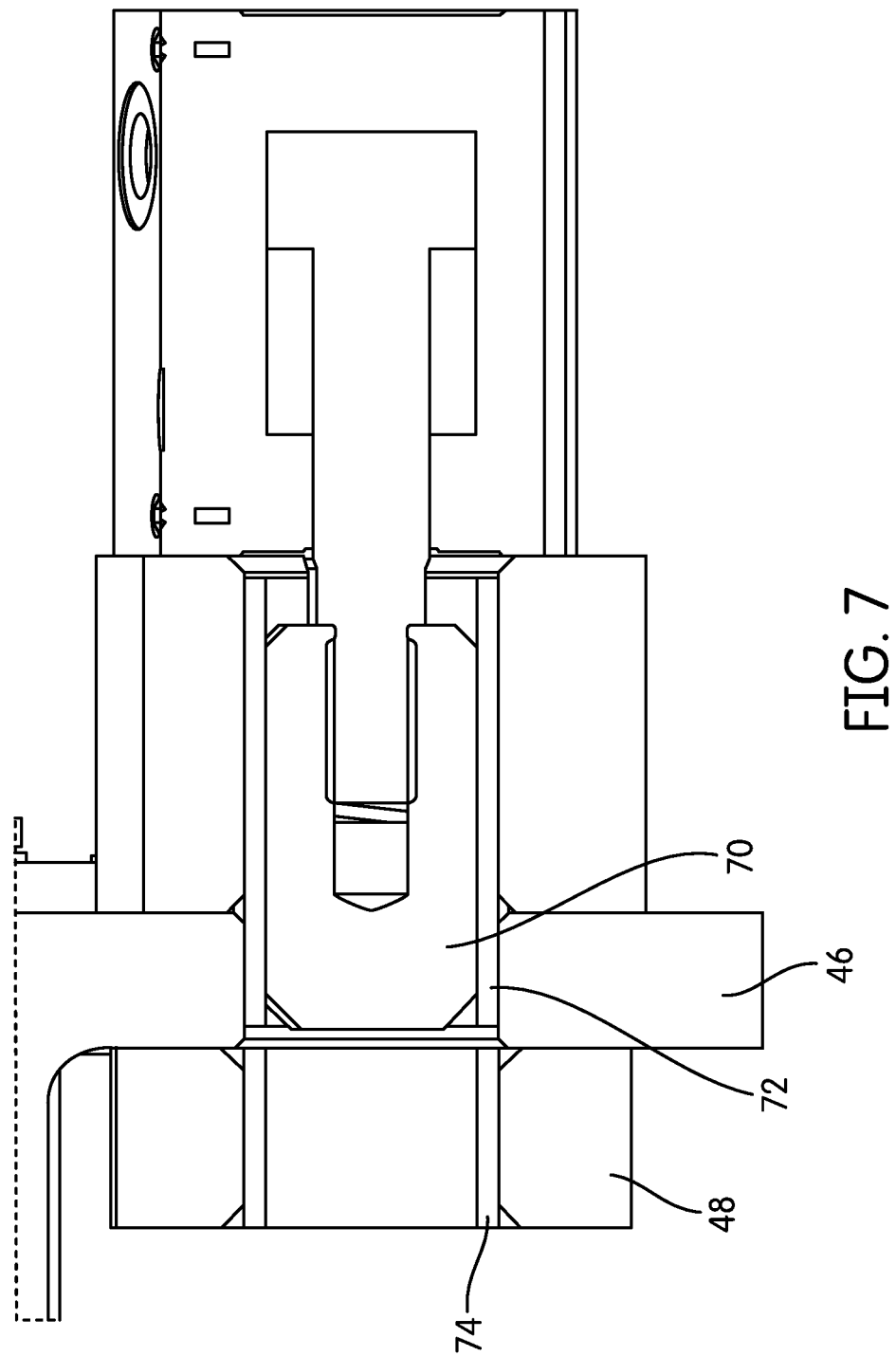
FIGS. 7 and 8 show cross-sectional views of a lock mechanism configured to lock pivotable/moveable portions of the pipe clamp in accordance with an embodiment of the present patent application, wherein the lock mechanism is in a released position in FIG. 7 and is in a locked position in FIG. 8.
Figure 8:
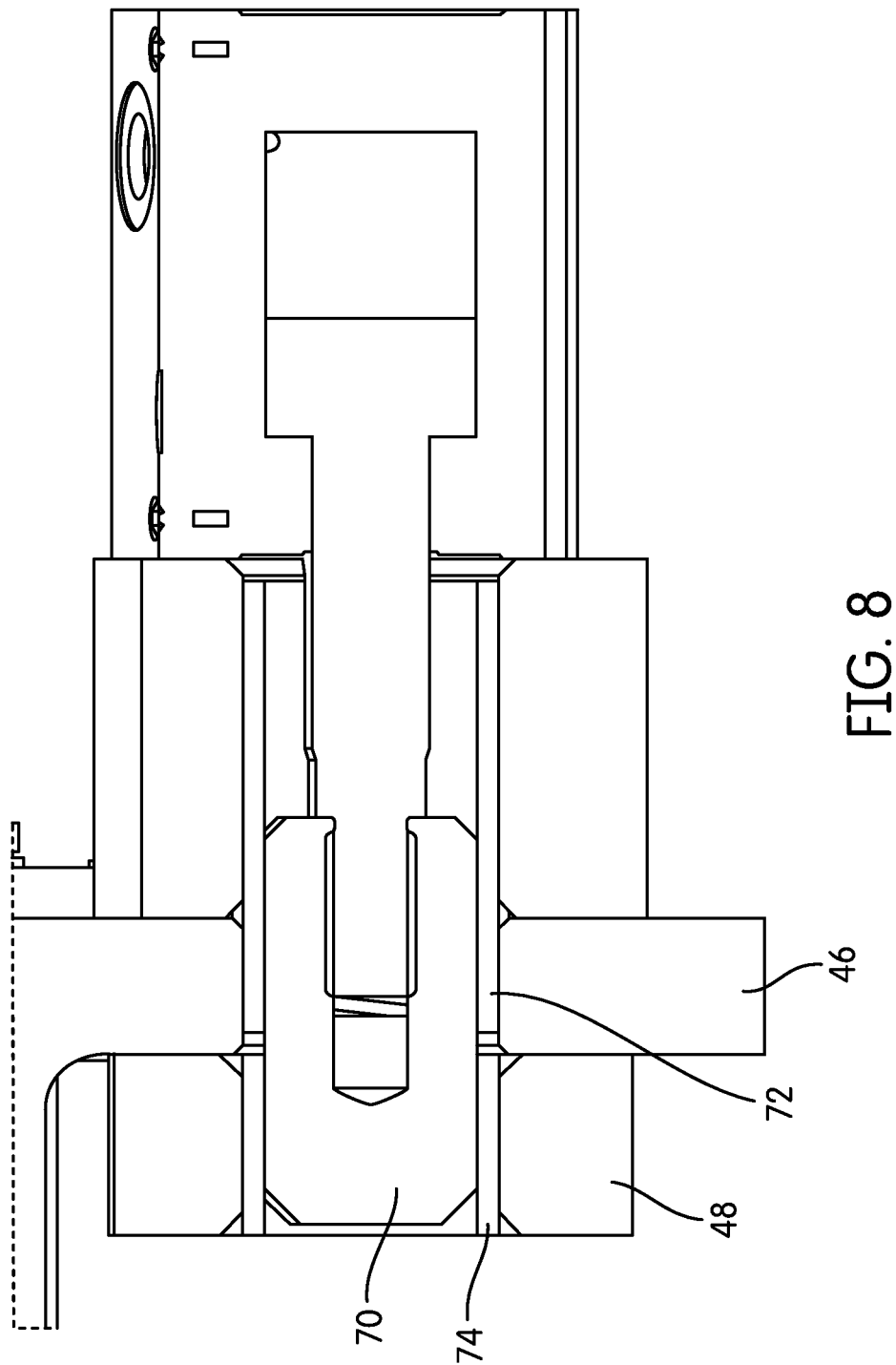

In one embodiment, large clamping forces act to open the two pivoting clamp segments 46 and 48 of the clamps. In one embodiment, each clamp may include a latch mechanism 100 that is configured to hold the clamp (i.e., its pivotable/moveable portions) in a closed position on a pipe. In one embodiment, two locking pins are used to hold the pivoting clamp segments 46 and 48 together. In another embodiment, at an interface where the two pivoting clamp segments 46 and 48 come into contact, the two pivoting clamp segments 46 and 48 overlap. There is a concentric hole through the two overlapping portions. In one embodiment, a moveable pin or lock member 70 is located in one 72 of the holes and is configured to be actuated to extend out from that hole 72 into the second hole 74 as shown in FIGS. 7 and 8. The moveable pin member 70 is in its retracted position in FIG. 7 and is in its extended position in FIG. 8.

In one embodiment, the actuation member 62 of the clamp is also divided into three segments. Each segment of the actuation member 62 corresponds to one of the three clamp housing segments 44, 46 and 48. In one embodiment, like the clamp housing segments 46 and 48, at the interface where the two pivoting actuation member segments come into contact, the two segments pivoting actuation member segments also overlap. In one embodiment, there is a concentric hole through the two overlapping portions.

Figure 9:
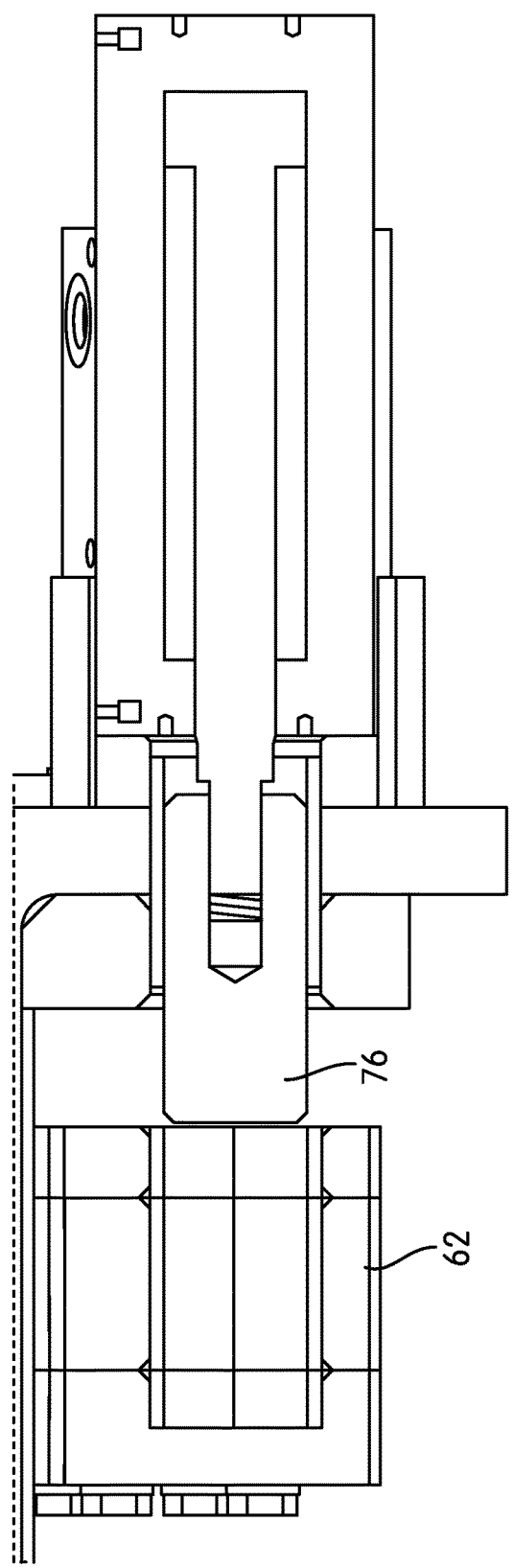
FIGS. 9, 10 and 11 show cross-sectional views of a lock mechanism configured to lock pivotable/moveable portions of the pipe clamp and the pivotable/moveable portions of the actuator in accordance with another embodiment of the present patent application, wherein the lock mechanism is in a released position in FIG. 9 and is in a locked position in FIGS. 10 and 11.
Figure 10:
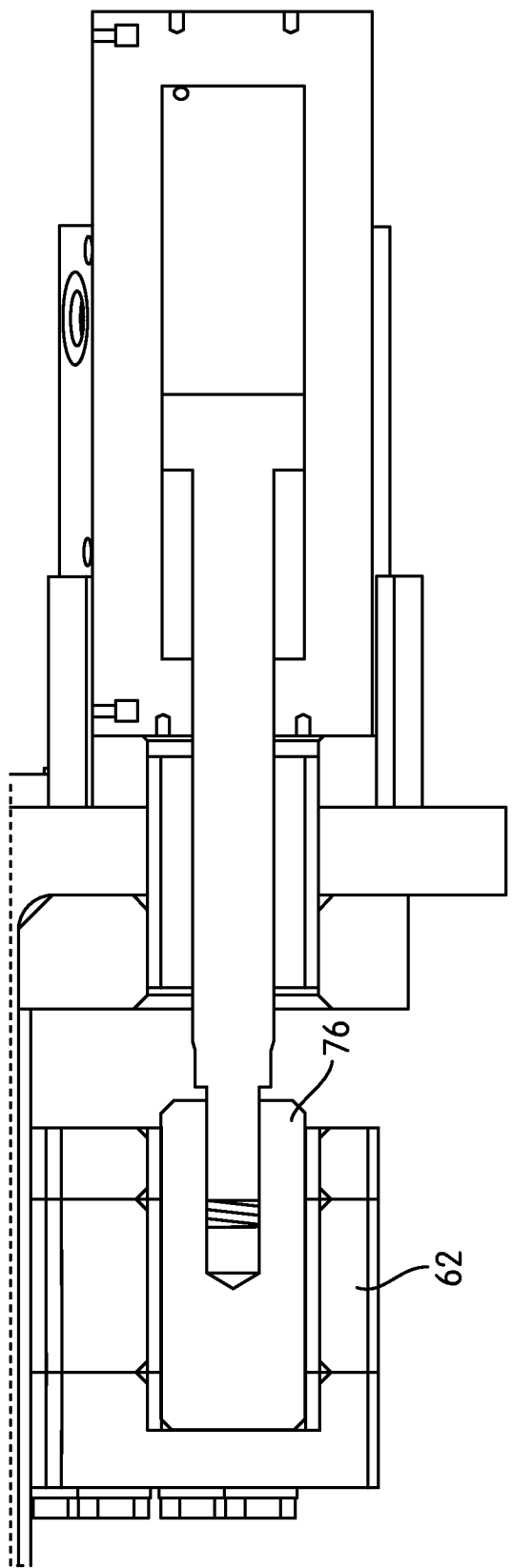
Figure 11:
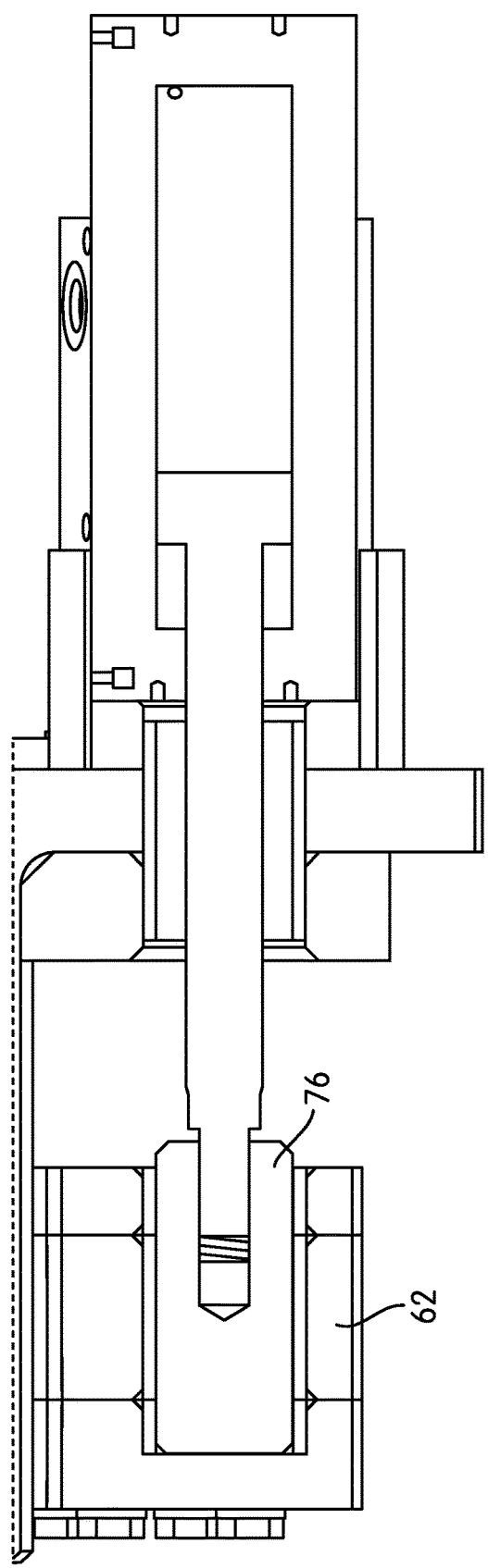

In one embodiment, referring to FIGS. 9-10, a moveable pin or lock member 76 is located such that when the clamp is closed, the moveable pin 76 may be actuated to pass through the holes in the overlapping portions. In one embodiment, the pin actuator may have additional travel remaining after the two actuation ring segments have been locked together by the pin member 76. This way, when the actuation member 62 is engaged, the pin member 76 can move with the actuation member 62. The moveable pin member 76 is in its retracted position in FIG. 9 and is in its extended position in FIG. 10. FIG. 10 shows the moveable pin member 76 in its extended position and the actuator member 62 in its non-engaged position and FIG. 11 shows the moveable pin member 76 in its extended position and the actuator member 62 in its engaged position. It can be clearly seen, comparing FIG. 10 with FIG. 11, that additional travel of the pin actuator remaining (in FIG. 10) after the two actuation ring segments have been locked together by the pin member 76. This additional remaining travel of the pin actuator remaining after the two actuation ring segments have been locked allows the pin member 76 to move with the actuation member 62 when the actuation member 62 is actuated from its retracted position to its engaged position.

FIGS. 12-17 show another embodiment of the clamp 16' or 18'. In one embodiment, the structure and operation of the clamp of FIGS. 12-17 are similar to those of the clamp of FIGS. 3-11, except for the differences noted below.

Figure 12:
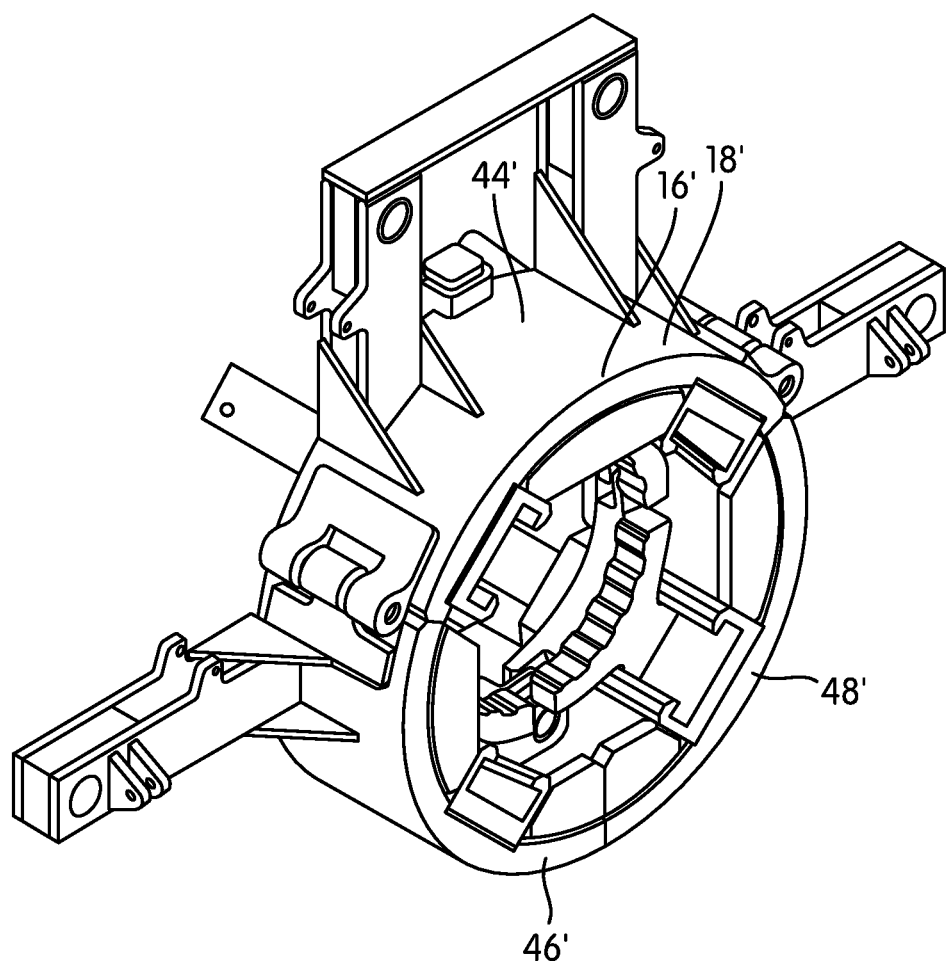
FIG. 12 shows a perspective view of one of two pipe clamps of the system in accordance with another embodiment of the present patent application, wherein the pipe clamp is in its closed position.
Figure 13:
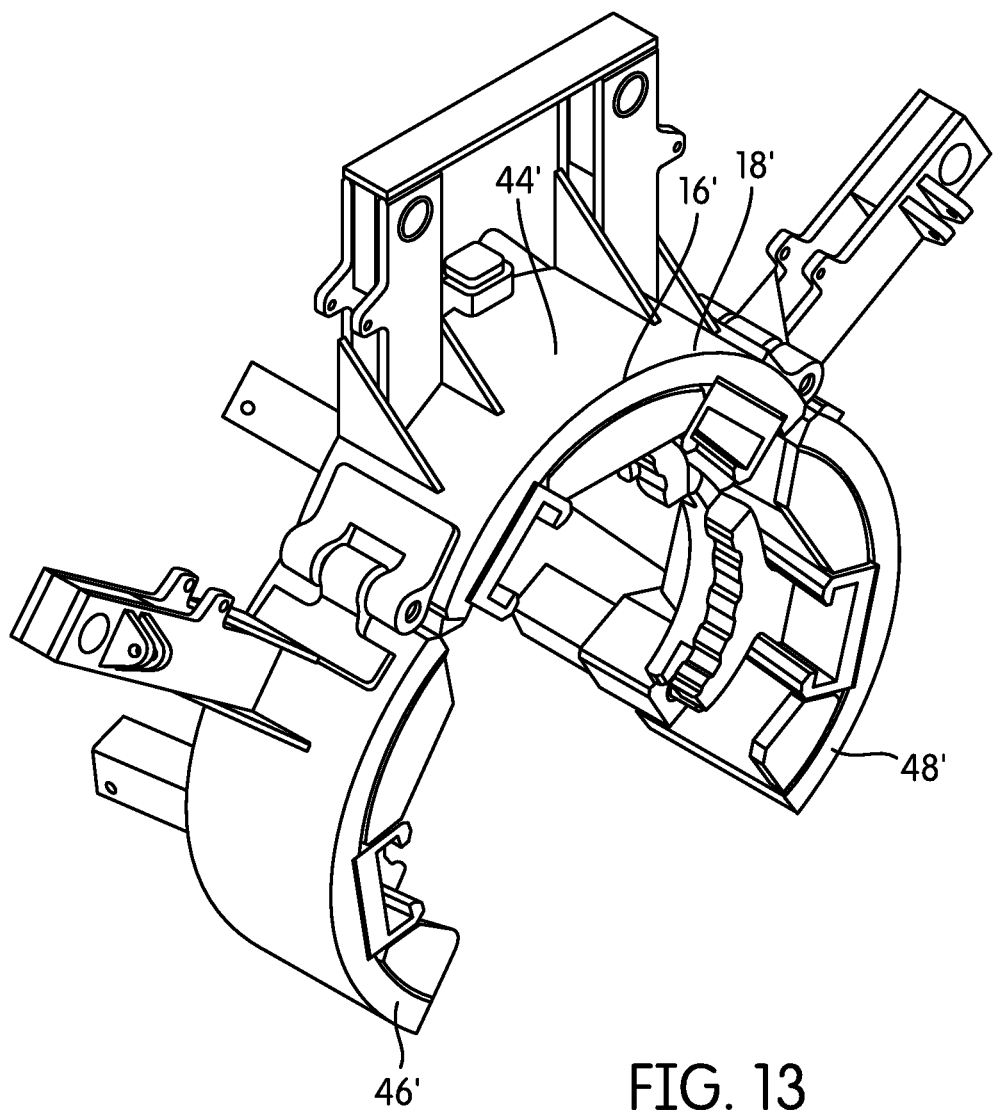
FIG. 13 shows a perspective view of the pipe clamp of FIG. 12 when it is in its open position.

The clamp 16' or 18' of FIGS. 12-17 is also divided into three portions: a top-fixed/non-pivoting portion 44', and two bottom, pivotable portions 46' and 48'. The two bottom, pivotable portions 46' and 48' are hinged so that the two bottom, pivotable portions 46' and 48' can swing open to allow the clamp to be placed on a pipe and removed from the pipe. In one embodiment, a linear actuator is used to control the position of each moveable/pivotable clamp portion. In one embodiment, the actuator is an electric actuator. FIG. 12 shows the two bottom, pivotable portions 46' and 48' of the clamp are in a closed (and locked) position, whereas FIG. 13 shows the two bottom, pivotable portions 46' and 48' of the clamp are in a swing opened position. That is, the two bottom, pivotable portions 46' and 48' of the clamp may be adapted to pivot radially outwardly so that the clamp may swing open to allow the pipe to be positioned under the non-pivotable portion 44'. When the pipe is in position, the two bottom, pivotable portions 46' and 48' of the clamp may be swung into a closed (and locked) position.

Figure 14:
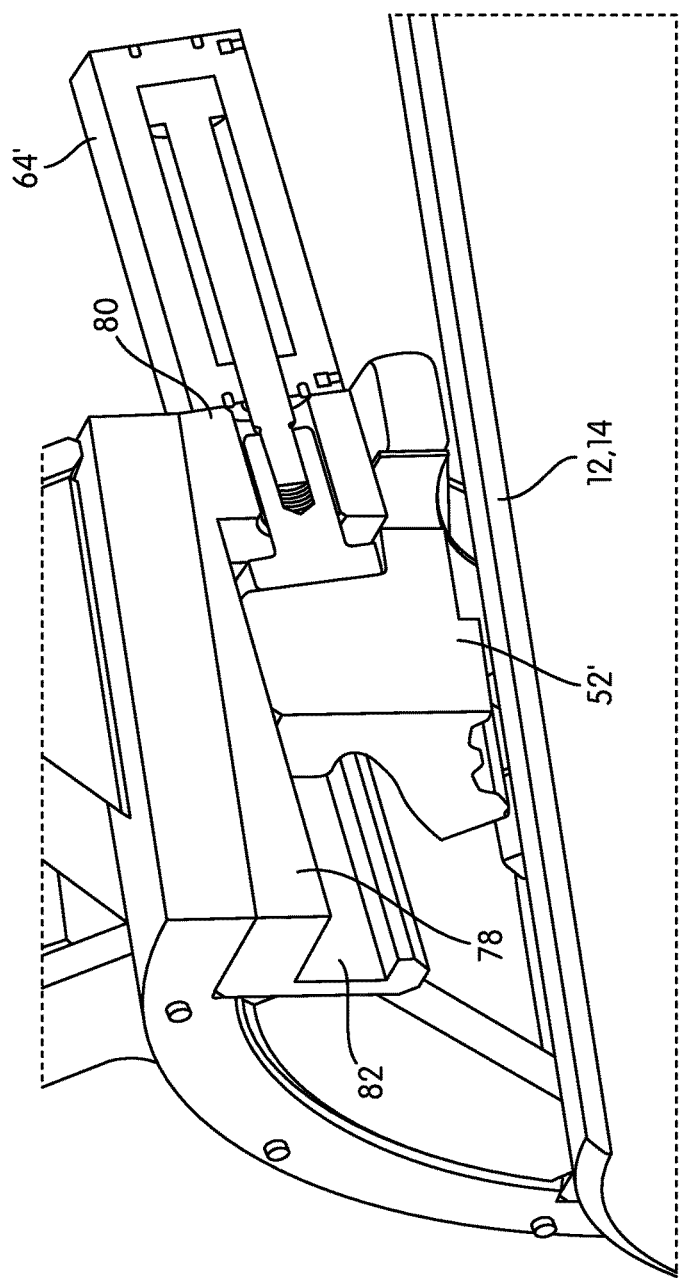
FIGS. 14 and 15 show partial cross-sectional views of the pipe clamp of FIG. 12, wherein actuator and clamp shoes are in their retracted positions in FIG. 14 and the actuator and the clamp shoes are in their extended positions in FIG. 15.
Figure 15:
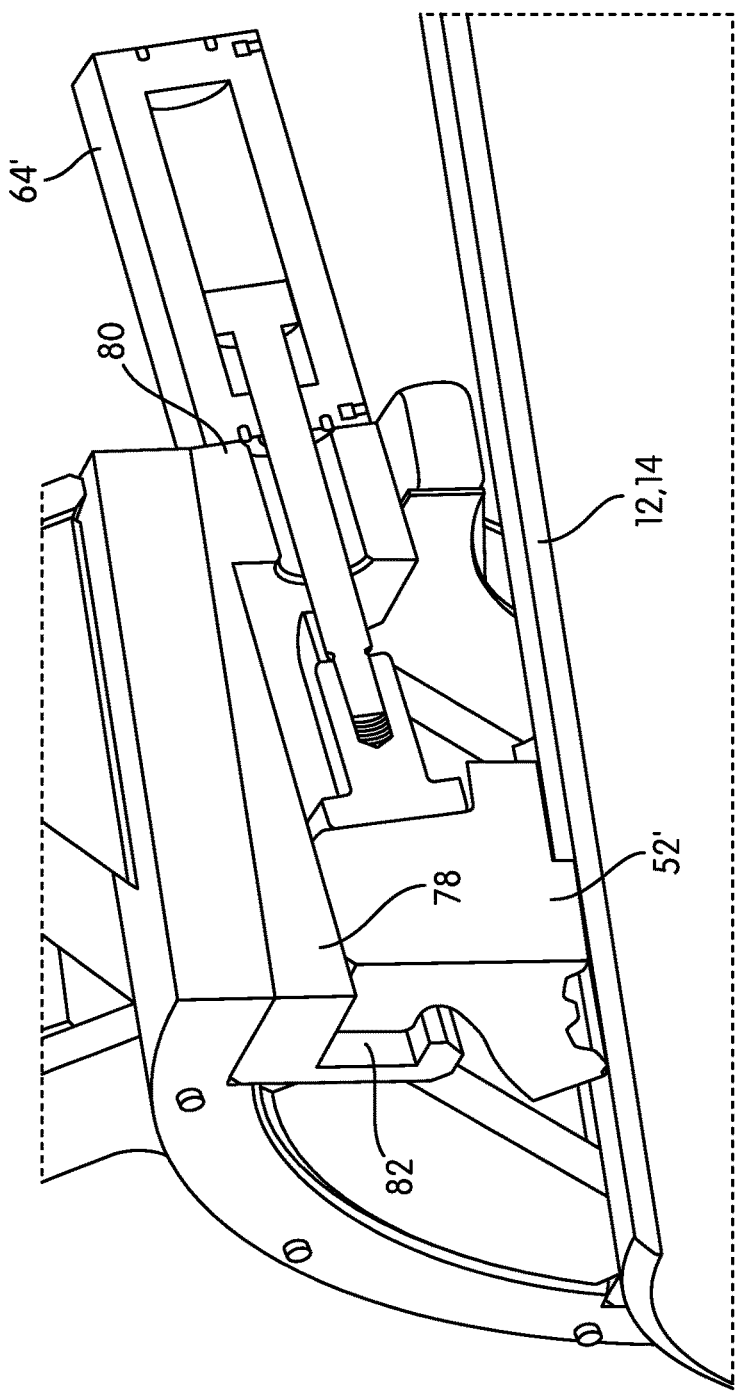
Figure 16:
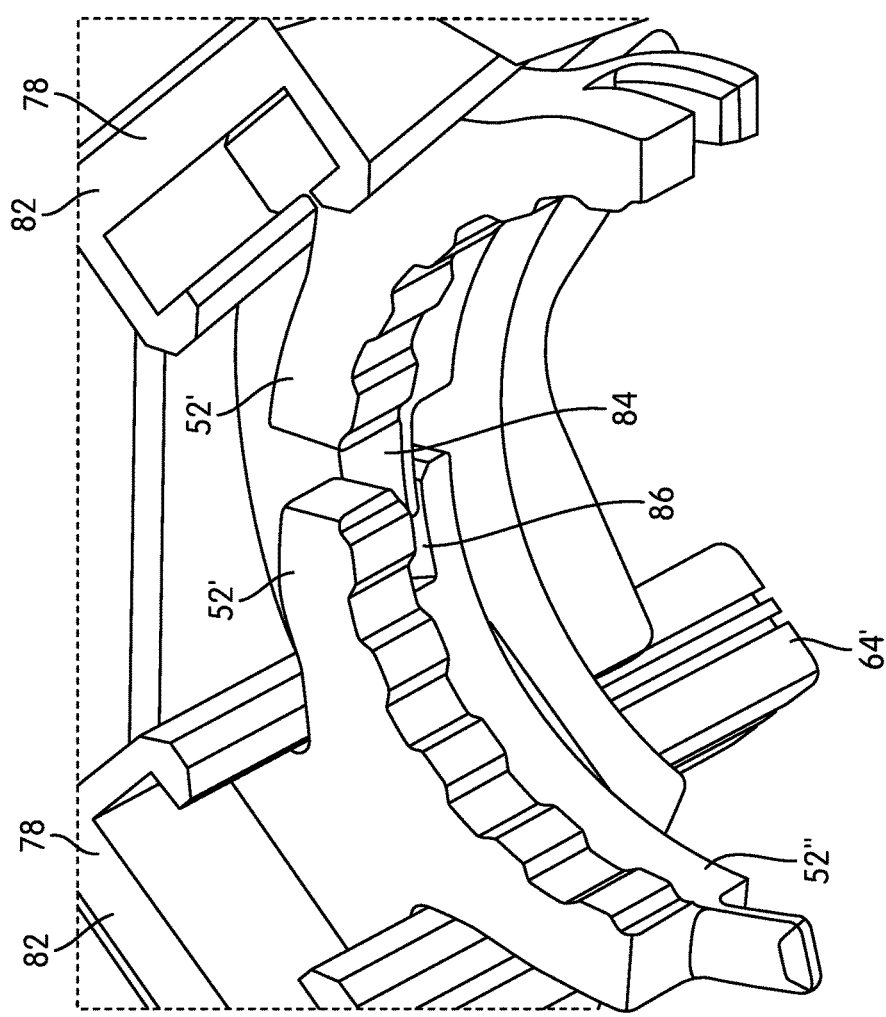
FIGS. 16 and 17 show partial cross-sectional views of the pipe clamp of FIG. 12, wherein an interlocking mechanism between the clamp shoes is shown in accordance with an embodiment of the present patent application.
Figure 17:
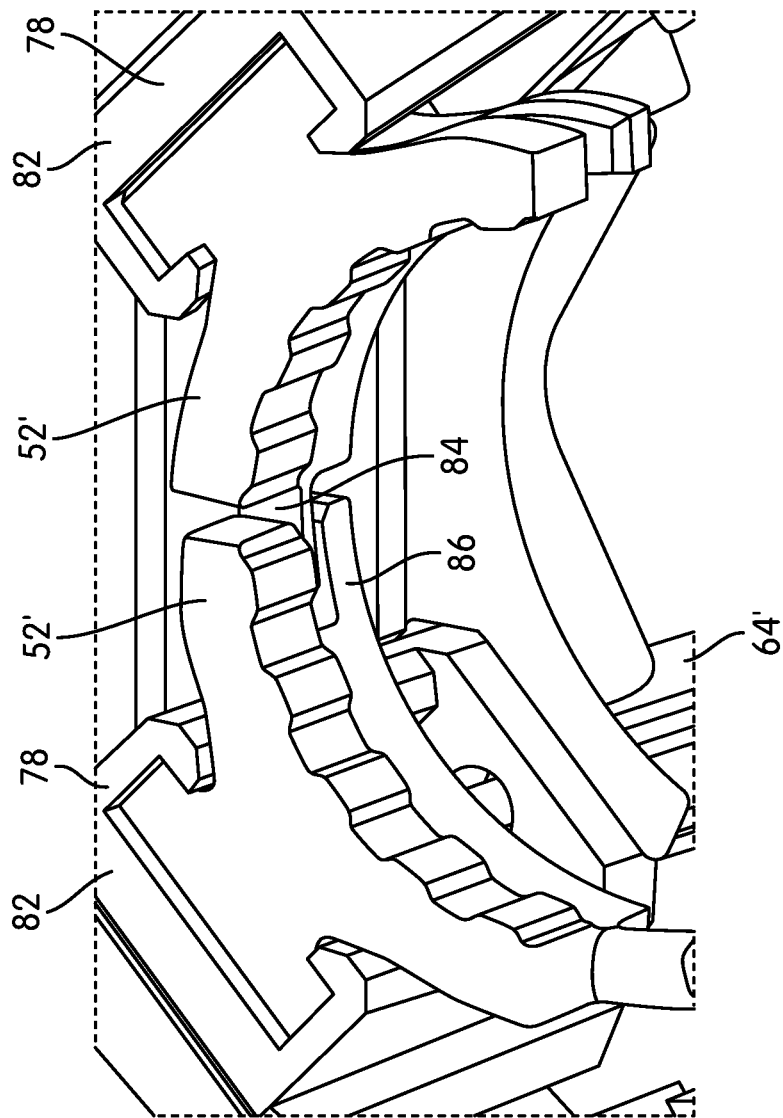

In one embodiment, the clamp 16' or 18' includes a plurality of clamp shoes 52' (e.g., 4 or more clamp shoes) to grip and shape the pipe. In one embodiment, the clamp shoes 52' are interchangeable for different size pipe. In one embodiment, each pipe size has a corresponding shoe size. In one embodiment, the clamp shoes 52' are mounted in angled guides 78. In one embodiment, the angled guides 78 are fixedly connected to the clamp housing. As shown in FIGS. 14 and 16, when the clamp shoe 52' is positioned at one end 80 of the angled guide 78, the clamp shoe 52' is in its retracted position. As shown in FIGS. 15 and 17, when the clamp shoe 52' is positioned at the other end 82 of the angled guide 78, the clamp shoe 52' is in its engaged position. The angled guide 78 is constructed and arranged to taper downwardly from the end 80 to the end 82. In one embodiment, each clamp shoe 52' is moved along its respective angled guide 78 between the end 80 and the end 82 by a linear actuator 64' (e.g., hydraulic, pneumatic, or electric).

In one embodiment, as shown in FIGS. 16 and 17, the clamp shoe 52' has interlocking features in order to ensure that all the clamp shoe 52' travel the same distance along their respective angled guides/tracks and, therefore, all the clamp shoe 52' are at the same distance from the center of the pipe. In one embodiment, this interlocking connection may also be referred to as "tongue and fork". In one embodiment, tongue 84 of clamp shoe 52' is configured to slide into an interlocking connection with fork 86 of an adjacent shoe 52" as the clamp shoes 52' are actuated and move closer together. In one embodiment, each clamp shoe 52" includes the tongue 84 on one end portion and the fork 86 on the other end portion.

In yet another embodiment, the clamp may be a sabre clamp. For example, such a sabre clamp is described in detail in U.S. Pat. No. 6,109,503, which is incorporated by reference in its entirety into the present patent application.

In one embodiment, the system 10 may also include a sensing system that is configured to monitor the clamp force generated by the clamp so that the clamp does not generate clamp force to crush the pipe or cause permanent deformation of the pipe. In another embodiment, the sensing system is optional.

In one embodiment, permanent deformation of the pipe may be avoided by limiting the pressure used to actuate the clamp. The pressure limit is a function of the pipe yield strength, the pipe diameter, and the pipe wall thickness. In one embodiment, the values for the pipe yield strength, the pipe diameter, and the pipe wall thickness are input into the one or more processors. The one or more processors are configured to process the received values for the pipe yield strength, the pipe diameter, and the pipe wall thickness and calculate the correct pressure value. This calculated pressure value may then be set as the pressure value in a pressure limiting device. In one embodiment, the pressure limiting device is configured to limit the pressure to the set pressure value to actuate the clamp.

In one embodiment, permanent deformation of the pipe may be avoided by stopping the clamp once all of the clamp shoes have made contact with the pipe. In order to do this, the one or more processors need to know when all of the clamp shoes have made contact with the pipe. In one embodiment, a contact sensor may be used to determine when all of the clamp shoes have made contact with the pipe.

In one embodiment, a non-contact sensor such as a proximity switch may be mounted to each clamp shoe. When the distance between the clamp shoe and the pipe stops changing, then the clamp shoe has made contact with the pipe. This constant value can be checked against the value recorded from previous clamping operations or a predetermined target value. This ensures that the clamp has indeed made contact and not run out of travel before making contact.

In one embodiment, a contact switch such as a single post double throw switch may be mounted to each clamp shoe. In one embodiment, the switch is configured to change state when the clamp shoe makes contact with the pipe.

In one embodiment, a direct load sensor such as a load cell or an indirect load sensor such as a strain gauge may be mounted to each clamping shoe. When all of the sensors report changing, non-zero values, then the clamp shoes have all made contact with the pipe.

In one embodiment, the system 10 includes one or more welding torches. In one embodiment, the weld torch(es) are configured to travel 180 degrees around the pipe, 360 degrees around the pipe, 720 degrees around the pipe, or 1080 degrees around the pipe. In one embodiment, the weld torch may be configured to have additional travel to ensure that the start and end of the weld overlap. In one embodiment, the weld torch may be configured to have additional travel to cover the distance between the joint sensing laser and the weld torch.

In one embodiment, the weld torch 20 is configured to apply multiple, overlapping weld passes without stopping and restarting. In one embodiment, the weld torch 20 is configured to perform multiple weld processes including, but not limited to, Surface Tension Transfer (STT), Metal Inert Gas (MIG), Pulse MIG, Tungsten Inert Gas (TIG), Cold Metal Transfer (CMT), Pulse Multi Control (PMC), and Low Splatter Control (LSC).

Figure 18:
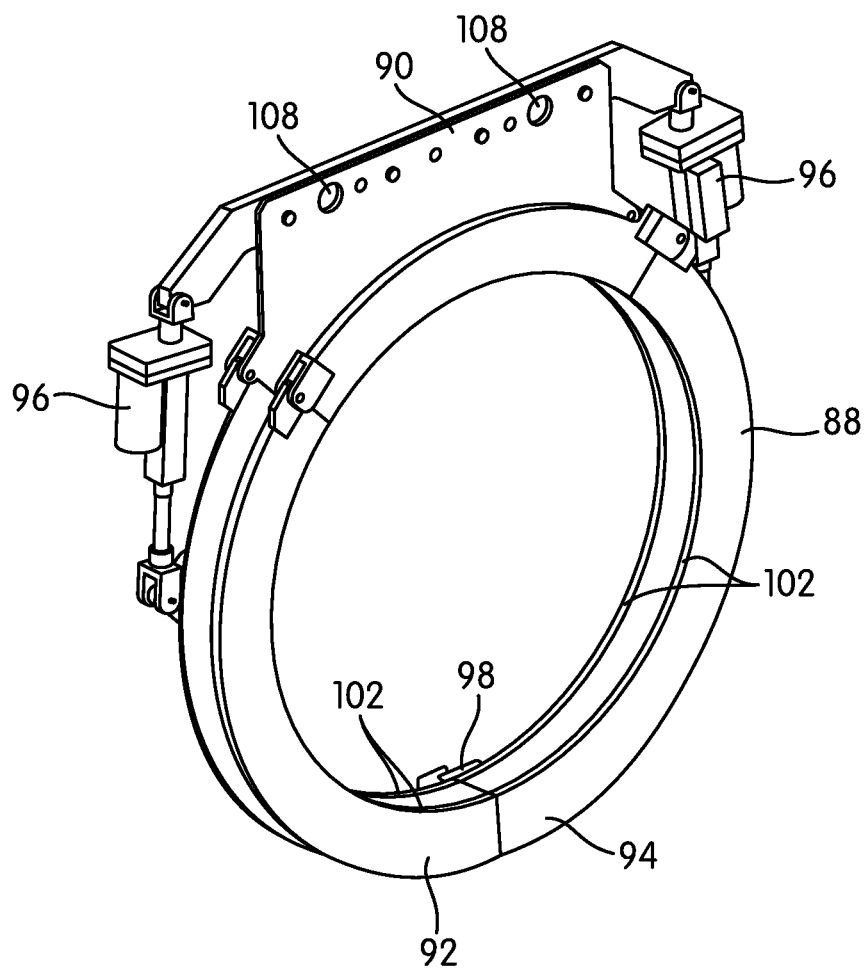
FIGS. 18 and 19 show a weld torch mounting system, wherein the weld torch mounting system is in its closed position in FIG. 18 and the weld torch mounting system is in its open position in FIG. 19.
Figure 19:
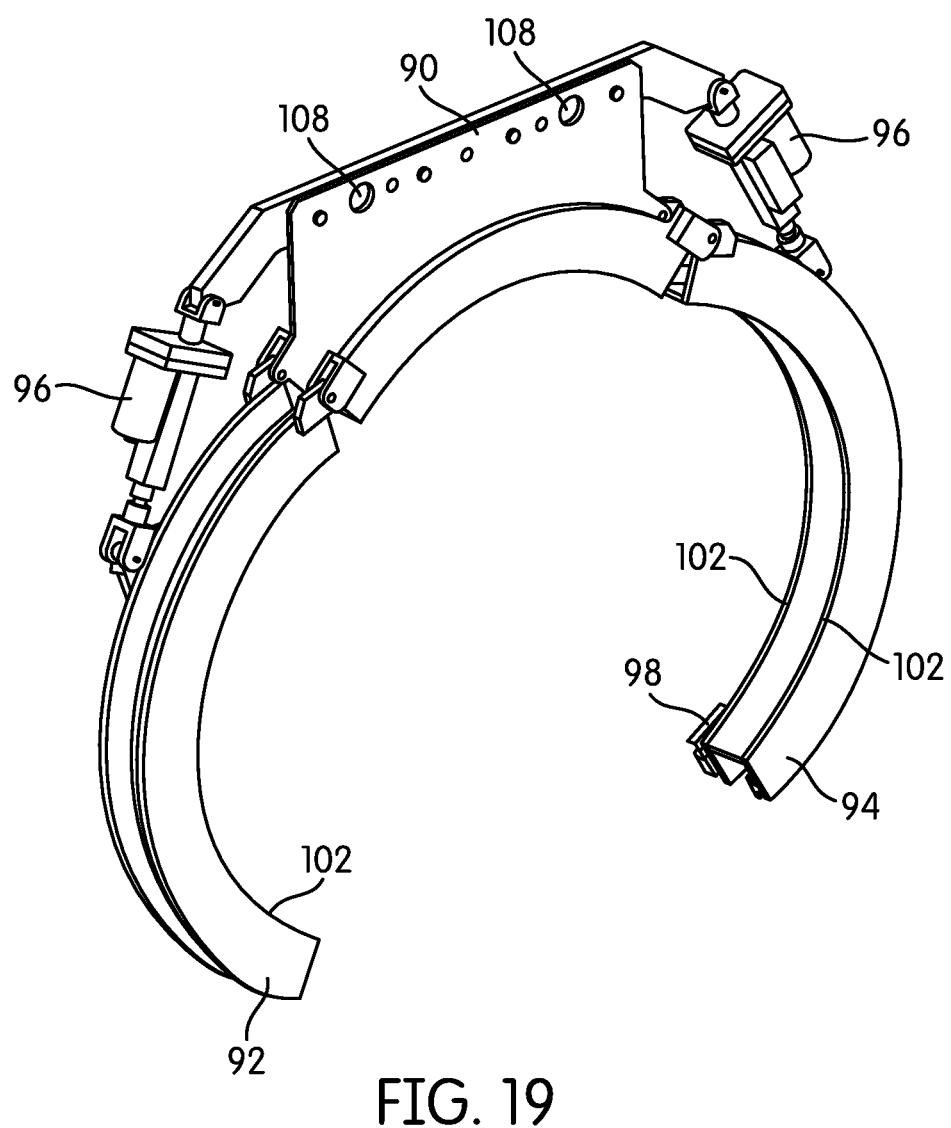

In one embodiment, the weld torch 20 is configured to be mounted to the circular guide track member 88 as shown in FIGS. 18 and 19. The guide track member 88 is configured to be placed/disposed around one of the first pipe clamp 16 and the second pipe clamp 18 such that the weld torch 20 is located between of the first pipe clamp 16 and the second pipe clamp 18 and in-line with the interface region 38 between the pipes 12 and 14 and/or the weld joint 36 to be welded.

In one embodiment, the guide track member 88 is divided into three portions: a top, fixed/non-pivotable portion 90, and two bottom pivotable portions 92 and 94. The two bottom or side pivotable portions 92 and 94 are configured to be hingedly/pivotably connected to the top, fixed/non-pivotable portion 90 such that the two pivotable portions 92 and 94 can swing open to allow the guide track member 88 (along with the inspection detector 22 and the weld torch 20) to be placed on a pipe and removed from a pipe. In one embodiment, linear actuators 96 may be used to control the position of each moveable clamp segment 92 and 94. In one embodiment, an electric, a mechanical, a hydraulic, a pneumatic, or any other type of linear actuator may be used.

In one embodiment, the guide track member 88 also includes a latch mechanism 98 that is configured to hold the guide track member 88 in a closed position on the pipe. In one embodiment, the structure and the configuration of the latch mechanism may be similar to the latch mechanism 100 as shown in and described with respect to FIGS. 7 and 8. In another embodiment, the latch mechanism 98 may have any other structure and/or configuration as would be appreciated by one skilled in the art.

In one embodiment, as shown in FIG. 1, an inner diameter of the guide track member 88 is configured and sized such that inner surfaces 102 of the guide track member 88 are positioned around outer surfaces 104 of a portion 106 of the clamp 16 or 18. In one embodiment, the guide track member 88 includes two openings 108 on its fixed/non-pivotable portion 90. In one embodiment, the two openings 108 are configured to receive the guide rods 40a and 40b therethrough. In one embodiment, once the system 10 is positioned on the pipes 12, 14, the guide track member 88 is configured to be locked with respect to its associated clamp (on which the guide track member 88 is mounted on) such that there is no axial movement of the guide track member 88 with respect to its associated clamp.

FIG. 18 shows the two bottom, pivotable portions 92 and 94 of the guide track member 88 are in a closed (and locked) position, whereas FIG. 19 shows the two bottom, pivotable portions 92 and 94 of the guide track member 88 are in a swing opened position. That is, the two bottom, pivotable portions 92 and 94 of the guide track member 88 may be adapted to pivot radially outwardly so that the guide track member 88 may swing open to allow the pipe to be positioned under the non-pivotable portion. When the pipe is in position, the two bottom, pivotable portions 92 and 94 of the guide track member 88 may be swung into a locked position.

Figure 20:
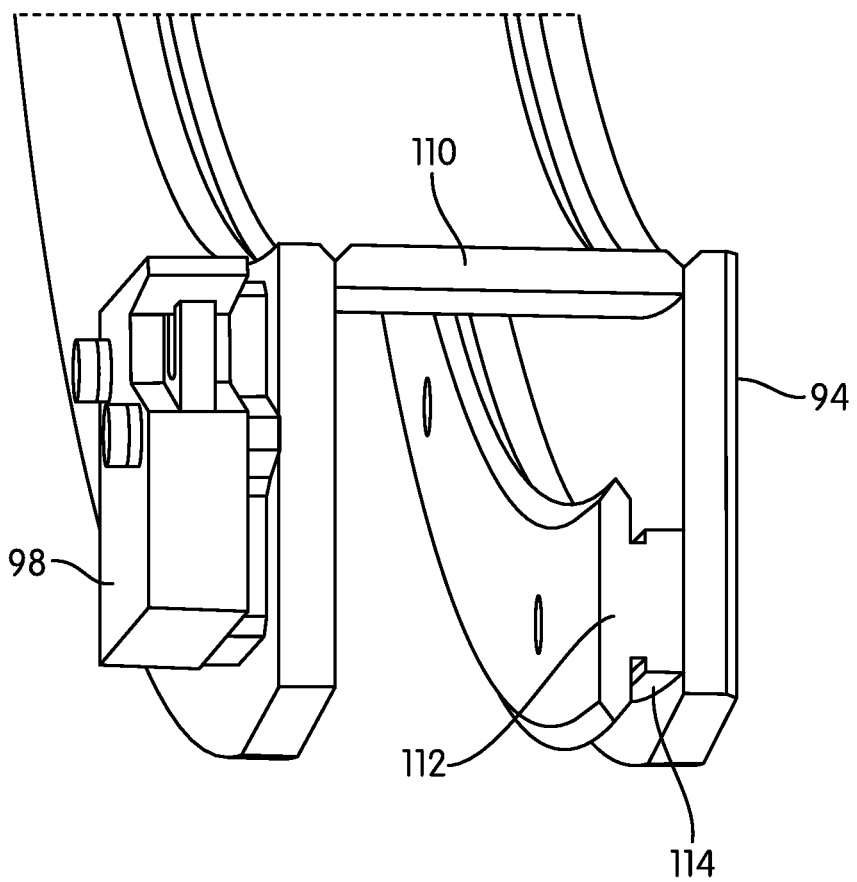
FIG. 20 shows a partial perspective view of the weld torch mounting system of FIG. 18.

In one embodiment, referring to FIG. 20, the guide track member 88 includes a U-shaped channel 110 configuration. In one embodiment, a curved rail 112 with integrated gear rack 114 (teeth are not shown) is mounted inside the U-shaped channel 110 of the guide track member 88. In one embodiment, the guide track member 88 also includes an absolute encoder that is configured to determine the exact positions of all the modules (the weld torch module 126

(including the weld torch 20), the grinder module (including the grinder 30), and the inspection module (including the inspection detector 22 and/or the inspection camera 182)) traveling on the guide track member 88 at all times. In one embodiment, the absolute encoder is built-in to the guide track member 88. In one embodiment, the encoder is optional.

In one embodiment, the weld torch 20 may include one or more absolute position encoders. In one embodiment, the absolute position encoders are configured to determine the position and/or orientation of the weld torch 20 along each of the three mutually perpendicular axes (e.g., X-axis, Y-axis, and Z-axis). In one embodiment, the weld torch 20 may include three absolute position encoders, each configured to determine the position and/or orientation of the weld torch 20 along one of the three mutually perpendicular axes (e.g., X-axis, Y-axis, and Z-axis).

In one embodiment, the system 10 further comprises one or more weld torch motors. In one embodiment, the one or more processors 26 of the system 10 is configured to control the one or more weld torch motors to control a position and/or an orientation of the weld torch 20.

In one embodiment, the weld torch 20 is operatively connected to a torch motor. In one embodiment, the torch motor is operatively connected to the one or more processors to control the movement of the weld torch 20 along the weld joint during a weld operation. In one embodiment, a torch motor is described in detail in International Patent Application No. PCT/US2015/062558, filed Nov. 24, 2015, which is incorporated by reference in its entirety into the present patent application.

In one embodiment, one or more processors 26 are also configured to interact with the inspection detector 22 and/or inspection camera 182 to scan the interface region between the pipes 12, 14 to determine the profile of the interface region between the pipes 12, 14 prior to, during and subsequent to the weld procedure, to generate pre-weld profile data, on-the-fly weld profile data, and post-weld profile data based on the scanned data, and to control the external weld system and/or its operation based on the generated pre-weld profile data, on-the-fly weld profile data, or post-weld profile data.

In one embodiment, the pre-weld inspection, the on-the-fly inspection and the post-weld inspection may be performed by the inspection detector. In another embodiment, the pre-weld inspection, the on-the-fly inspection and the post-weld inspection may be performed by the inspection detector 22 and the inspection camera 182.

In various embodiments, the "pre-weld" profile data described herein refers to data obtained from the inspection detector (e.g., such as by an inspection laser) that has scanned the interface region between two pipes to be welded before the weld torch has been activated to commence securing the pipes to one another. This pre-weld profile data is communicated to the one or more processors to determine whether the pipes are sufficiently aligned prior to any weld material being deposited to the interface region. In one embodiment, if misalignment is detected, e.g., by a determination by the one or more processors that the misalignment is outside an acceptable misalignment value, the one or more processors are configured to send signals to the clamps that engage with the exterior surfaces of the pipes. The clamping force of one or both of the clamps can be adjusted based on output signals from the pre-weld profile data to adjust relative shapes of the pipes to bring the alignment of the interface region within an acceptable misalignment value.

It should be appreciated that, given slight inconsistencies in the pipe structures, absolutely perfect alignment is often (and typically) not achieved. Nevertheless, such perfect alignment is unnecessary so long as the alignment is within a tolerance range suitable for a good weld.

In one embodiment, the pre-weld profile data may include pipe ovality/roundness data. In one embodiment, the pipe ovality/roundness data may include location and size of minimum diameter, location and size of maximum diameter, pipe average diameter, pipe average wall thickness, location and size of minimum wall thickness, and/or location and size of maximum wall thickness. In one embodiment, the pipe ovality/roundness data may include a comparison between each of location and size of minimum diameter, location and size of maximum diameter, location and size of minimum wall thickness, and location and size of maximum wall thickness, and their respective predetermined values. In one embodiment, the pipe ovality/roundness data may include a comparison between each of pipe average diameter and pipe average wall thickness, and their respective predetermined values. In one embodiment, the pipe ovality/roundness data may include diameter deviations of the pipe at all locations on the circumference of the pipe based on the comparison.

In one embodiment, the pre-weld profile data may include pipe bevel profile data. In one embodiment, the pipe bevel profile data may include pipe bevel geometry. In one embodiment, the pipe bevel profile data may include a comparison between each of size and shape of the pipe bevel, root face (land) thickness of the pipe bevel, bevel angle of the pipe bevel, offset of the pipe bevel, and root angle of the pipe bevel, and their respective predetermined values. In one embodiment, the pipe bevel profile data may include pipe bevel deviations of the pipe at all locations on the circumference of the pipe based on the comparison.

In one embodiment, the pre-weld profile data may include weld joint fit-up and alignment data. In one embodiment, the weld joint fit-up and alignment data may include data on the gap between internal adjoining ends of the pipes (after pipe alignment). In one embodiment, the weld joint fit-up and alignment data may include data on the gap between bevels of the pipes (after pipe alignment). In one embodiment, the weld joint fit-up and alignment data may include location and size of minimum gap, location and size of maximum gap, and/or average gap. In one embodiment, the weld joint fit-up and alignment data may include a comparison between each of location and size of minimum gap, and location and size of maximum gap, and their respective predetermined values. In one embodiment, the weld joint fit-up and alignment data may include a comparison between average gap and its respective predetermined value. In one embodiment, the weld joint fit-up and alignment data may include gap deviations of the pipes at all locations on the circumference of the pipes based on the comparison. In one embodiment, the weld joint fit-up and alignment data may include the minimal differences in height between the pipes (e.g., what is acceptable alignment), etc.

In one embodiment, the one or more processors are configured to interact with the inspection detector to scan the interface region between the pipes to determine the profile of the interface region between the pipes during a welding procedure, at a region of the interface prior to weld material being deposited thereon, and generate on-the-fly profile data. In one embodiment, the one or more processors are configured to generate weld signals to control the weld torch based on the on-the-fly profile data. The on-the-fly profile data is described in detail below. The term "on-the-fly" as used herein also means or refers to "real-time," meaning that the sensing or detection is used by the one or more processors during a current welding operation to control the welder. Of course, because the weld torch trails the inspection detector/inspection laser by a defined distance, some buffering (or slight time delay) takes place between the receipt of the profile data, and the use of such by the one or more processors to control the weld torch.

In one embodiment, the one or more processors are configured to interact with the inspection detector 22 and/or inspection camera 182 to determine the profile of the interface region and/or the weld joint subsequent to a welding operation.

In one embodiment, the post-weld profile data may include profile(s) of the formed weld beads. In one embodiment, the post-weld profile data may include profile(s) of the formed root pass weld layer. In one embodiment, the post-weld profile data may include weld shape characteristics such as mismatch, bead concavity, and the re-entrant angle. In one embodiment, the one or more processors are configured to cause, based on the post-weld profile data, another weld operation to be performed on the interface region between the pipes. In one embodiment, a repair procedure is configured to repair any weld defects that are detected during the post-weld inspection procedure. The weld repair procedure noted herein can be one of a variety of types. In one embodiment, an additional welding operation is performed on top of the previous weld to remedy any weld defect. In another embodiment, the defective weld may be ground down by the grinder 30 or optionally entirely cut out (manually or automatically) before any subsequent repair welding operation is conducted.

In one embodiment, the inspection data from the inspection detector may be communicated in real-time to the one or more processors which use the inspection data to send updated welding parameters to the external weld system.

Figure 21:
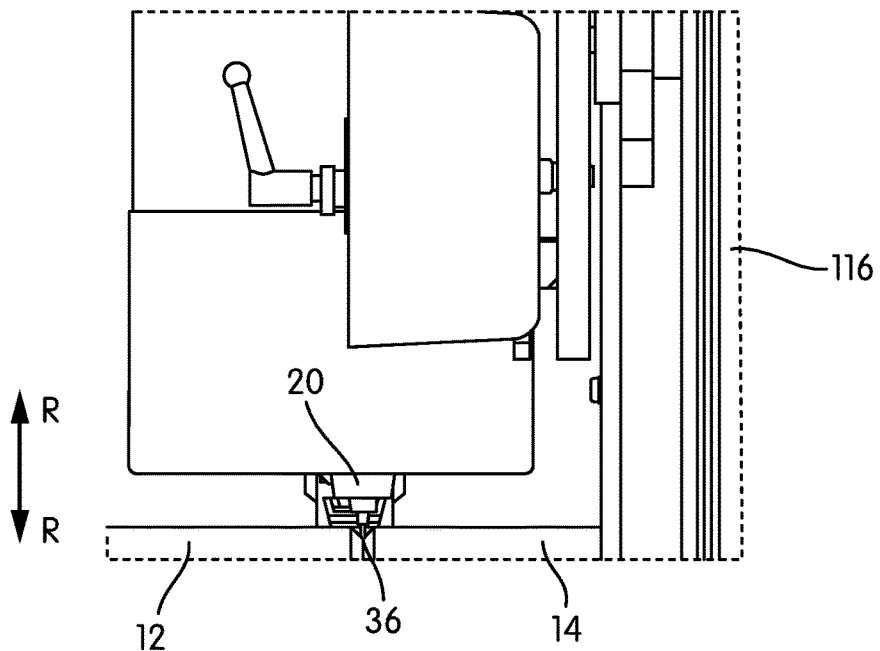
FIG. 21 shows the weld torch in a weld position in accordance with an embodiment of the present patent application.
Figure 22:
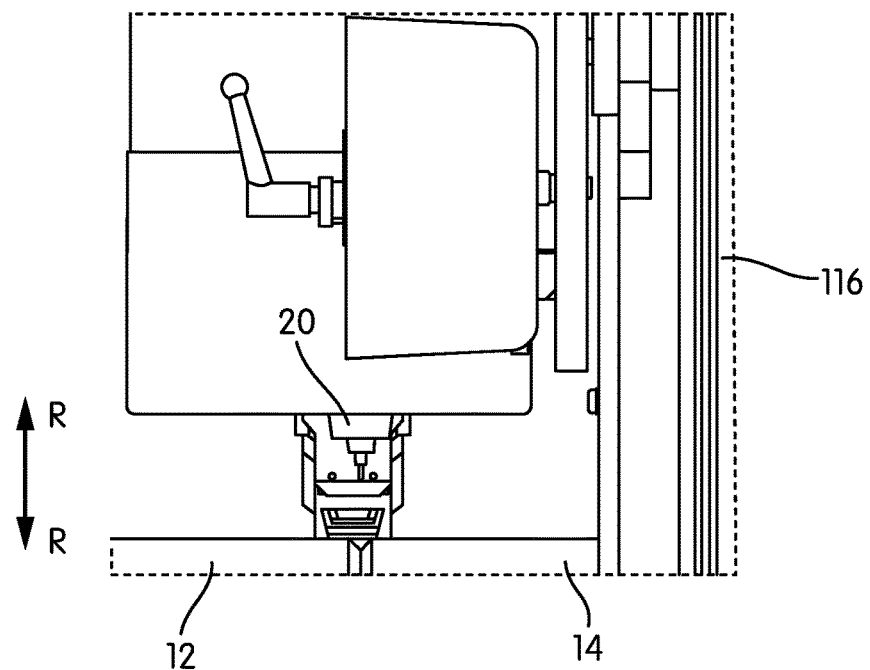
FIG. 22 shows the weld torch being positioned radially away from the pipes in accordance with an embodiment of the present patent application.
Figure 23:
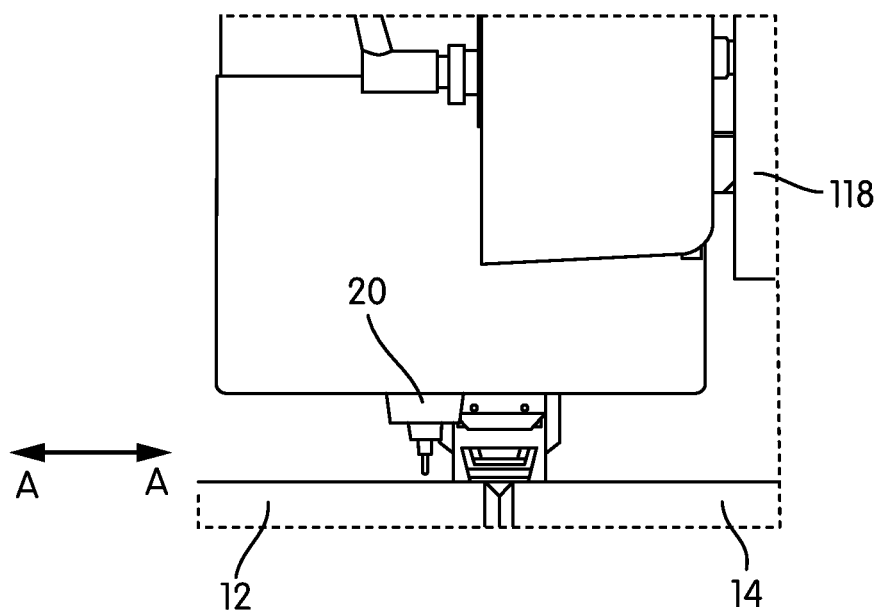
FIG. 23 shows the weld torch in a leftmost axial position in accordance with an embodiment of the present patent application.
Figure 24:
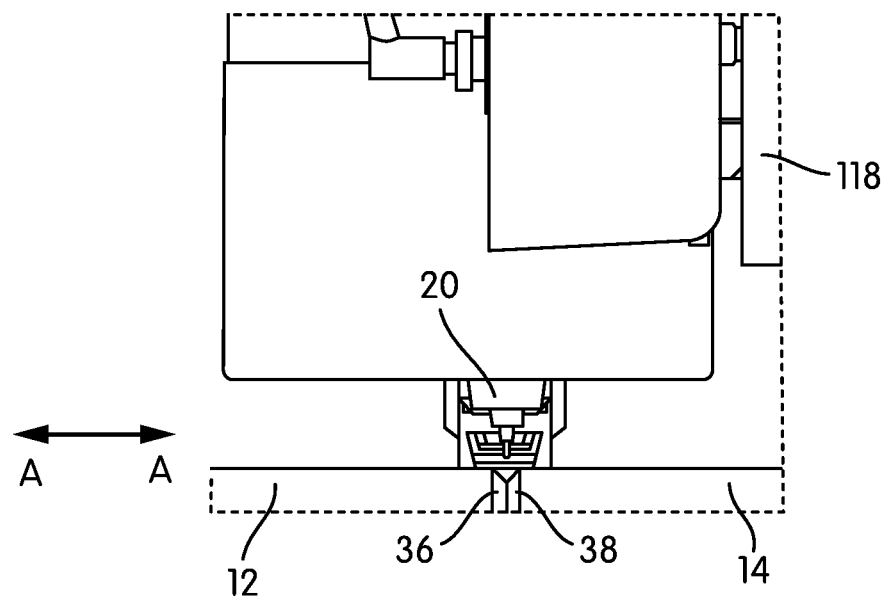
FIG. 24 shows the weld torch in a weld position in accordance with an embodiment of the present patent application.
Figure 25:
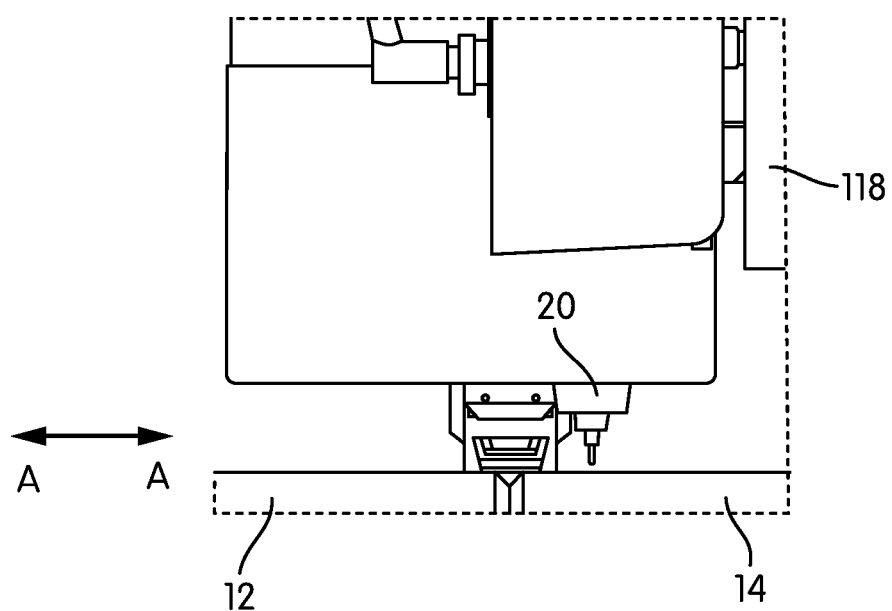
FIG. 25 shows the weld torch in a rightmost axial position in accordance with an embodiment of the present patent application.
Figure 26:
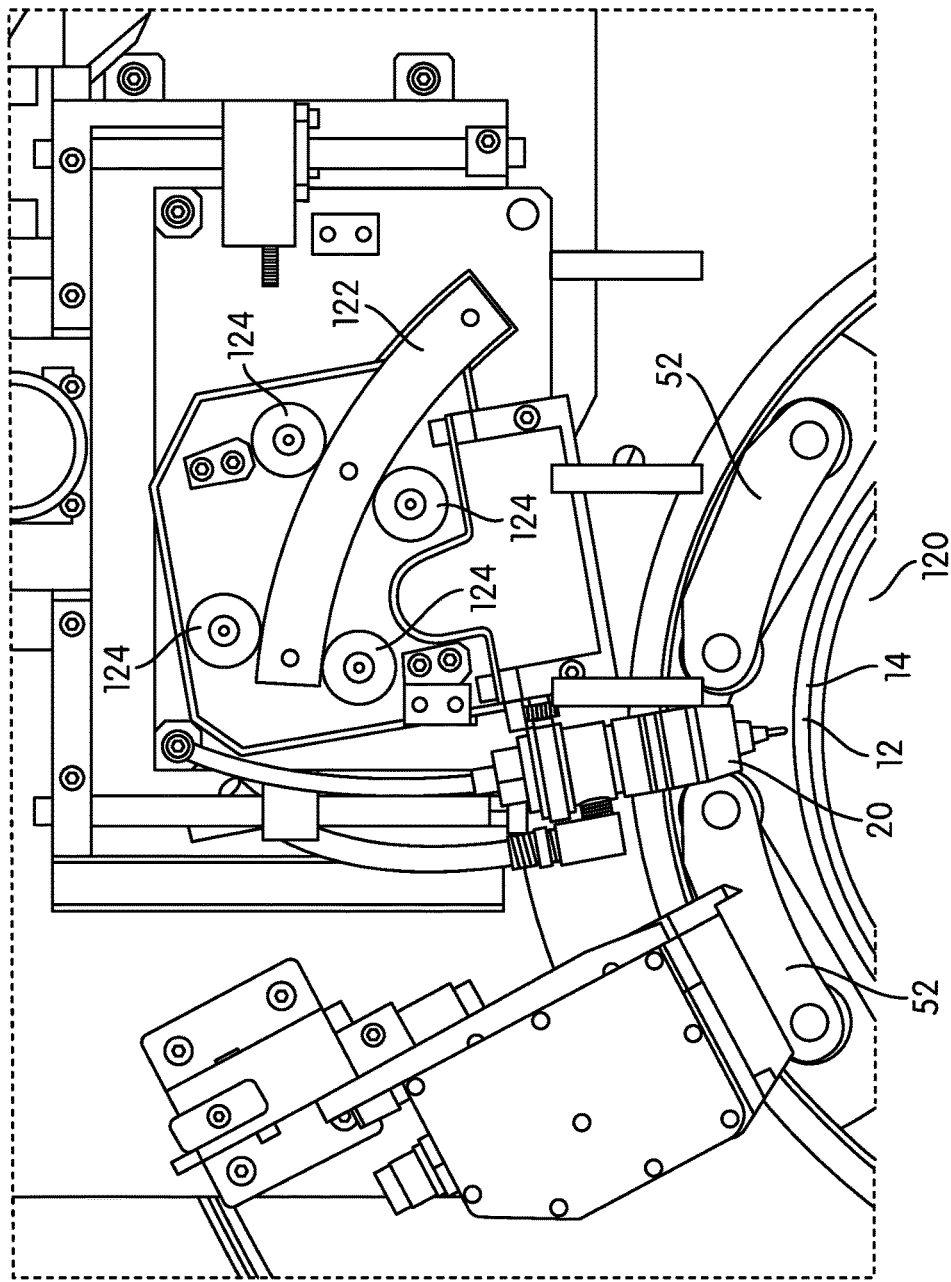
FIG. 26 shows the weld torch in a left tilt position in accordance with an embodiment of the present patent application.
Figure 27:
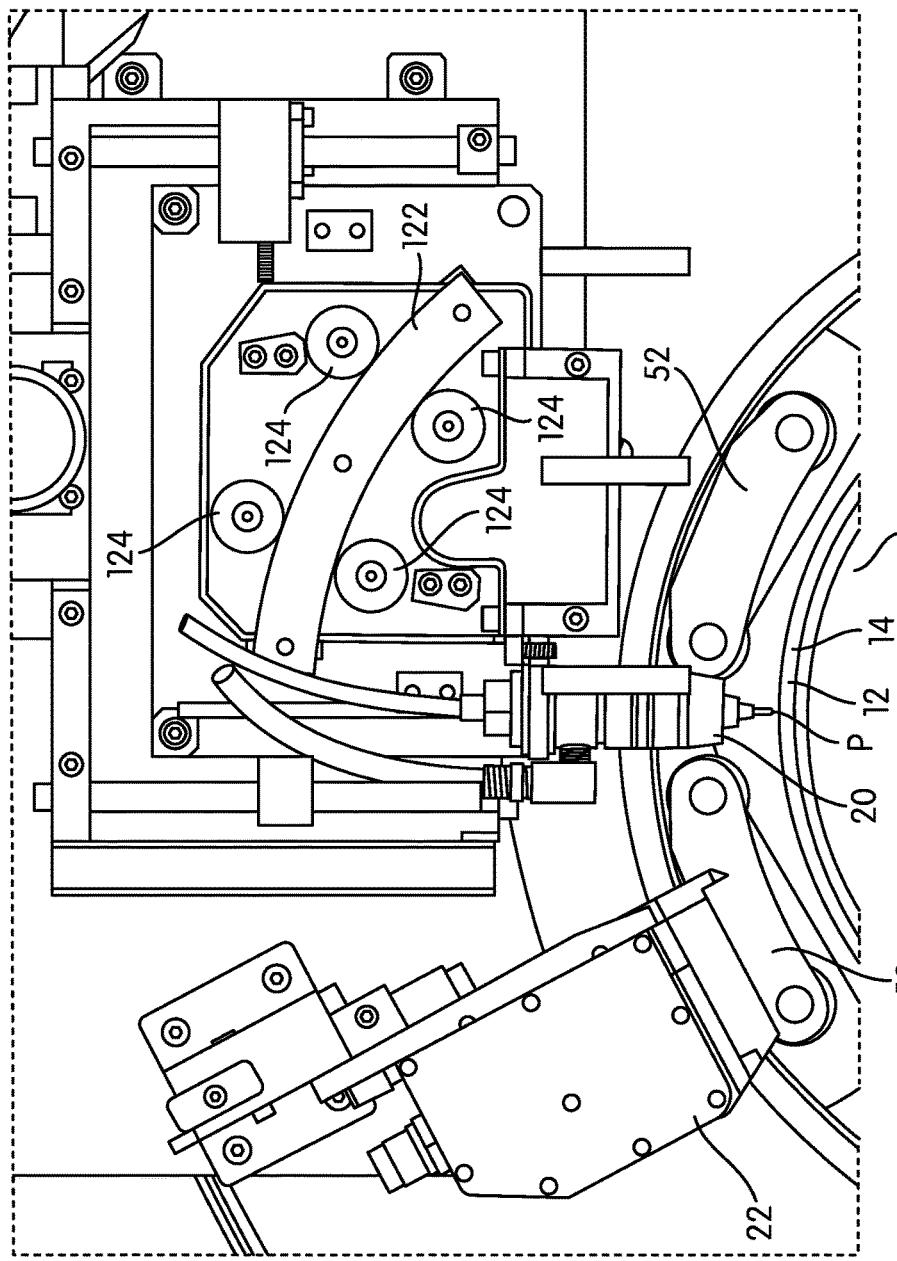
FIG. 27 shows the weld torch in a weld position in accordance with an embodiment of the present patent application.
Figure 28:
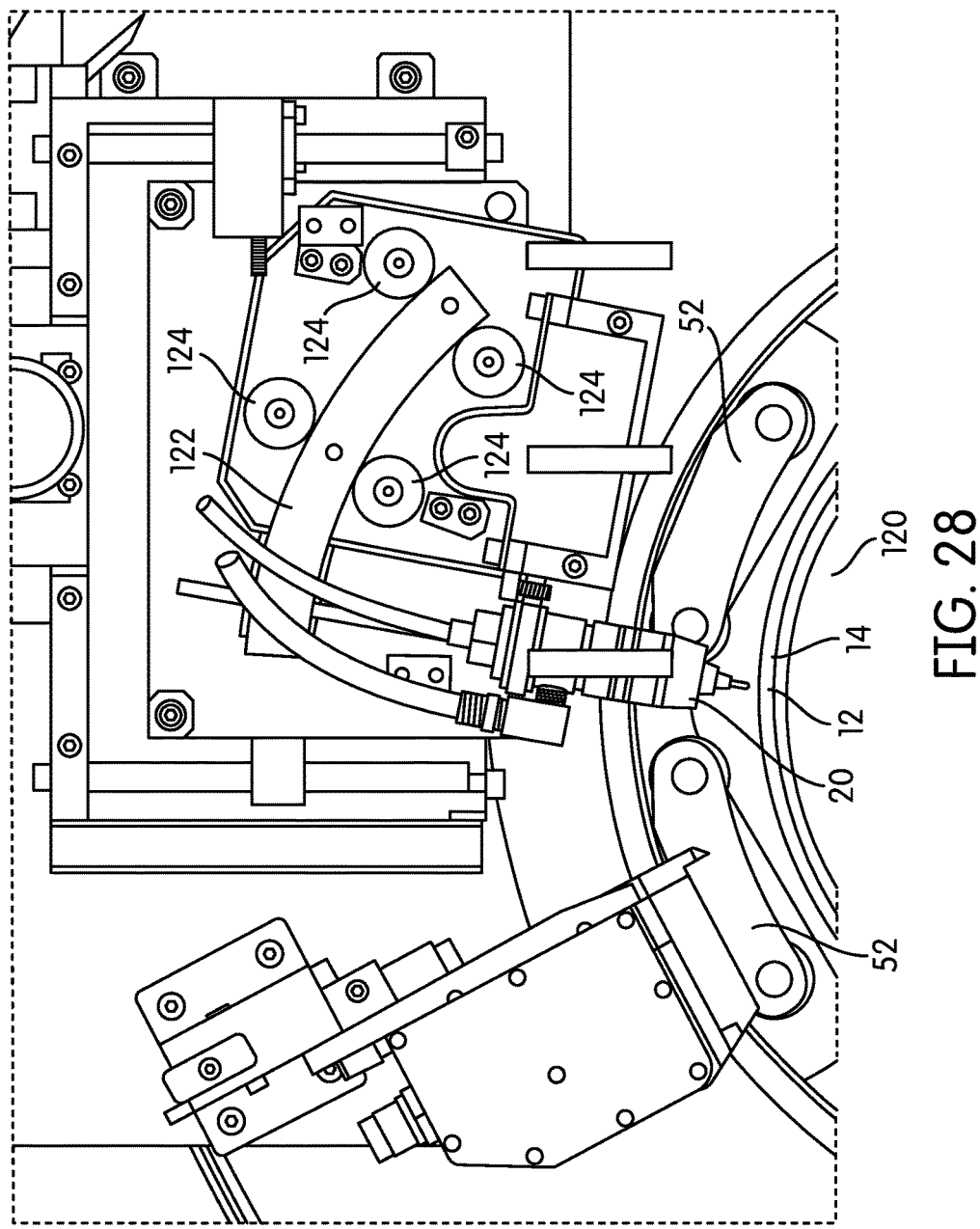
FIG. 28 shows the weld torch in a right tilt position in accordance with an embodiment of the present patent application.

In one embodiment, the weld head assembly includes a radial positioning system 116 (as shown in FIGS. 21 and 22) that is configured to enable the radial movement of the weld torch 20, an axial positioning system 118 (as shown in FIGS. 23-25) that is configured to enable the axial movement of the weld torch 20, and a tilt positioning system 120 (as shown in FIGS. 26-28) that is configured to enable the tilt movement of the weld torch 20.

In one embodiment, the weld torch 20 is mounted for radial movement, by the radial positioning system 116, such that its weld tip is configured to move towards and away from the outer weld surfaces of the pipes. In one embodiment, the one or more processors 26 are configured to control the one or more weld torch motors to adjust a radial distance of the weld tip from the pipes 12, 14. In one embodiment, the radial positioning system of the weld torch 20 is configured to retract the weld torch 20 away from the pipe to prevent damage when being moved from one weld joint to the next weld joint.

In one embodiment, the radial positioning system 116 of the weld torch 20 is configured to allow the weld torch 20 to be positioned at the correct height for each weld pass. In one embodiment, as each weld pass is completed, the weld torch 20 is moved (by the radial positioning system) away from the center of the pipe before the next weld pass can begin. For example, the one or more processors 26 are configured to control the one or more weld torch motors to move the weld tip radially away from the interface region after the root pass weld so as to accommodate the weld material deposited in the root pass weld and provide a hot pass weld on top of the root pass weld.

In one embodiment, the radial positioning system 116 is configured to enable the weld torch 20 to move radially to track variations in the pipe shape, to adjust the weld tip-to-work piece (e.g., pipe) distance for multiple passes (e.g., root and hot pass weld procedures), and to retract away from the pipes when the weld system is not welding. That is, during each weld pass, the radial positioning system 116 is configured to follow the deviations in the pipe diameter so as to maintain a constant distance between the weld torch tip and the weld joint/the interface region between the pipes.

In one embodiment, the radial positioning system 116 is configured to provide the weld torch 20 with about 1.25 inch radial travel. In one embodiment, the weld torch 20 is moveable by the radial positioning system 116 between a normal, non-extended, retracted configuration and an extended configuration. Referring to FIGS. 21 and 22, the weld torch 20 has been extended (to its extended configuration) by the radial positioning system 116 so that the weld torch 20 is positioned at the correct/desired/predetermined distance from the pipes for the welding procedure. FIG. 22 shows the weld torch 20 moved (by the radial positioning system 116) to a retracted position where the weld torch 20 is away from the pipe to prevent damage when being moved from one weld joint to the next weld joint. FIG. 21 show the weld torch 20 moved (by the radial positioning system 116) to a weld position where the weld torch 20 is positioned at the correct height for the weld procedure.

In one embodiment, the radial positioning system 116 may include a linear actuator. In one embodiment, the radial positioning system 116 may include the radial weld torch (electric) motor, a lead screw, and a lead nut. In one embodiment, the motor is configured (e.g., mechanically connected) to rotate the lead screw. In one embodiment, the motor is configured to rotate either clockwise or counter clockwise direction so as to cause the raising or lowering of the weld torch 20 substantially parallel to the radial axis R-R (as shown in FIGS. 21 and 22) of the pipes 12, 14. In one embodiment, the motor is configured to be directly connected to rotate the lead screw. In another embodiment, the motor is configured to be indirectly connected, e.g., through a series of gears or a gearbox, to rotate the lead screw. In one embodiment, the lead screw includes threads machined on its outer surface and extending along its length. In one embodiment, the lead nut is constructed and arranged to be threaded onto the lead screw and includes complimentary threads machined on its inner surface. In one embodiment, the lead nut is configured to be interlocked with a portion of the radial positioning system so that the rotation of the lead nut is prevented along with the lead screw. That is, the lead nut is restrained from rotating along with the lead screw, therefore the lead nut is configured to travel up and down the lead screw. In one embodiment, the radial positioning system may also include other members and guide rods that are configured to transfer the rotational movement of the motor to the radial movement of the weld torch 20. For example, when the lead screw is rotated by the motor, the lead nut is driven along the threads. In one embodiment, the direction of motion of the lead nut depends on the direction of rotation of the lead screw by the motor. As the lead nut is interlocked in the opening of a radial positioning member, the radial positioning member is configured to travel/move (up or down) the lead screw along with the lead nut. The slidable engagement between the radial positioning member and guide rod members also facilitate this (up or down) travel/movement of the radial positioning member.

In one embodiment, the axial positioning system 118 is configured to enable the weld torch 20 to move axially to keep the weld torch 20 in the weld bevel as the weld torch 20 travels around the pipe and to allow the weld torch 20 to oscillate within the weld bevel if needed to completely fill the bevel.

FIG. 24 shows the weld torch 20 positioned in a normal, centered axial position. In one embodiment, the axial positioning system 118 is configured to provide the weld torch 20 with +/−1 inch axial travel. For example, as shown in FIGS. 23 and 25, the weld torch 20 has been moved by the axial positioning system 118 to +1 inch of axial travel and −1 inch of axial travel, respectively so that the weld torch 20 is positioned at the correct/desired/predetermined distance from the pipe for welding.

FIGS. 23 and 25 show the weld torch 20 moved (by the axial positioning system 118) along the axis of the pipe to a leftward axial position and to a rightward axial position, respectively. In one embodiment, the axial positioning system 118 is configured to move the weld torch 20 about two inches along the axis of the pipe for alignment with the weld joint groove. During the weld procedure, the axial positioning system 118 is configured to oscillate the weld torch 20 across the weld joint (and within the weld bevel if needed to completely fill the bevel) at up to 4 Hz frequency with an amplitude of up to 0.5".

In one embodiment, the axial positioning system 118 may be a linear actuator. In one embodiment, the axial positioning system 118 may include the axial weld torch (electric) motor, a lead screw, and a lead nut. In one embodiment, when the lead screw is rotated by the motor, the lead nut is driven along the threads. In one embodiment, the motor is configured (e.g., mechanically connected) to rotate the lead screw. In one embodiment, the motor is configured to rotate either clockwise or counter clockwise direction so as to cause the left or right side movement of weld torch substantially parallel to the axial axis A-A (as shown in FIGS. 23-25) of the pipes. In one embodiment, the motor is configured to be indirectly connected, e.g., through a series of gears, to rotate the lead screw. That is, the motor comprises an output shaft and the motor is operably connected to the lead screw through the gears engaging the output shaft of the motor. In one embodiment, a first gear is connected to the output shaft of the motor, a second gear is connected or attached to the lead screw, and these two gears are coupled to each other via one or more other gears. By connecting the motor to the lead screw through the gears, the lead screw turns when the motor operates. In another embodiment, the motor is configured to be directly connected (i.e., without the gear arrangement) to rotate the lead screw. In one embodiment, the lead nut is configured to be interlocked with a portion of the axial positioning system so that the lead nut is prevented from rotation along with the lead screw. That is, the lead nut is restrained from rotating along with the lead screw, therefore the lead nut is configured to travel/move side to side with the lead screw.

In one embodiment, the tilt positioning system 120 is configured to tilt the weld torch 20 about a point where the weld wire contacts the pipe. In one embodiment, this configuration maintains a constant distance between the point measured by the laser/inspection detector 22 and the point of weld application. In one embodiment, such a positioning system is described in detail in International Patent Application No. PCT/US2015/062558, filed Nov. 24, 2015, which is incorporated by reference in its entirety into the present patent application. In FIGS. 26-28, some components of the positioning system are not shown so that other components can be seen clearly.

In another embodiment, the weld torch 20 is configured to be tilted by the tilt positioning system 120 about a point radially out from the weld. This configuration changes the distance between the point measured by the laser/inspection detector 22 and the point of weld application. In one embodiment, the one or more processors 26 are configured to calculate the distance between the two points and compensate accordingly.

In one embodiment, the tilt positioning system 120 is configured to enable the weld torch 20 to change its tilt angle in the plane of travel to account for changes in the direction of weld relative to the direction of gravity. In one embodiment, the tilt angle of the weld torch 20 may be changed to accommodate the force of gravity. In one embodiment, the tilt angle of the weld torch 20 may be adjusted to compensate for different orientation due to gravity. In one embodiment, the angular orientation of the weld torch 20 is controlled based upon the profile of the interface region. In one embodiment, the tilt angle of the weld torch 20 may be adjusted based on the weld profile data to accommodate and/or compensate for other weld conditions (i.e., not just the force of gravity).

Because the weld torch is able to articulate during the weld operation, it is able to take into account gravitational forces acting on the weld pool, as the weld torch rotates about the fixed pipe. Specifically, the angle of the weld torch can change by being operated by the at least one weld torch motor (i.e., the tilt weld torch motor), based upon whether the weld torch is traveling upwardly against the force of gravity, or downwardly with the force of gravity. The one or more motors (e.g., tilt weld torch motor) can also change the weld torch angle within the rotational plane based up the specific location within the upwards or downwards travel of the weld torch. It should be appreciated that because the weld torch can be articulated for some embodiments, it can be better angled to accommodate the force of gravity, and need not be set in a fixed position under the assumption, for example, that it would only be traveling downwardly, with the force of gravity. In some embodiments, as noted above, the present patent application contemplates that welding can be accomplished while the weld torch is moving upwardly (against the force of gravity) or downwardly (with the force of gravity). In addition, the weld torch 20 can be articulated based on the different rotational position (e.g., a welding operation conducted at 10 degrees from top dead center may ideally have slightly different requirements than a weld conducted at 90 degrees from top dead center, due to (for example) gravitational forces applied to the weld pool, as well as the tendency for the weld pool to adhere to the surface of the pipe differently at different positions on the pipe to be welded.

In one embodiment, the weld torch 20 may be configured to have a continuously variable torch tilt angle to compensate for or accommodate the continuously changing orientation of the weld torch due to gravity. In one embodiment, the weld torch 20 may be configured to progressively change the torch tilt angle based upon the position at which the weld torch is (i.e., the position of the weld torch along the circumferential weld). In one embodiment, the weld torch 20 may be configured such that the weld torch 20 may include a different torch tilt angle for any desired degrees of rotation. In one embodiment, the weld torch 20 may be configured such that the weld torch 20 may include a different torch tilt angle for each 90°, 30°, 60°, or 120° of rotation.

In one embodiment, a tilt positioning motor angularly articulates the weld torch 20 generally within the rotational plane. In one embodiment, the angular orientation of the weld torch 20 is controlled based upon the position of the torch. In one embodiment, the weld torch 20 is configured to pivot along the weld seam about the rotational plane.

FIG. 27 shows the weld torch 20 is positioned in a normal, non-tilted position. In one embodiment, the tilt positioning system 120 is configured to provide the weld torch 20 with +/−10° of angular tilt. In one embodiment, the tilt positioning system 120 is configured to provide the weld torch 20 with +/−5° of angular tilt. For example, as shown in FIGS. 26 and 28, the weld torch 20 has been moved by the tilt positioning system 120 to −5° or +5° of angular tilt, respectively so that the weld torch 20 is positioned at the correct/desired/predetermined distance from the pipe for welding. In another embodiment, the tilt positioning system 120 is configured to provide the weld torch 20 with +/−7° of angular tilt. In one embodiment, the tilt positioning system 120 is configured to provide the weld torch 20 with less than +/−5° of angular tilt.

Figure 53:
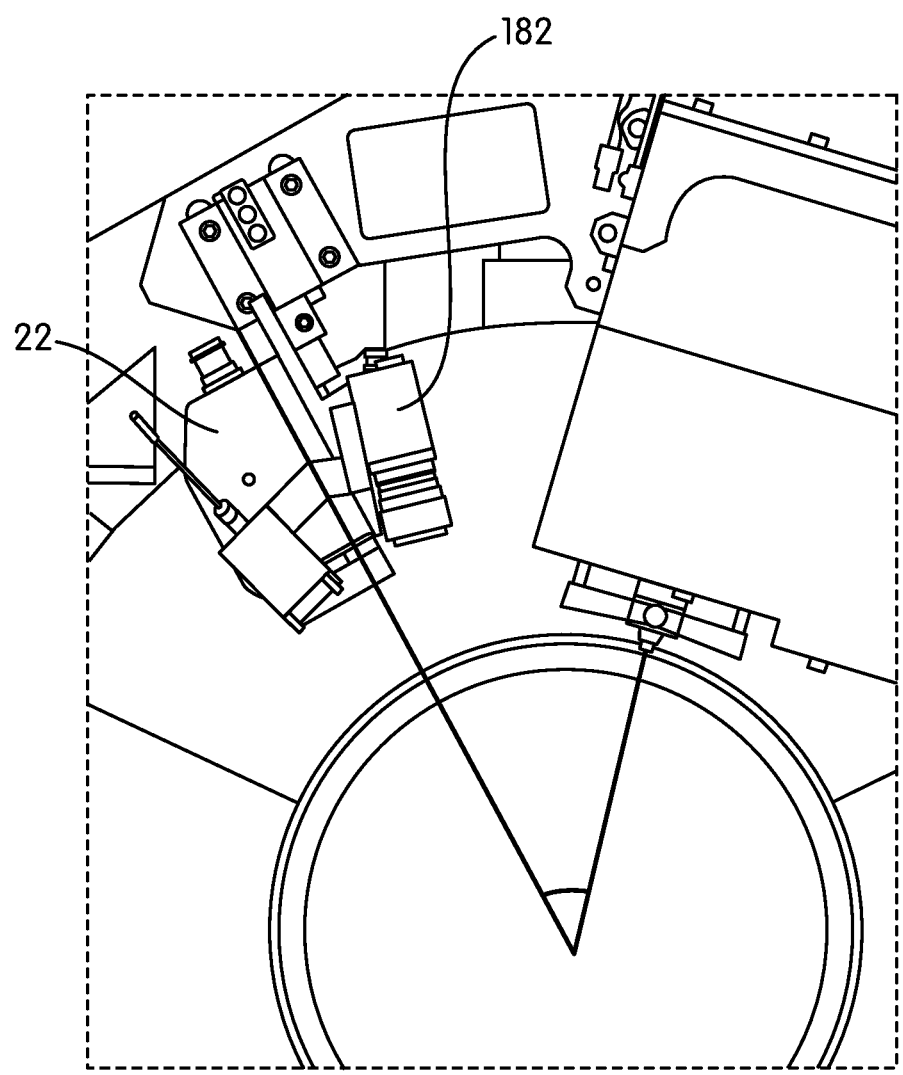
FIGS. 53 and 54 show a system of the present patent application in which inspection camera is co-mounted with the inspection detector such that the inspection camera is aimed at the same point on the outside surface of the pipe as the inspection detector, FIGS. 53 and 54 also show that the arc angle between the joint position measured by the inspection detector and the joint position welded by the weld torch is constant.
Figure 54:
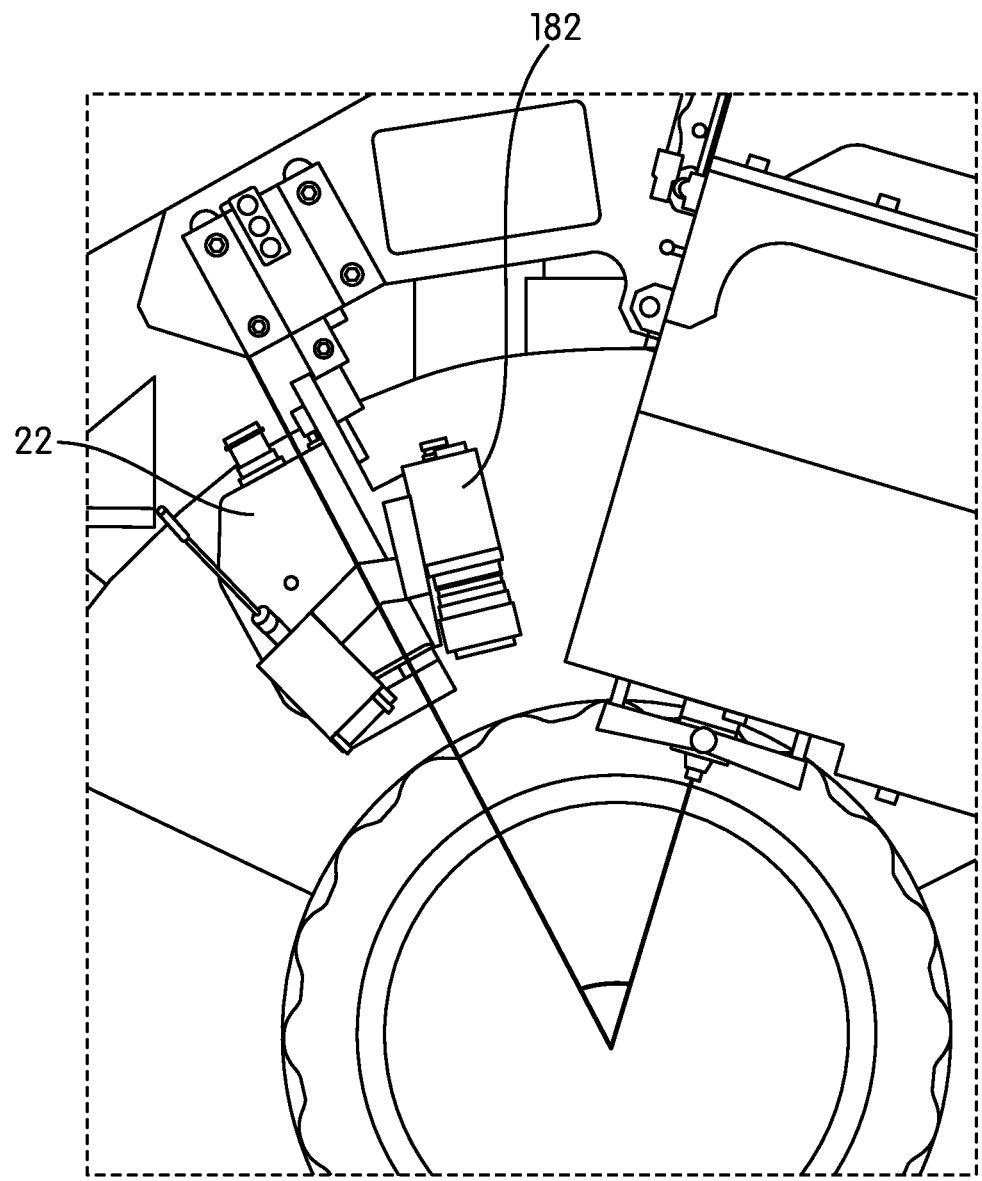
Figure 55:
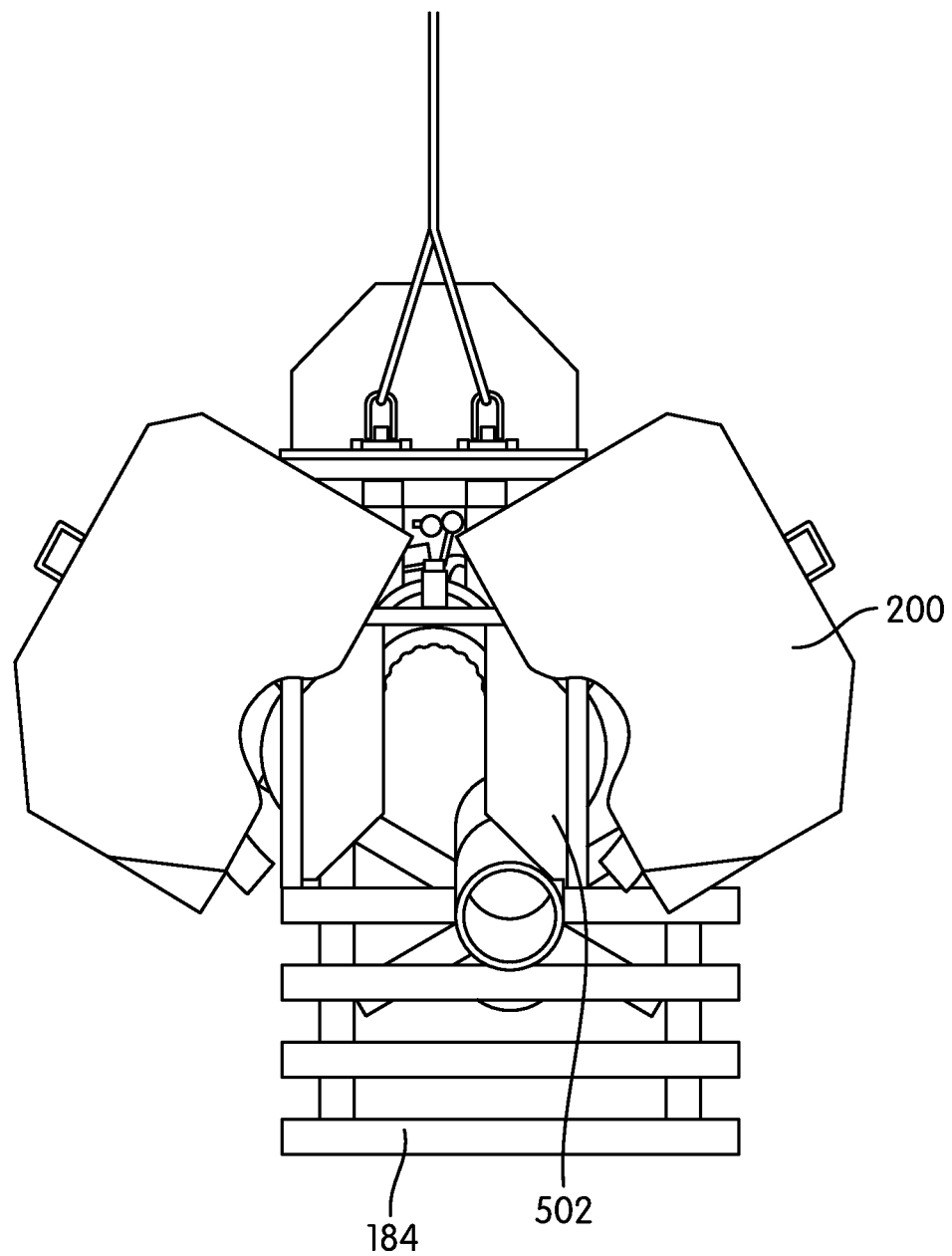
FIGS. 55-59 show guides of the enclosure that keep the system centered over the pipes when the enclosure is being lowered or raised in accordance with an embodiment of the present patent application.

In one embodiment, a circumferential arc between the pivot point P and a point of impingement of the inspection beam of radiation upon the interface region remains generally constant during a welding procedure as shown in FIGS. 53 and 54. That is, the arc angle between the weld joint position measured by the laser/inspection detector 22 and the weld joint position welded by the weld torch is constant. In one embodiment, the one or more processors 26 have knowledge of a constant arcuate distance between the pivot point P (e.g., weld tip) and the point of inspection, so that the one or more processors 26 are configured to control the articulation and pivoting movement of the weld torch 20 based on the pre-weld profile inspection data or the on-the-fly inspection data.

The configuration of the weld torch 20 that enables the weld torch 20 to pivot about the pivot point P allows the angle of the weld torch 20 to be changed while welding without affecting the speed at which the weld torch 20 is travelling. For example, this is especially useful for weld systems with multiple weld torches. In one embodiment, the weld torches will not have their angles changed at the same time, in which case it would be beneficial for a torch's angle to be changed without any adverse effects on itself or the other weld torches.

In one embodiment, the tilt positioning system 120 includes the tilt weld torch motor, guide rail members 122, and guide rollers 124. In one embodiment, the guide rail members 122 are configured to be engaged with the guide rollers 124 to facilitate the tilt positioning of the weld torch 20. In the illustrated embodiment, the guide rollers 124 may include two upper and two lower guide rollers. In one embodiment, the tilt positioning system 120 includes one guide rail member 122 and its four associated guide rollers 124 positioned on opposing sides of the weld torch assembly.

In one embodiment, the tilt weld torch motor is configured (e.g., mechanically connected) to rotate a gear. In one embodiment, the motor is configured to rotate either clockwise or counter clockwise direction so as to cause the forward or rearward tilt movement of weld torch 20. In one embodiment, the tilt weld torch motor is configured to be connected, e.g., through the gear, to the guide rail member 122. That is, the tilt weld torch motor comprises an output shaft, and the gear is connected to the output shaft of the motor. By connecting the tilt weld torch motor to the guide rail member 122 through the gear, the guide rail 122 moves when the tilt weld torch motor operates.

In one embodiment, the guide rail member 122 is configured to guide the upper and lower guide rollers 124. In one embodiment, the upper and lower guide rollers 124 are biased against the guide rail member 122 such that the upper and lower guide rollers 124 are configured to enable the weld torch 20 to change its tilt angle in the plane of travel.

In one embodiment, the external weld system (with the weld torch 20) is configured to receive weld profile data (e.g., prior to, during and subsequent to the weld procedure) from an inspection system (e.g., with the inspection detector 22 and/or inspection camera 182) and is configured, based on the received weld profile data, to shift its external weld torch 20 and/or to tilt its external weld torch 20 to achieve a full weld penetration. Thus, the weld profile data from the inspection system may be used by the external weld system to make the best weld possible.

In one embodiment, the motors that direct the inspection detector 22 also rotates the weld torch 20 circumferentially about a rotational plane to create the weld along the interface region.

In one embodiment, the weld torch housing assembly is constructed and arranged to enclose the weld torch 20, the radial positioning system 116, the axial positioning system 118 and the tilt positioning system 120 therein. In one embodiment, the weld torch housing assembly is configured to protect the components of the weld torch 20 and various components of its axial, radial and/or tilt positioning systems from the welding heat and splatter.

Figure 29:
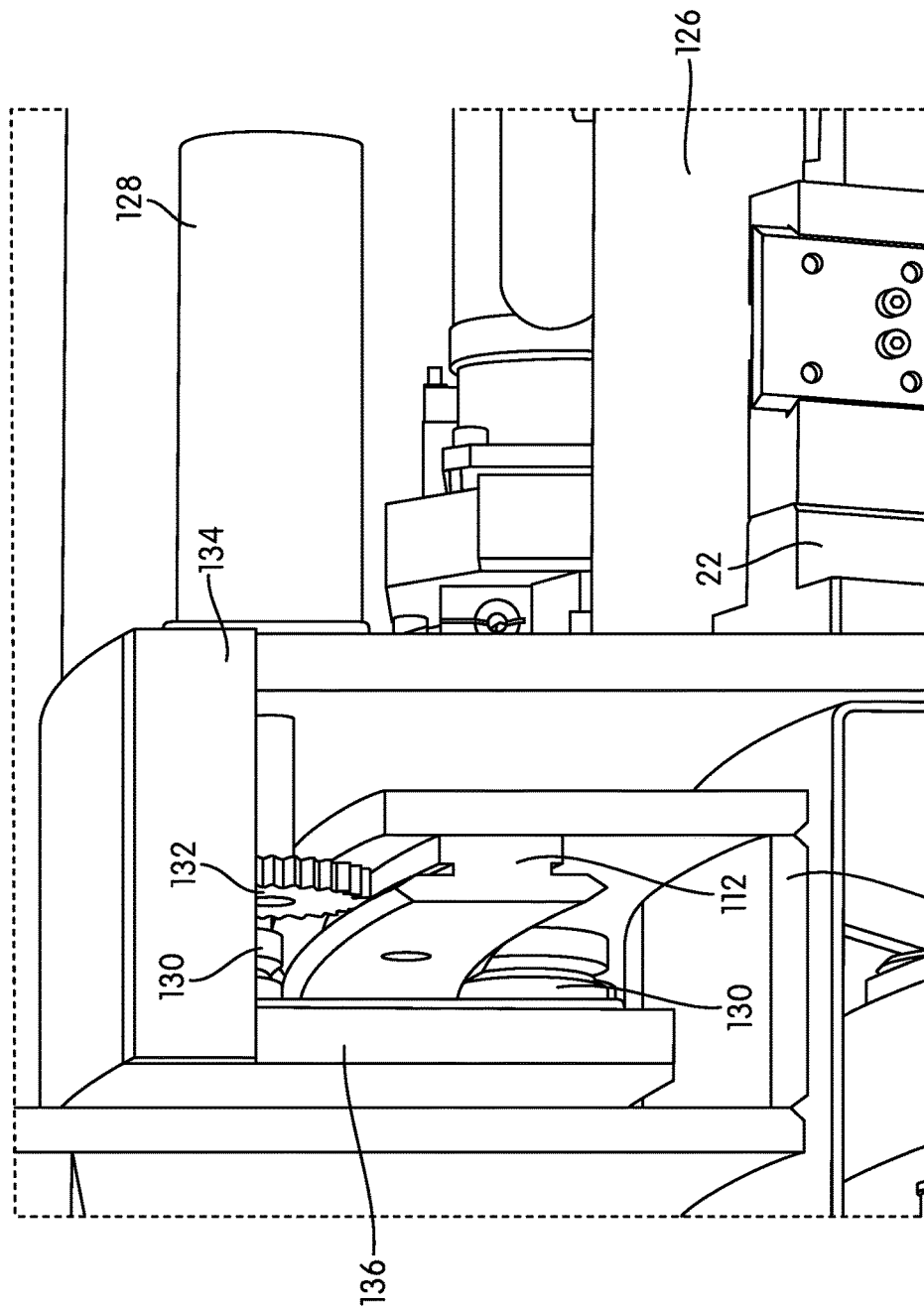
FIG. 29 shows a partial cross-sectional view of the system showing a weld torch module in accordance with an embodiment of the present patent application, wherein some of the components of the system are not shown for sake of clarity.

In one embodiment, referring to FIG. 29, the weld torch 20 combined with the radial, axial, and tilt positioning systems 116, 118 and 120 constitute the weld torch module 126. In one embodiment, each weld torch module 126 is mounted on the circular guide rail 112 of the U-shaped channel 110. In one embodiment, each torch module 126 may include its own travel motor 128.

In one embodiment, the system 10 includes a carriage that is configured to carry the weld torch 20 around the interface region 38 between the pipes 12, 14. In one embodiment, the carriage is configured to travel along the rail 112 of the guide track member 88. In one embodiment, the carriage includes a plurality of roller members that are configured to engage with the guide track member 88. In one embodiment, the carriage may include one or more drive motors. In one embodiment, the shafts of the drive motors include pinion gears mounted to them. In one embodiment, the pinion gears of the drive motors are configured to engage with the integrated gear rack 114 on the guide track member 88. In one embodiment, the carriage may include two drive motors, where each motor may be driven at a different output torque to create a preload effect between the two pinion gears so as to remove any backlash from the pinion gears.

For example, in one embodiment, the weld torch module 126 includes a carriage frame 134. In one embodiment, the carriage frame 134 has a generally U-shaped channel configuration. In one embodiment, a portion 136 of the carriage frame 134 includes guide rollers 130. In one embodiment, the guide rail member 112 of the guide track member 88 is configured to be engaged with the guide rollers 130 to facilitate the positioning of the weld torch module 126 on the guide track member 88. In the illustrated embodiment, the guide rollers 130 may include upper and lower guide rollers. In one embodiment, the travel motor 128 is configured (e.g., mechanically connected) to rotate a gear 132. In one embodiment, the travel motor 128 is configured to rotate either clockwise or counter clockwise direction so as to cause the forward or rearward movement of the weld torch module/the carriage frame. In one embodiment, the travel motor 128 is configured to be connected, e.g., through the gear 132, to the guide rail member 112. That is, the motor comprises an output shaft, and the gear 132 is connected to the output shaft of the motor. By connecting the motor to the guide rail member 112 through the gear 132, the guide rail member 112 moves when the motor operates. In one embodiment, the guide rail member 112 is configured to guide the upper and lower guide rollers 130. In one embodiment, the upper and lower guide rollers 130 are biased against the guide rail member 112 such that the upper and lower guide rollers 130 are configured to enable the weld torch module 126 to move along the circumference of the guide track member 88.

In one embodiment, each torch module 126 is configured to be positioned independently anywhere around the circumference of the pipe and move at any speed within its capabilities regardless of the speed of travel of any other weld torch. In one embodiment, weld travel speeds may be between 5 inches/min and 55 inches/min. In one embodiment, travel speeds faster than 55 inches/min are possible during inspection operations or when repositioning the weld torch between welds.

The external weld system 10 may not be perfectly aligned with the weld joint. This may be due to many reasons. For example, the weld joint may change shape during the weld pass as the pipes heat or cool. The shape of the bevel may change at different locations along the circumference due to machining variability. The height of the existing material may vary.

In one embodiment, one or more processors 26 are configured to detect these conditions and to compensate for these conditions on-the-fly during the welding process so as to deposit the best weld possible.

In one embodiment, the inspection detector 22 (e.g., a laser) may be mounted on each torch module to measure the joint profile before welding begins and on-the-fly during the welding process. In one embodiment, the inspection detector 22 is mounted such that it measures the weld joint a short distance ahead of where the weld torch is welding. In one embodiment, the inspection detector 22 is configured to measure the width and depth of the weld groove. In one embodiment, the inspection detector 22 is also configured to measure the shape of the bottom of the weld groove. In one embodiment, the inspection detector 22 is mounted such that the arc angle between the weld joint position measured by the inspection detector 22 and the joint position welded by the weld torch is constant as shown in FIGS. 53 and 54.

As the weld torch oscillates within the weld groove, the arc voltage varies with the distance between the weld torch tip and the walls of the weld groove. In one embodiment, by measuring this arc voltage, the one or more controllers 26 are configured to determine if the oscillation is centered within the weld groove.

In one embodiment, the inspection camera 182 may be configured to be positioned in a plane with the weld, a short distance away from the weld along the circumference. In one embodiment, the inspection camera 182 is configured to be oriented to view the weld and the torch tip in relation to the weld groove. In one embodiment, the inspection camera 182 may be configured to be co-mounted with the inspection detector 22 such that it is aimed at the same point on the outside surface of the pipe as the inspection detector 22.

In one embodiment, the external weld system 10 is configured to record all weld parameters throughout the weld process for each weld pass that is performed. In one embodiment, the external weld system 10 is configured to also record data from sensors not involved in the weld process such as pipe temperature, GPS location, or ambient temperature. In one embodiment, the external weld system 10 is configured to receive instructions from a remote system that may include, but is not limited to, weld parameters and procedures (e.g. wire feed speed, welding current, welding voltage, welding travel speed, oscillation distance, oscillation rate), updates to control methods, and inspection go/no-go reports. In one embodiment, such a remote system is described in detail in International Patent Application No. PCT/US2015/062558, filed Nov. 24, 2015, which is incorporated by reference in its entirety into the present patent application.

In one embodiment, the inspection detector 22 is configured to be positioned between the first pipe clamp 16 and the second pipe clamp 18. In one embodiment, the system 10 may also include the inspection camera 182. That is, in one embodiment, the system 10 may include both the inspection detector 22 and the inspection camera 182 as shown in FIGS. 53 and 54. In one embodiment, the inspection detector 22 and/or the inspection camera 182 are configured to be positioned axially (with respect to the pipe axis) between the first pipe clamp 16 and the second pipe clamp 18. That is, the first pipe clamp 16 and the second pipe clamp 18 are each positioned on axially opposite sides of the inspection detector 22 and/or the inspection camera 182.

In one embodiment, the inspection detector 22 may include an inspection laser, a three dimensional (3D) inspection camera, an inspection ultrasound sensor system, an inspection electrical capacitive probe, and any other inspection detectors as would be appreciated by one skilled in the art. Where a laser is used, the type of laser can be a Laser Displacement Sensor. In one embodiment, the laser can be LK-G5000 series Ultra High-Speed/High-Accuracy Laser Displacement Sensor manufactured by Keyence. In one embodiment, the laser can be a smart laser sensor, such as, Smart Laser Sensor SLS-050 manufactured by Meta Vision Systems Inc.

In one embodiment, the inspection detector 22 includes an emitter for emitting the inspection beam of radiation and a receiver for receiving inspection signals from reflected radiation. In one or more embodiments, the inspection detector's receiver comprises a sensor that detects the reflected radiation and generates signals based upon the reflected radiation. The signals are received by the one or more processors 26. In one embodiment, the signals contain data and information corresponding to the three dimensional profile of the weld joint between the pipes and/or interface region between pipes to be welded. This data and information may be used to detect, for example, the relative heights of the adjacent pipe surfaces at the regions to be welded, the relative spacing between the pipes, any non-uniformities in the adjacent surfaces to be welded (e.g., at the bevels thereof).

In addition, because the inspection detector is scanned along the entire interface between the pipes and/or the entire weld joint between the pipes, it can determine the specific interface profile and/or specific weld profile at any particular region of the scan. This information can also be used by the one or more processors to control the operation of the weld torch to provide a customized/tailored weld that is tailored specifically to the structural profile of the pipes to be welded at the interface region thereof. This information can also be used by the one or more processors to control the operation of the grinder 30 to provide a customized/tailored grinding that is tailored specifically to the structural profile of the welded pipes.

In one embodiment, an inspection detector motor is operatively associated with the inspection detector 22 to direct the inspection beam of radiation along the interface region 38 between pipes 12, 14 to be welded and the weld joint 36 between the pipes 12, 14.

In one embodiment, the inspection detector includes a motor that drives the inspection detector along the weld joint. In one embodiment, the weld torch is configured to be attached to the same structure as the inspection detector. In one embodiment, the system 10 includes a motor that is configured to move/drive both the inspection detector and the weld torch along the weld joint.

In one embodiment, the system 10 may include two inspection detectors. In one embodiment, one of the two inspection detectors may be a leading inspection detector that is configured to lead the weld torch during the welding procedure and also to provide pre-weld data. In one embodiment, the other of the two inspection detectors may be a trailing inspection detector that is configured to trail the weld torch during the welding procedure and to provide post-weld data. In one embodiment, the angle between each inspection detector and the weld torch may be adjustable.

In one embodiment, the inspection camera 182 and the inspection detector 22 are operatively connected to the one or more processors 26. In one embodiment, the communications to the system 10, including to the inspection detector 22, to the inspection camera 182, and/or to other electronic modules of the weld system 10, may be performed wirelessly. In another embodiment, the communications to the system 10, including to the inspection detector 22, to the inspection camera 182, and/or to other electronic modules of the weld system 10, may be performed using a wired connection. It should be appreciated that where a plurality of weld torches are provided, a plurality of inspection detectors/lasers may also be provided.

In one embodiment, a computer system and its one or more processors 26 may be positioned in the system 10. In another embodiment, the computer system and its one or more processors 26 may be positioned remotely from the system 10. In one embodiment, the one or more processors 26 may include a digital processor, an analog processor, a digital circuit designed to process information, an analog circuit designed to process information, a state machine, and/or other mechanisms for electronically processing information.

It should be appreciated that the "one or more processors" as disclosed herein may constitute a single processor that is located on-board and local to the particular system or component being discussed, off-board and local to the particular system or component being discussed, or remotely located to the particular system or component being discussed. In addition, the connection with the one or more processors can be wired or wireless. Further, the "one or more processors" may also refer to a plurality of processors that are on-board and local, a plurality of processors that are off-board and local, a plurality of processors that are remote, or any combination of on-board (and local), off-board (and local), and remote processors. In referring to on-board processors, such processors refer to processors that are carried physically (i.e., physically connected, and move with) by the particular system or component. In referring to off-board processors, these refer to processors that are local to a job-site and communicate wirelessly with on-board electronics.

In one embodiment, the system 10 does not include a reach rod/connection and may include an umbilical cord connection connecting the system 10 to a deployment system (e.g., a truck). In one embodiment, the umbilical cord connection is not a rigid connection. In one embodiment, off-board processors can also refer to electronics that are tethered to the on-board system through the non-rigid umbilical cord connection, and are local to the job site. That is, if the processor moves with the non-rigid umbilical cord connection, it may also be considered an "on-board" processor.

In one embodiment, the one or more processors 26 are also configured to secure the weld system 10 from movement at a location on the pipes 12, 14 that positions the inspection detector 22 in relation to the interface region 38 to enable the inspection detector 22 to detect the profile of the interface region 38 between the pipes 12, 14. In one embodiment, the one or more processors 26 are also configured to secure the weld system 10 from movement at a location on the pipes 12, 14 that positions the inspection detector 22 in relation to the weld joint 36 to enable the inspection detector to detect the weld profile between the pipes 12, 14.

The term "motor" as used herein broadly refers to any type of electromechanical motor, such as an electric motor, hydraulic motor, pneumatic motor, just for example.

In one embodiment, the system 10 may include a feedback system (e.g., using inspection detector 22, one or more processors 26, motors (including the axial, tilt, and radial positioning motors of the weld torch; axial, tilt, and radial positioning motors of the grinder; motors of the inspection detector/camera), first and second clamps 16 and 18, the weld torch 30 as will be explained in detail below) that is configured to sense whether the ends of the first and second pipes 12 and 14 are properly aligned.

FIG. 30 shows the grinder 30 in accordance with an embodiment of the present patent application. As shown in FIG. 30, the grinder 30 is positioned to grind the weld start position, while the weld torch module 126 (with the weld torch 20 and all its positioning systems) is positioned halfway through the weld pass.

In one embodiment, the grinder 30 is configured to grind the weld start point for each weld to a smooth profile before the end of the weld can be blended in. After the weld stop has been blended into the weld start, the weld may be ground again to provide a consistent surface height for the next weld. In one embodiment, after all welding is complete, the grinder 30 may also grind the entire circumference of the weld to smooth the final surface of the weld.

In one embodiment, referring to FIGS. 30-33, a grinder module 140 includes a grinder head 30, an axial positioning system 152, a radial positioning system 144, the inspection detector 22 (e.g., 3D scanner), and the one or more processors 26. In one embodiment, the grinder head 30 includes a motor 146, a gearbox 148, and a grinder member/disc 150. In one embodiment, the positioning systems 144 and 152 include an axial motor 156, axial guides 160, a radial motor 168, radial guides 176, and radial springs 178. In one embodiment, the grinder module 140 also includes an electronics module 166 and a removable battery 164. In one embodiment, the electronics module 166 includes one or more processors 26.

In one embodiment, each of the weld torch module, the grinder module and the inspection module may include a separate electronics module (with one or more processors). In another embodiment, the weld torch module, the grinder module and the inspection module may have a common electronics module (with one or more processors). In one embodiment, each of the weld torch module and the grinder module may include a separate inspection detector. In another embodiment, the weld torch module and the grinder module may include a common inspection detector.

Figure 31:
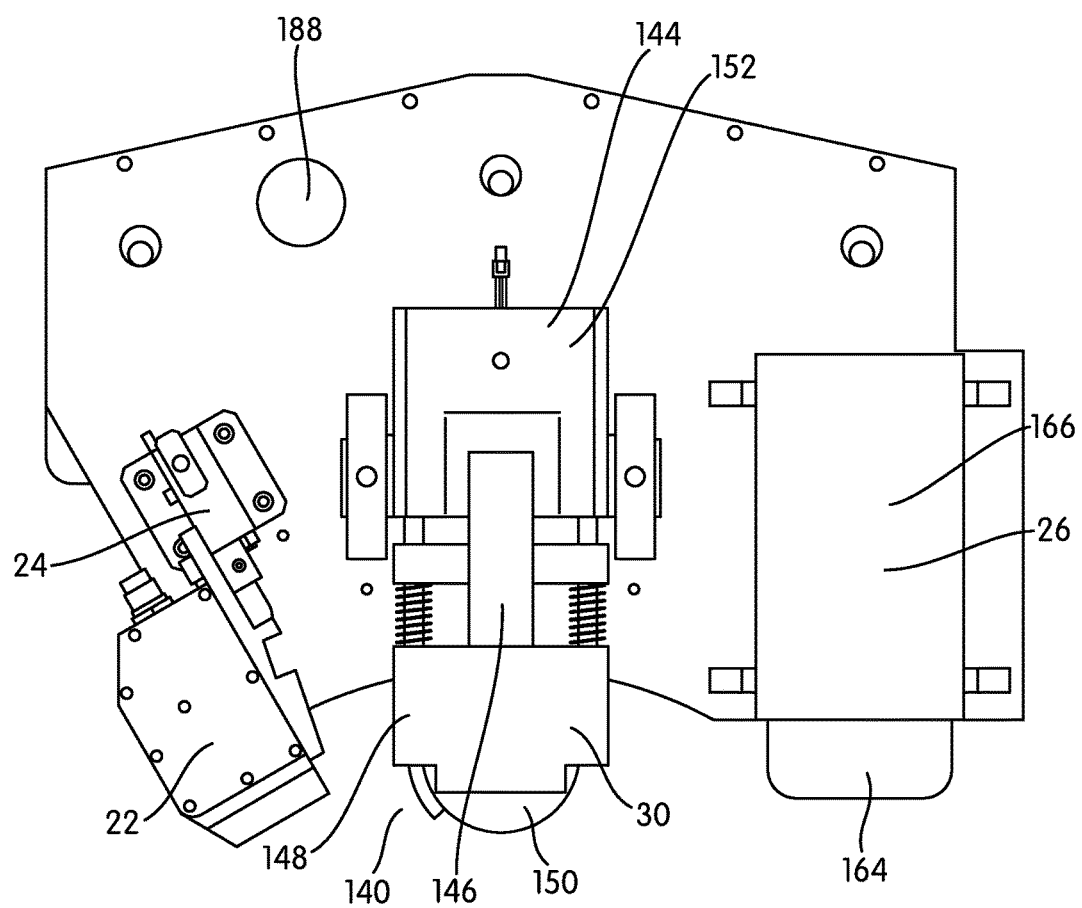
FIG. 31 shows a perspective view of the system showing radial and axial positioning systems of the grinder in accordance with an embodiment of the present patent application.
Figure 32:
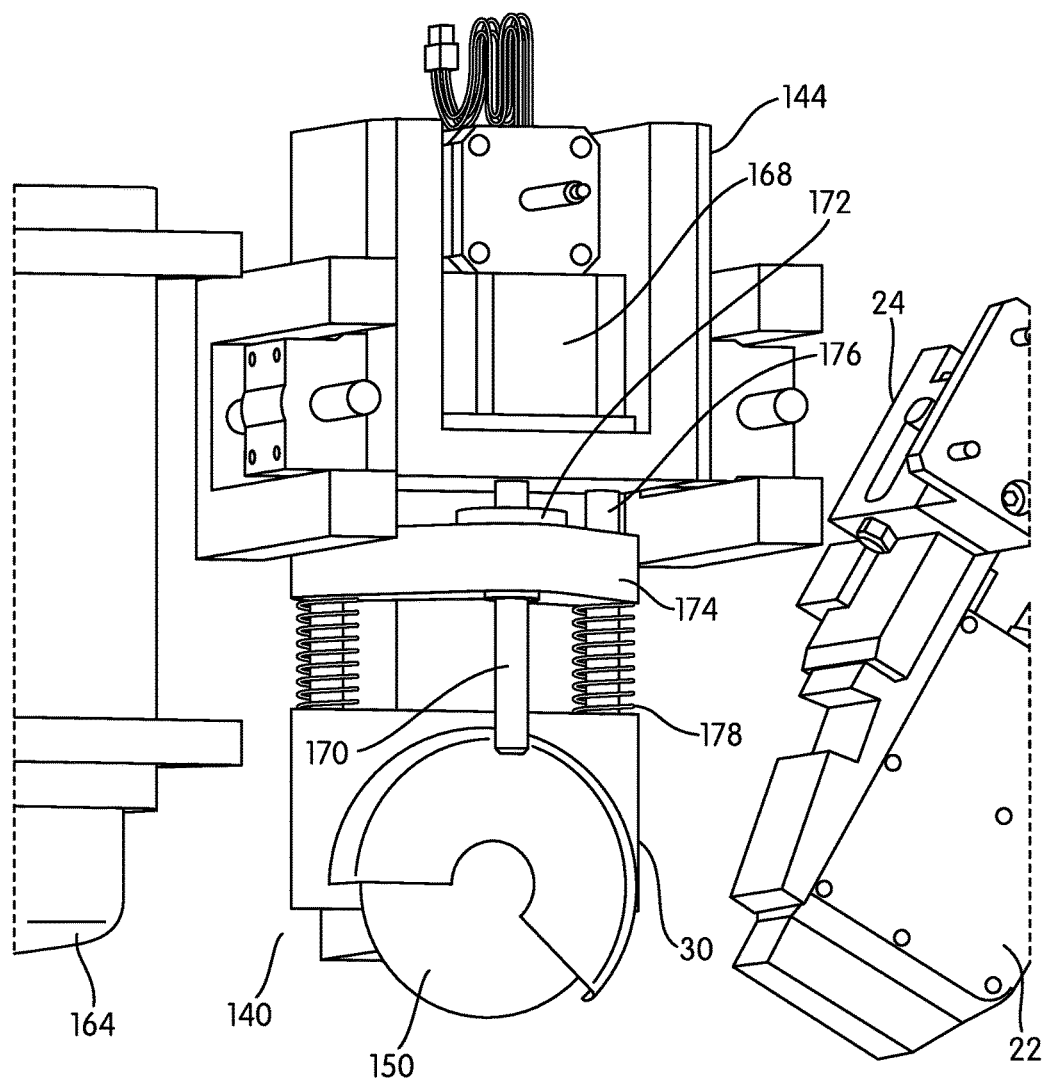
FIG. 32 shows a perspective view of the system showing radial positioning system of the grinder in accordance with an embodiment of the present patent application.
Figure 33:
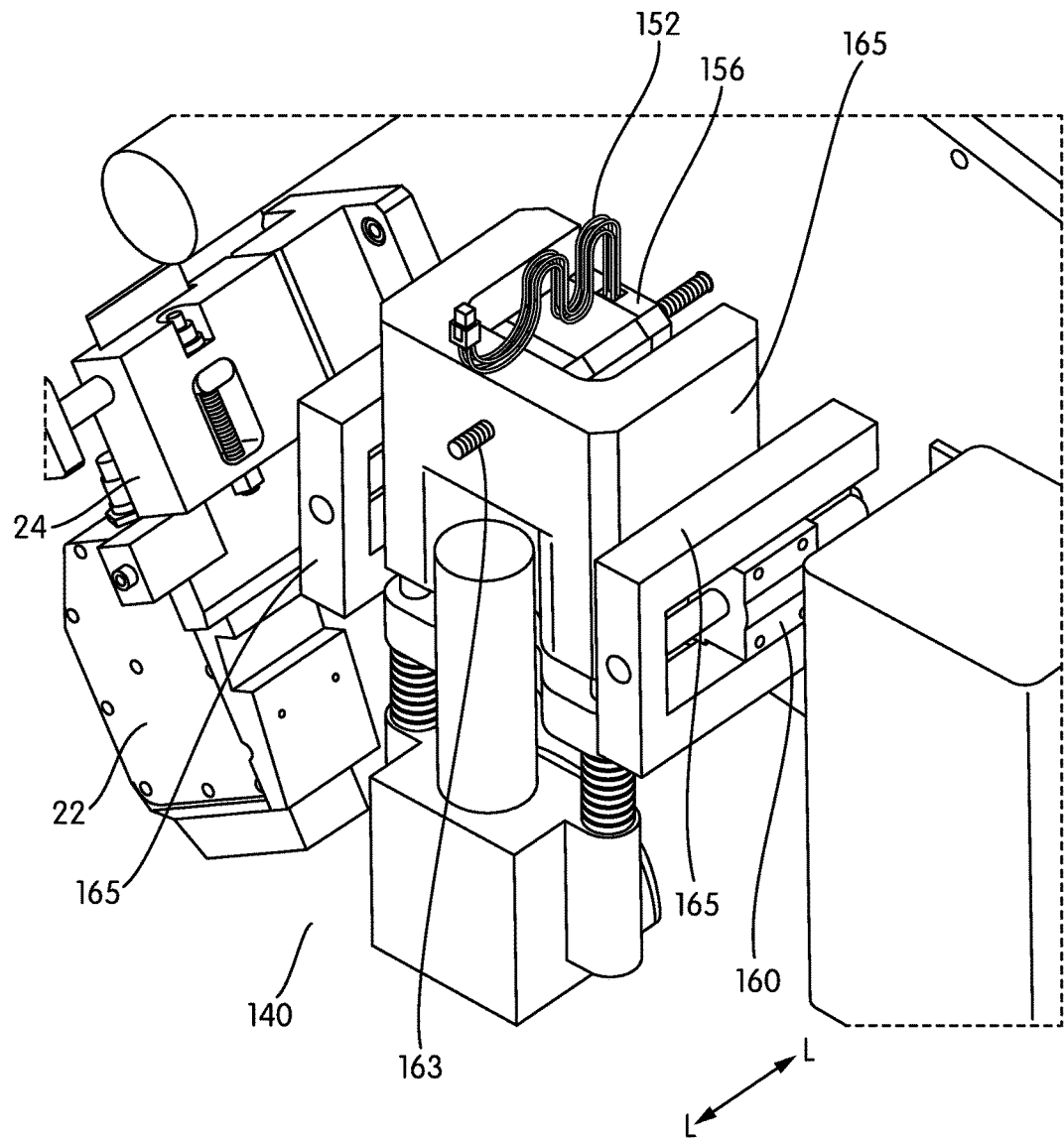
FIG. 33 shows a perspective view of the system showing axial positioning system of the grinder in accordance with an embodiment of the present patent application.

In one embodiment, the radial positioning system 144 (as shown in FIGS. 31 and 32) of the grinder 30 is configured to enable the radial movement of the grinder or grinder head 30, and the axial positioning system 152 (as shown in FIG. 33) is configured to enable the axial movement of the grinder 30. In one embodiment, the grinder 30 may also include a tilt positioning system that is configured to enable the tilt movement of the grinder 30. In one embodiment, the structure and operation of the tilt positioning system of the grinder may be similar to that of the tilt positioning system of the weld torch 20 (described above in this patent application).

In one embodiment, the radial positioning system 144 is configured to move the grinder 30 to any radial distance required for grinding. In one embodiment, the radial motion of the grinder 30 may be spring loaded so that the grinder 30 applies a consistent force to the surfaces (of the weld joint) of the pipes. In one embodiment, the radial positioning system 152 is configured to move the grinder 30 away from the surfaces of the pipes when the grinder 30 is not grinding.

In one embodiment, the grinder 30 is mounted for radial movement, by the radial positioning system 144, such that its grinder disc 150 is configured to move towards and away from the weld surfaces of the pipes. In one embodiment, the one or more processors 26 are configured to control the one or more grinders 30 to adjust a radial distance of the grinder disc 150 from the weld joint between the pipes 12, 14. In one embodiment, the radial positioning system 144 of the grinder 30 is configured to retract the grinder 30 away from the pipes to prevent damage when being moved from one grinding location to the next grinding location. In one embodiment, the grinder 30 is moveable by the radial positioning system 144 between a grinding configuration and a raised configuration.

In one embodiment, the radial positioning system 144 of the grinder 30 is configured to allow the grinder 30 to be positioned at the correct height for the grinding procedure. In one embodiment, as each grinding procedure is completed, the grinder 30 is moved (by the radial positioning system 144) away from the center of the pipes before the next grinding procedure can begin. In one embodiment, the one or more processors 26 are configured to control the one or more motors to move the grinding disc 150 radially away from and toward the weld joint. In one embodiment, the radial positioning system 144 is configured to enable the grinder 30 to move radially to track variations in the weld bead/joint, to adjust the grinding disc-to-work piece (e.g., pipe) distance, and to retract away from the pipes when the grinder 30 is travelling. That is, during each grinding procedure, the radial positioning system 114 is configured to follow the deviations in the weld bead/joint so as to maintain a constant distance between the grinding disc and the weld joint.

In one embodiment, the radial positioning system 144 may include a linear actuator. In one embodiment, referring to FIGS. 31-33, the radial positioning system 144 includes a radial (electric) motor 168, a radial lead screw 170, and a radial lead nut 172. In one embodiment, the motor 168 is configured (e.g., mechanically connected) to rotate the lead screw 170. In one embodiment, the motor 168 is configured to rotate either clockwise or counter clockwise direction so as to cause the raising or lowering of the grinder 30 substantially parallel to the radial axis R-R (as shown in FIGS. 21 and 22) of the pipes. In one embodiment, the motor 168 is configured to be directly connected to rotate the lead screw 170. In another embodiment, the motor 168 is configured to be indirectly connected, e.g., through a series of gears or a gearbox, to rotate the lead screw 170. In one embodiment, the lead screw 170 includes threads machined on its outer surface and extending along its length. In one embodiment, the lead nut 172 is constructed and arranged to be threaded onto the lead screw 170 and includes complimentary threads machined on its inner surface. In one embodiment, the lead nut 172 is configured to be interlocked with a portion of a radial spring plate 174 so that the rotation of the lead nut 172 is prevented along with the lead screw 170. That is, the lead nut 172 is restrained from rotating along with the lead screw 170, therefore the lead nut 172 is configured to travel up and down the lead screw 170.

When the lead screw 170 is rotated by the motor 168, the lead nut 172 is driven along the threads. In one embodiment, the direction of motion of the lead nut 172 depends on the direction of rotation of the lead screw 170 by the motor 168. As the lead nut 172 is interlocked in an opening of the radial spring plate 174, the radial spring plate 174 is configured to travel/move (up or down) the lead screw 170 along with the lead nut 172. The slidable engagement between the radial spring plate 174 and the guide rod members 176 also facilitate this (up or down) travel/movement of the radial spring plate 174.

In one embodiment, springs 178 are configured to push the grinder head 30 away from the radial spring plate 174 against stops on the end of the radial guides 176. In one embodiment, the stops on the ends of the radial guides 176 are constructed and arranged to engage with portions of the grinder head 30 to facilitate the radial movement of the grinder head 30. When the grinder head 30 makes contact with the weld, the radial motor 168 continues to drive the radial spring plate 174 closer to the surfaces of the pipe 12, 14. This compresses the springs 178 and increases the force of the grinder head 30 against the weld. As the grinder head 30 removes weld material, the springs 178 continue to push the grinder head 30 against the weld with a minimal decrease in force.

In one embodiment, the grinder 30 is configured to move axially to align with the weld joint. In one embodiment, the grinder 30 is configured to move axially while grinding to cover the full width of the weld and to create a smooth surface that is free of gouges.

FIG. 33 shows the axial positioning system 152 of the grinder 30. In one embodiment, the positioning system 152 includes a linear actuator that has the motor 156. In one embodiment, the grinder 30 is moved axially by rotating the nut that is built-into the axial motor 156. That is, the actuator is constructed with a fixed lead screw 163. In one embodiment, the lead screw 163 is fixedly connected to a grinder carriage frame (as described in detail below).

In one embodiment, the positioning system 152 includes a housing member 165 that is configured to move linearly (along the axis, L-L) when its built-in hollow-shaft motor 156 rotates the nut. That is, the lead screw 163 is fixed and the nut is rotated by the motor 156 (i.e., built into the housing member 165), so the housing member 165 moves in a straight line (along the axis, L-L). In one embodiment, the housing member 165 is fixedly connected to the motor 156. As the grinder 30 is connected to the housing member 165, the grinder 30 is configured to move linearly (along the axis, L-L) along with the housing member 165.

Figure 34:
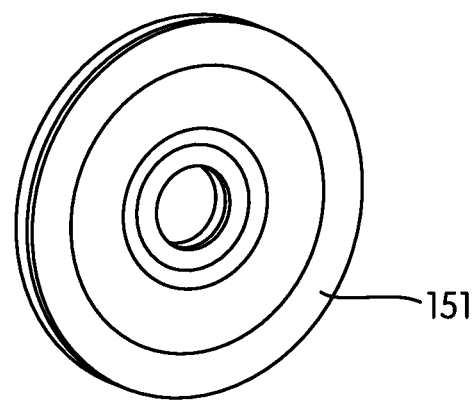
FIGS. 34, 35 and 36 show different grinding media that may be used in the grinder in accordance with an embodiment of the present patent application.

In one embodiment, the system 10 may include one or more grinders 30, each configured to perform different operations at different times during the weld procedure. That is, the system 10 may include one type of grinder that is configured to grind the weld start. For example, a hard disc 151 as shown in FIG. 34 may be used to grind the weld start.

Figure 35:
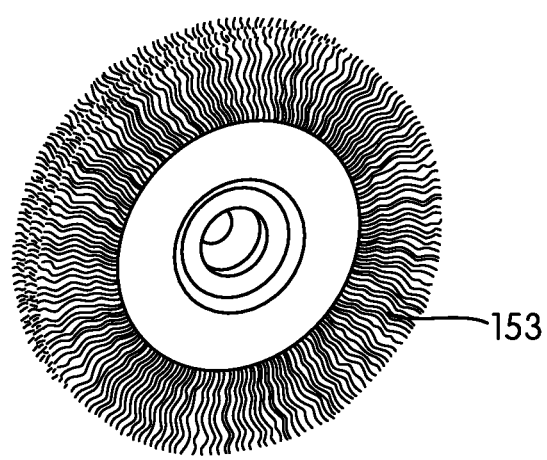
Figure 36:
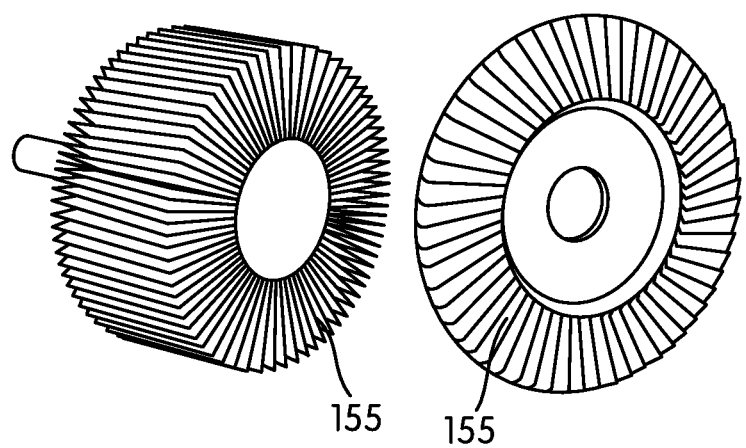

The system 10 may include another type of grinder that is configured to grind and clean up the profile after welding is complete. For example, wire wheel 153 as shown in FIG. 35 may be used to grind and clean up the profile after welding is complete. In yet another embodiment, the system 10 may include a sanding wheel as shown in FIG. 36 that is configured to grind portions of the weld joint.

In one embodiment, at least the portion of the weld joint 36 on which the grinding procedure is performed by the grinder 30 includes a weld start position of the weld joint 36. In one embodiment, the start of the weld is ground before the weld torch 20 completes the welding pass. Therefore, the grinding procedure is performed while the weld torch 20 is performing weld procedure. In one embodiment, the grinder 30 is configured to move along the length of weld. In one embodiment, the grinder 30 is configured to move along the weld while it is grinding to create a gentle slope at the weld start position.

In one embodiment, the grinder is configured to grind at least a weld start position of the weld joint. In one embodiment, the one more processors are configured to cause the grinder to grind a circumferential length of between 2 degrees and 20 degrees. In one embodiment, the grinder is configured to grind from the end (i.e., 0 degrees) to up to 20 degrees of the weld. In one embodiment, it can be between 5 degrees and 10 degrees of the end of the weld.

In another embodiment, at least the portion of the weld joint 36 on which the grinding procedure is performed by the grinder 30 includes a weld end position of the weld joint 36. In yet another embodiment, at least the portion of the weld joint 36 on which the grinding procedure is performed by the grinder 30 includes the entire circumference of the weld joint 36. In one embodiment, the weld path of the weld torch 20 generally extends from the weld start position to the weld end (or termination) position.

In one embodiment, the grinder 30 is configured to grind at least a weld end position of the weld joint. In one embodiment, the one more processors are configured to cause the grinder to grind a circumferential length of between 2 degrees and 20 degrees. In one embodiment, the grinder 30 is configured to grind from the end (i.e., 0 degrees) to up to 20 degrees of the weld. In one embodiment, it can be between 5 degrees and 10 degrees of the end of the weld.

In one embodiment, the grinder 30 is configured to grind a region of overlap between a start portion and an end portion of the weld joint.

In one embodiment, the grinder 30 is configured to grind the entire circumference of the one of the plurality of layers of weld material (e.g., weld pass layers, including, but not limited to, root weld pass layer, hot weld pass layer, fill and cap weld pass layers) before forming a subsequent layer of weld material on top of that layer of weld material. In another embodiment, a subsequent layer of weld material may be added without grinding the entire circumference of the previous layer of weld material. That is, in one embodiment, the weld torch is configured create a first layer of weld material, the grinder 30 is configured to grind the entire circumference of the first layer of weld material, and the weld torch is then configured to create a second layer of weld material on top of the ground first layer of weld material.

In one embodiment, the grinder 30 is configured to move independently of the weld torch 20 to grind at least the portion of the weld joint 36. In one embodiment, the grinder 30 is configured to grind at least the portion of the weld joint 36 while the weld torch 20 is forming at least another portion of the weld joint 36.

In one embodiment, the grinder 30 is mounted separate from the weld torch 20.

In one embodiment, the grinder 30 includes the inspection detector 22 (e.g., laser) that is configured to measure the profile of the weld before the grinding procedure begins. In one embodiment, the inspection detector 22 is also configured to check the results of the grinding to verify that the final profile is acceptable.

In one embodiment, the grinder 30 is configured to include the inspection camera 182 that is mounted to view along the weld joint to view the profile of the weld groove. In one embodiment, the images from the inspection camera 182 may be transmitted to the operator/user for visual inspection. In one embodiment, the images from the inspection camera 182 may be processed by the one or more processors 26 to determine the profile of the weld joint.

In one embodiment, a position of the grinder 30 is determined based on the profile of the weld joint 36 between the pipes 12 and 14. In one embodiment, the one or more processors are configured to determine characteristics of the weld profile and, based on the determined characteristics of the weld profile, send signals to the grinder 30 to move to a specific location based on the characteristics of the weld profile at that location.

In one embodiment, the one or more processors 26 of the system 10 are configured to control the one or more grinder motors 156, 168 to control a position and/or an orientation of the grinder 30.

In one embodiment, the grinder 30 is configured to be mounted at a fixed position. If all weld passes start at the same position around the circumference of the weld joint, then the grinder 30 is mounted at a single position not on the track.

In one embodiment, the grinder 30 and all of the sensors and motors that are part of the grinder 30 are configured to be powered using a cable connection. In one embodiment, the grinder 30 and all of the sensors and motors that are part of the grinder 30 are configured to be powered by a battery to eliminate the cable interference problems with the weld torch. In one embodiment, the grinder 30 and all of the sensors and motors that are part of the grinder 30 are configured to be controlled using a wired communications. In one embodiment, the grinder 30 and all of the sensors and motors that go with the grinder 30 are configured to be controlled using a wireless communications.

In one embodiment, the grinder 30 is configured to use the circular shaped grinder member or disc 150 that is configured to grind at least the portion of the weld joint 36. As discussed above, in one embodiment, the grinder member may be a hard grinding disc 151 as shown in FIG. 34, a wire brush 153 as shown in FIG. 35, or a sanding wheel 155 as shown in FIG. 36.

In one embodiment, the grinder module 140 is configured to be mounted on the guide track member 88. In one embodiment, the grinder module 140 is configured to be mounted on the same guide track member 88 (as shown in FIGS. 18-20) as the weld module 126.

In one embodiment, the grinder module 140 is configured to move independently of the weld module 126. In one embodiment, the grinder module 140 is configured to have its own travel capabilities so that the grinder module 140 can move independently of the weld module 126. In one embodiment, a track-mounted grinder can travel to any point on the circumference of the weld joint. In one embodiment, the one or more processors 26 are configured to prevent a collision between the weld torch module and grinder module. In one embodiment, the one or more processors 26 are configured to control the movement of the weld torch module and grinder module to keep them away from each other on the same guide track member.

In one embodiment, the grinder module 140 may be mounted on a circular guide rail of the U-shaped channel 110. In one embodiment, the grinder module 140 includes its own travel motor 138 (as shown in FIG. 31). In one embodiment, the travel motor 138 is configured to rotate/drive the grinder module 140 circumferentially (360° rotation relative to the pipe axis Y-Y in FIG. 30) along the weld joint 36. In one embodiment, the travel motor 138 is configured to drive the grinder module 140 at least 360° relative to the pipe axis Y-Y so as to complete a rotationally continuous grind.

In one embodiment, the grinder module 140 includes a grinder carriage frame that has a generally U-shaped channel configuration. In one embodiment, a portion of the carriage frame may include guide rollers. In one embodiment, the guide rail member of the guide track member 88 is configured to be engaged with the guide rollers to facilitate the positioning of the grinder module 140. In the illustrated embodiment, the guide rollers may include upper and lower guide rollers. In one embodiment, the travel motor 138 is configured (e.g., mechanically connected) to rotate a gear. In one embodiment, the travel motor 138 is configured to rotate either clockwise or counter clockwise direction so as to cause the clockwise or counter clockwise movement of the grinder module/the carriage frame. In one embodiment, the travel motor 138 is configured to be connected, e.g., through the gear, to the guide rail member. That is, the motor may include an output shaft, and the gear is connected to the output shaft of the motor. By connecting the motor to the guide rail member through the gear, the guide rail member moves when the motor operates. In one embodiment, the guide rail member is configured to guide the upper and lower guide rollers. In one embodiment, the upper and lower guide rollers are biased against the guide rail member such that the upper and lower guide rollers are configured to enable the grinder module 140 to move along the circumference of the guide track member 88. In one embodiment, each grinder module 140 is configured to be positioned independently anywhere around the circumference of the pipe and move at any speed within its capabilities. In one embodiment, the grinder 30, the grinder module 140 and/or grinding procedure may be optional in the system 10.

Figure 37:
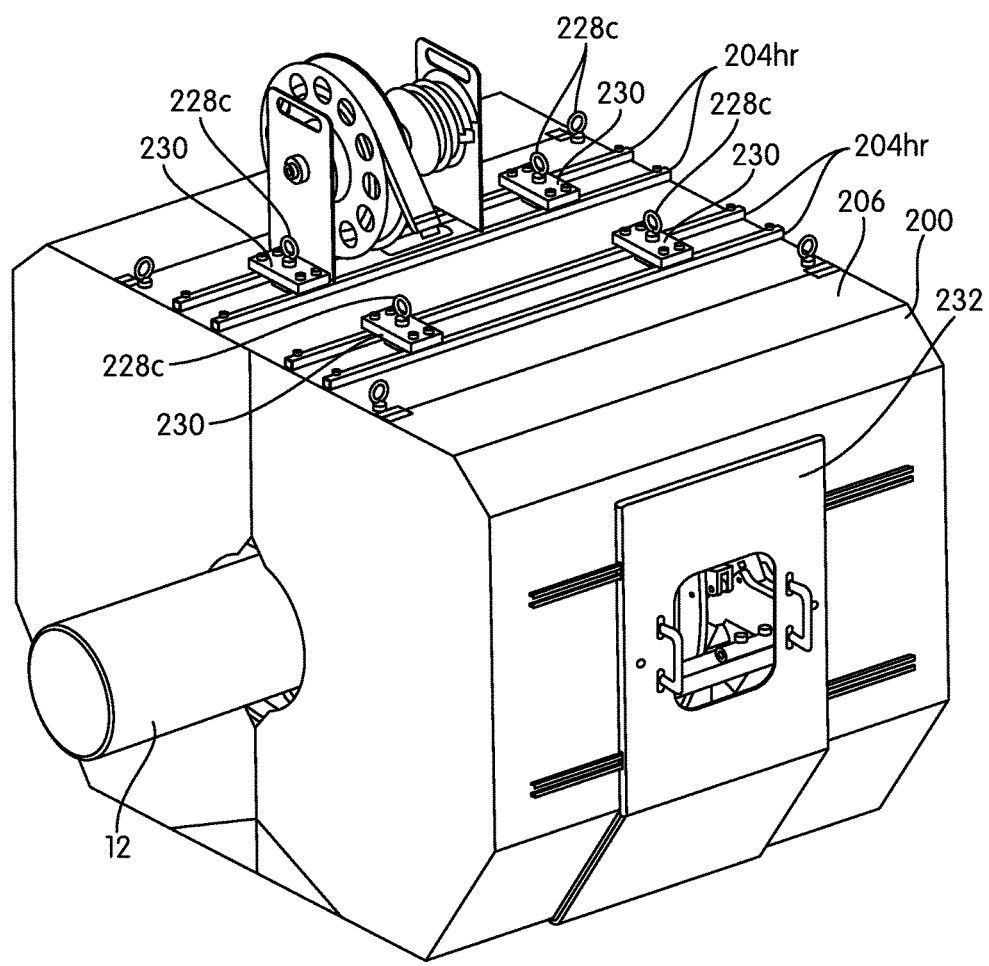
FIG. 37 shows a perspective view of an enclosure configured to enclose the weld torch, the pipe clamps and the interface region between the pipes in accordance with an embodiment of the present patent application.
Figure 38:
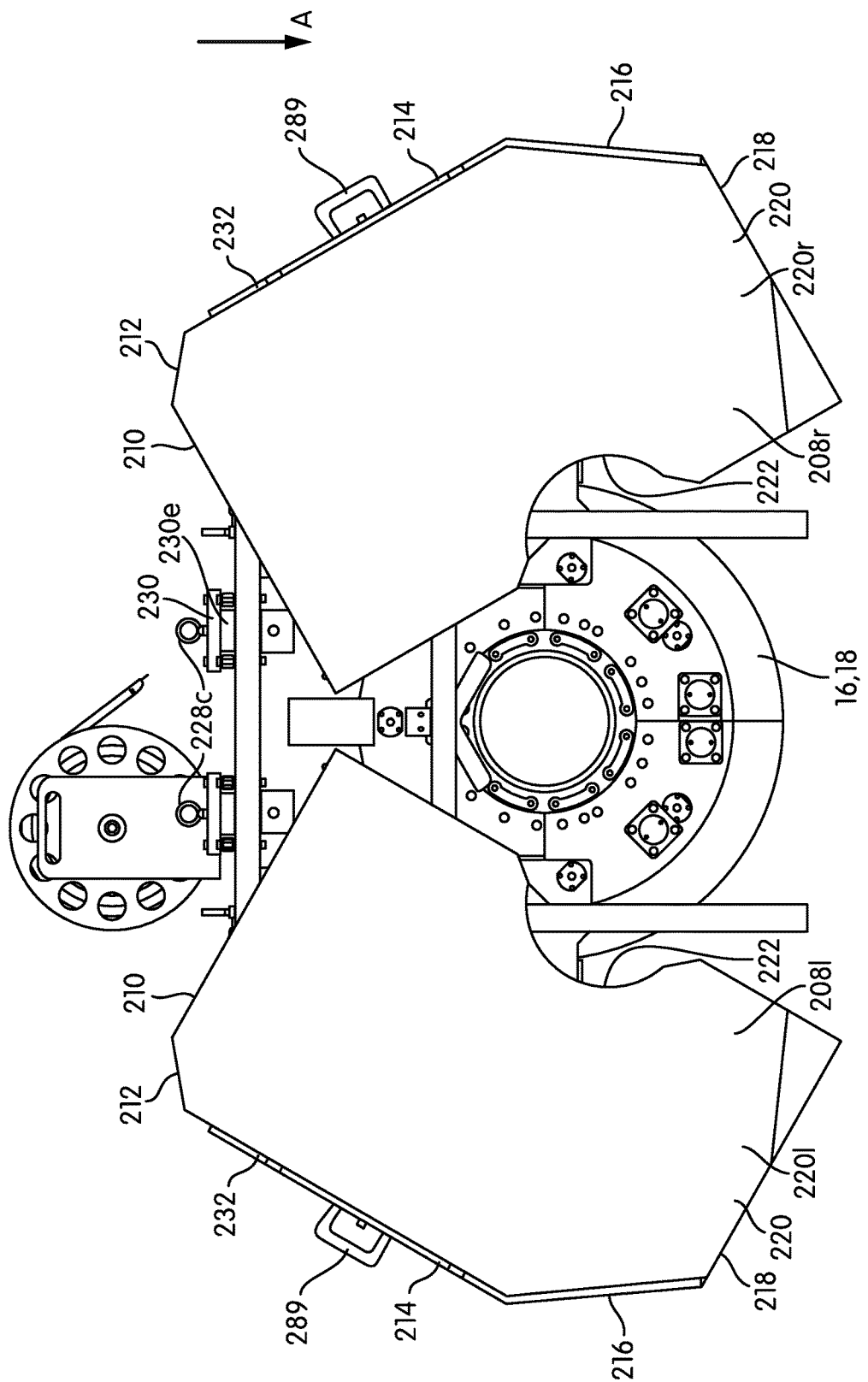
FIG. 38 shows a perspective view of the enclosure with its walls at least in a partially open position in accordance with an embodiment of the present patent application.
Figure 39:
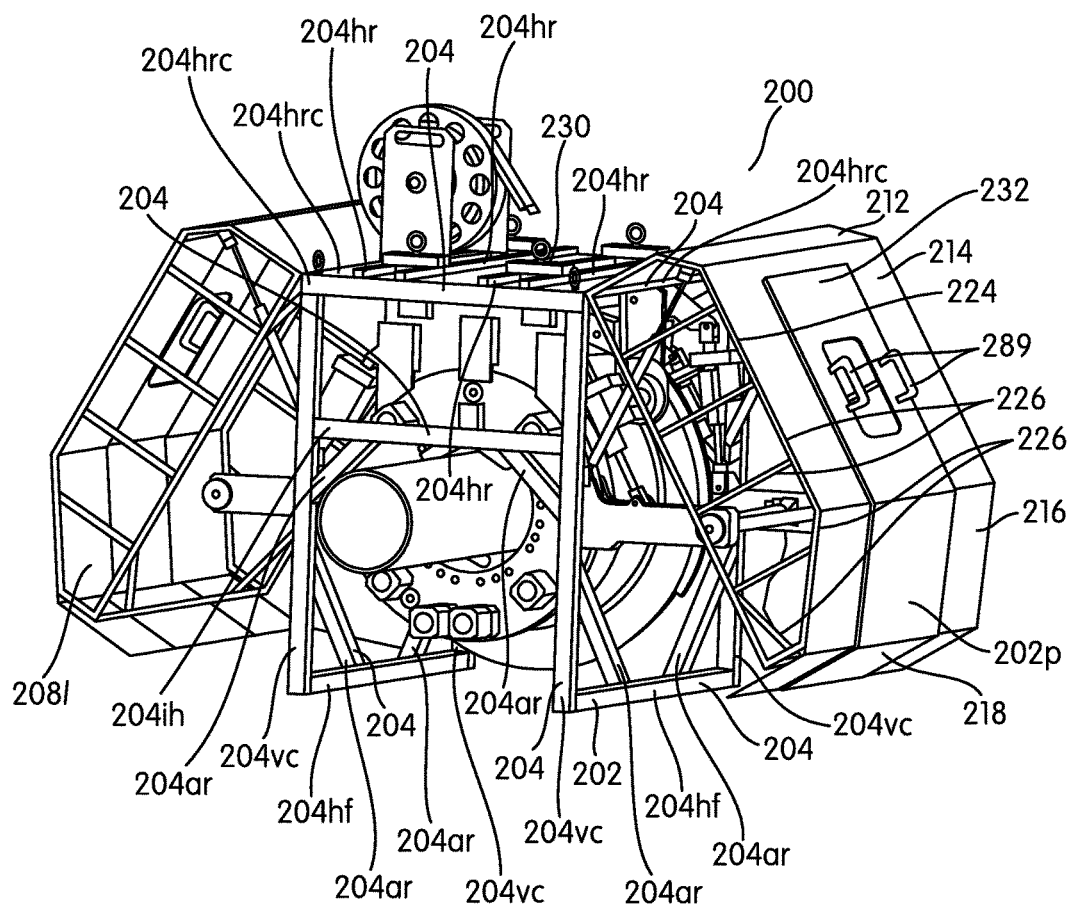
FIG. 39 shows a perspective view of the enclosure with its walls at least in the partially open position, wherein some of the components are removed to more clearly show the frame of the enclosure.

Referring to FIGS. 37-39, the system 10 for welding two pipes 12, 14 also includes an enclosure 200 is configured to enclose the weld torch 20 (as shown in FIGS. 21-27), the first and the second pipe clamps 16, 18 (as shown in FIGS. 21 and 24) and the interface region 38 between the pipes 12, 14. In one embodiment, the enclosure 200 is also configured to enclose the inspection detector 22. In one embodiment, the enclosure 200 is configured to protect the weld process from wind, dust, debris and precipitation.

In one embodiment, the enclosure 200 has a frame 202 that includes a plurality of frame members 204 that are connected to one another, for example, to form a framework. The framework generally provides the structural integrity and shape of the enclosure 200. In one embodiment, the frame 202 of the enclosure 200 is configured to support the system 10 when the system is not being lifted. In one embodiment, the enclosure 200 is constructed and sized to enclose weld torch 20 (as shown in FIGS. 21-27), the first and the second pipe clamps 16, 18 (as shown in FIGS. 21 and 24) and the interface region 38 between the pipes 12, 14 completely therein.

In one embodiment, referring to FIG. 39, the enclosure 200 includes horizontally oriented floor frame members 204*hf* and horizontally oriented roof corner frame members 204*hrc*. The frame members 204*hf* and 204*hrc* are connected to each other using vertically oriented corner frame members 204*vc*. On each side of the enclosure 200 (i.e., looking at the front of the enclosure 200 in FIG. 38), the frame members 204*hf*, 204*hrc*, and 204*vc* are all connected to each other to form a rectangular or square shaped side framework. In one embodiment, angularly oriented reinforcing frame members 204*ar* may connect to portions of the frame members 204*vc* and 204*hf* to further reinforce the side framework of the enclosure 200.

In one embodiment, the enclosure 200 also includes a rectangular or square shaped roof framework that is formed by four horizontally oriented roof corner frame members 204*hrc* connected to each other. In one embodiment, the roof framework of the enclosure 200 is further reinforced by horizontally oriented reinforcing frame members 204*hr*. Four horizontally oriented reinforcing frame members 204*hr* are shown in the illustrated embodiment of FIG. 39. In one embodiment, the enclosure 200 also includes a roof panel 206 (as shown in FIG. 37) that is connected to the four horizontally oriented roof corner frame members 204*hrc*. In one embodiment, the four horizontally oriented reinforcing frame members 204*hr* are connected to the four horizontally oriented roof corner frame members 204*hrc* and the roof panel 206 after the roof panel 206 is connected to the four horizontally oriented roof corner frame members 204*hrc*.

The horizontally oriented roof corner frame members 204*hrc* are connected to two corresponding vertically oriented corner frame members 204*vc* to form rectangular/square shaped front and rear frameworks of the enclosure 200. In one embodiment, horizontally oriented frame intermediate members 204*ih* are constructed and arranged to connect to the corresponding vertically oriented corner frame members 204*vc* to further reinforce the respective front and rear frameworks of the enclosure 200. In one embodiment, angularly oriented reinforcing frame members 204*ar* are constructed and arranged to connect to the corresponding vertically oriented corner frame members 204*vc* and the corresponding horizontally oriented frame members 204*ih* to further reinforce the respective front and rear frameworks of the enclosure 200.

In one embodiment, all the frame members 204 (including vertically, horizontally, or angularly oriented frame members) have the same cross-sectional shapes. In another embodiment, the frame members 204 may have different shaped cross sections. The number, the orientation and the positioning of the frame members 204 may vary in other embodiments.

In one embodiment, the enclosure 200 includes closure assemblies 208*l*, 208*r* that are hingedly connected to the frame 202. In one embodiment, the closure assemblies 208*l*, 208*r* are hingedly connected to the horizontally oriented roof corner frame members 204*hrc* of the frame 202. In one embodiment, each closure assemblies 208*l* or 208*r* is constructed and arranged to provide a top closure portion 210, side closure portions 212, 214, 216, a floor closure portion 218, and front and rear closure portions 220 (only the front closure portions are shown in the figures and the rear closure portions are mirror images of the front closure portions) of the enclosure 200.

In one embodiment, the closure assemblies 208*l*, 208*r* are configured to be moved between a closed position as shown in FIG. 37 and an open position as shown in FIGS. 38 and 39.

Each closure assemblies 208*l* or 208*r* is constructed and arranged to include a frame 224 with a plurality of the frame members 226. The plurality of the frame members 226 may include vertically, horizontally and angularly oriented frame members that are constructed and arranged to support the top closure portion 210, the side closure portions 212, 214, 216, the floor closure portion 218, and the front and rear closure portions 220. In one embodiment, the frame members 226 may have same shaped cross sections. In one embodiment, the frame members 226 may have different shaped cross sections. In one embodiment, the number, the orientation and the positioning of the frame members 226 may vary.

In one embodiment, front closure portions 220 (220*l* and 220*r*) of the closure assemblies 208*l*, 208*r* together form the front closure of the enclosure 200. Likewise, the rear closure portions of the closure assemblies together form the rear closure of the enclosure 200.

Each of the front closure portions 220 (220*l* and 220*r*) includes a half or semi-circular opening 222 which when the front closure portions 220 (220*l* and 220*r*) are together (i.e., when the closure assemblies 208*l*, 208*r* are moved to the closed position of FIG. 37) form a full opening (as shown in FIG. 37) to receive pipe therein. Similarly, each of the rear closure portions includes a half or semi-circular opening which when the rear closure portions are together (i.e., when the closure assemblies 208*l*, 208*r* are moved to the closed position of FIG. 37) form a full opening to receive pipe therein.

In one embodiment, the roof of the enclosure 220 includes a fixed roof portion formed by the horizontally oriented roof corner frame members 204*hrc* and the roof panel 206 and moveable roof portion. In one embodiment, the moveable roof portion includes top closure portions 210 of the closure assemblies 208*l* or 208*r*.

In one embodiment, the roof of the enclosure 220 may be constructed and arranged to hold all of the cables and hoses that are connected to the components of the first and the second pipe clamps 16, 18, the guide track member 88, the torch module 126, the inspection module (including inspection detector 22 and components configured to move the inspection detector 22 on the guide track member 88), the grinder module (including grinder 30 and components configured to move the inspection detector 22 on the guide track member 88), etc.

In one embodiment, the roof of the enclosure 200 may include a plurality of lifting points 228. For example, four corner lifting points 228 are positioned on and connected to the horizontally oriented roof corner frame members 204*hrc*. In one embodiment, four additional lifting points 228*c* are centrally positioned on the fixed roof portion (formed by the horizontally oriented roof corner frame members 204*hrc* and the roof panel 206) of the enclosure 200. In one embodiment, each centrally positioned lifting points 228*c* is connected to two of the horizontally oriented reinforcing frame members 204*hr* via a connector member 230.

In one embodiment, the enclosure 200 may be lifted by the lifting points 228 from place to place to provide a readily removable enclosure. In one embodiment, the enclosure 200 may be lifted and moved from one location to another using an overhead crane or similar lifting mechanism and by attaching cables to the lifting points 228. In one embodiment, the enclosure 200 can be hoisted to be placed on or removed from the pipe.

Figure 39A:
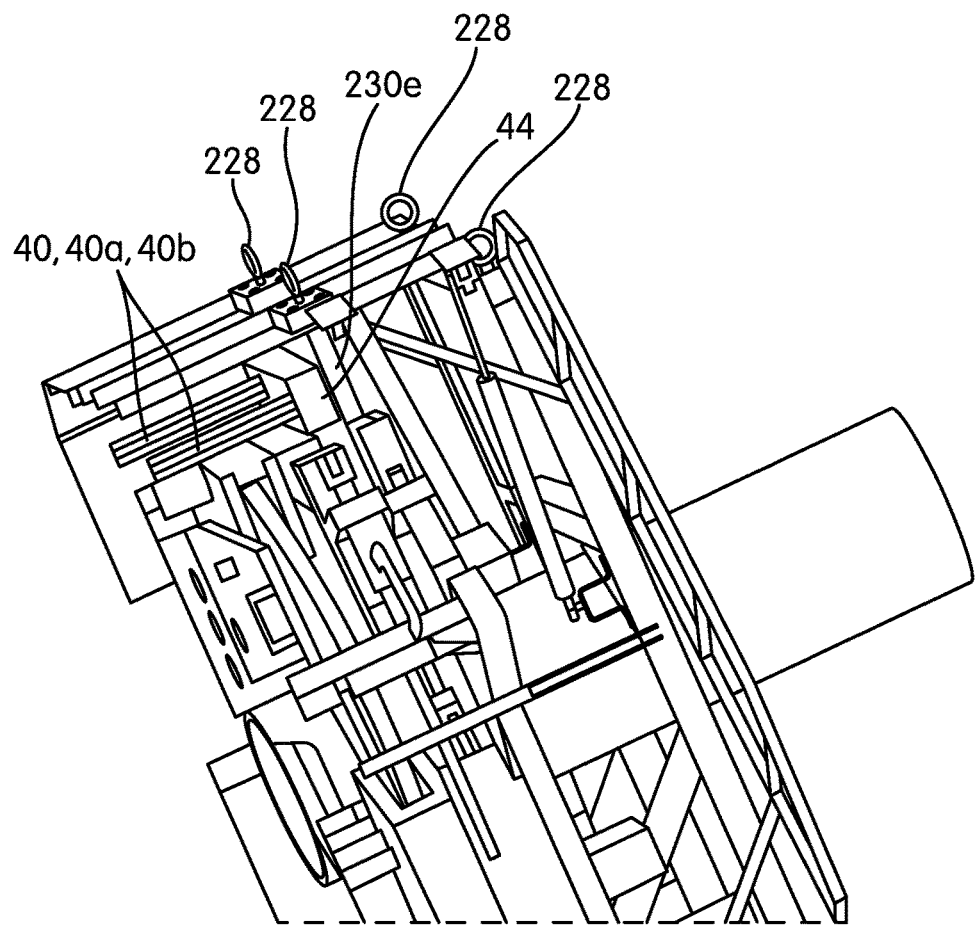
FIG. 39A shows a partial perspective view of the enclosure, wherein some of the components are removed to more clearly show other portions of the enclosure.

As shown in FIGS. 1 and 2, the top-fixed/non-pivoting portions 44 of the first clamp 16 and the second clamp 18 are connected to each other using the guide rods 40 (40*a*, 40*b*). In one embodiment, a portion of the enclosure 200 is constructed and arranged to be connected to the guide rod 40 (40*a*, 40*b*). For example, referring to FIGS. 38 and 39A, a portion 230*e* the connector portion 230 is constructed and arranged to extend downwardly (in the direction of an arrow A) to be connected to the guide rods 40 (40*a*, 40*b*). This configuration is configured to fixedly connect the enclosure 200 to the first clamp 16 and the second clamp 18.

That is, the frame 202 of the enclosure 200 is configured to be attached to the ends of the two non-pivoting guide rods 40 (40*a*, 40*b*). In one embodiment, when the first clamp 16 and the second clamp 18 are engaged around the pipes 12 and 14, the first clamp 16 and the second clamp 18 support the enclosure 200. When the first clamp 16 and the second clamp 18 are not around the pipes 12 and 14, the frame 202 of the enclosure 200 is configured to support the first clamp 16 and the second clamp 18.

In one embodiment, the enclosure 200 may include access doors 232 that are configured to be opened without releasing the enclosure 200 from the pipes 12 and 14. In one embodiment, each access door 232 is disposed on the side closure portion 214 of the closure assemblies 208*l* or 208*r*. In one embodiment, the door 232 may include a window 234 so that the inside of the enclosure 200 may be observed from the outside the system 10. In one embodiment, the door 232 is configured to be opened using handles 289 thereon to allow access for maintenance or inspection. In one embodiment, the enclosure 200 may include guide member at each end, where the guide member are configured to align the enclosure 200 with the pipes.

In one embodiment, the weld torch 20 is an orbital welder. In one embodiment, the orbital welder is configured to be rotated mechanically through 360° (or 180 degrees in double up weld procedure) around the stationary pipes 12 and 14 in a continuous process. In one embodiment, the present patent application provides an orbital welder 20 with an integrated enclosure 200. In one embodiment, the enclosure 200 includes a fixed internal structure or frame so that the enclosure 200 is configured be set on a surface (e.g., floor or ground) without the pipes 12, 14 positioned in the enclosure 200.

Figure 56:
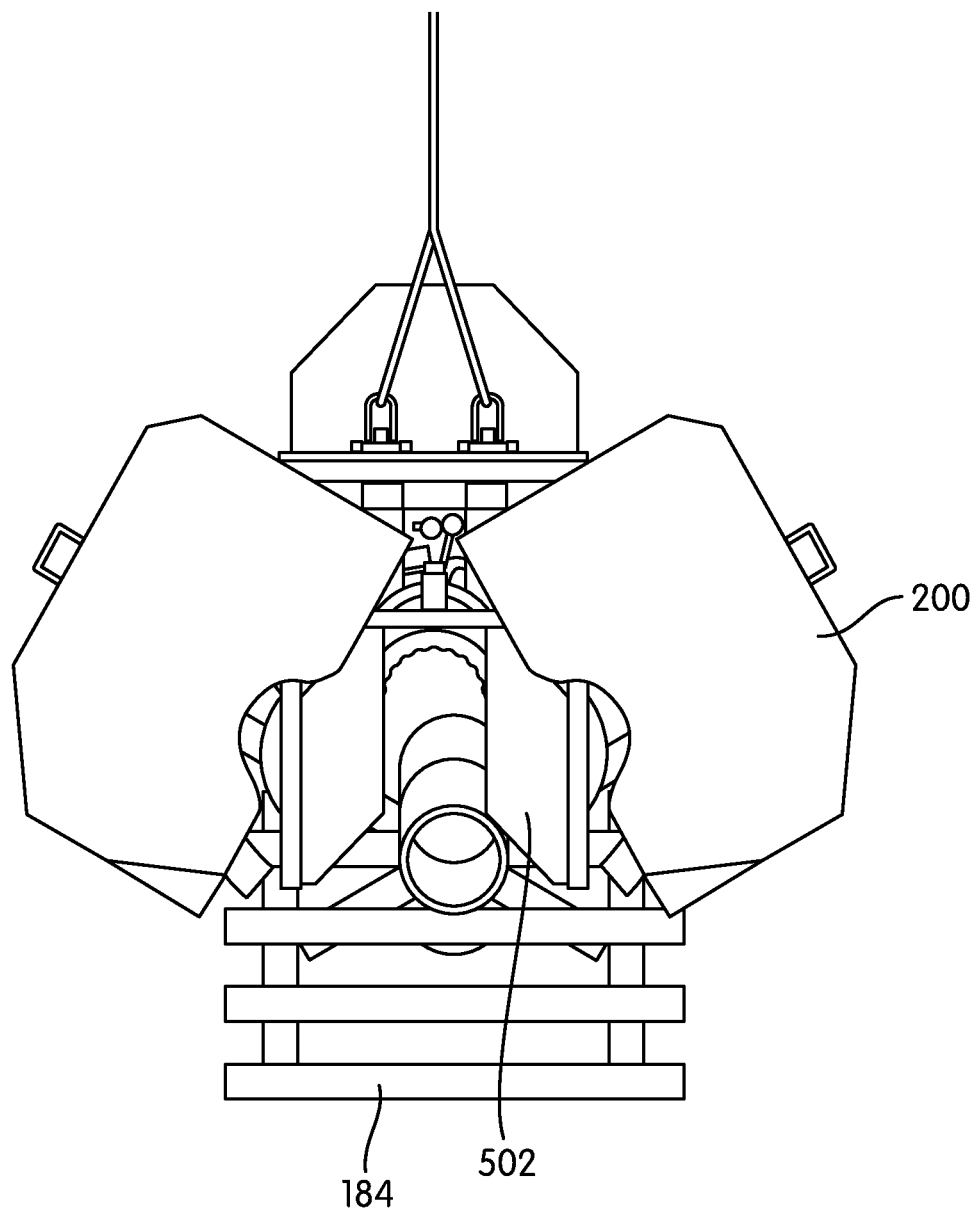
Figure 57:
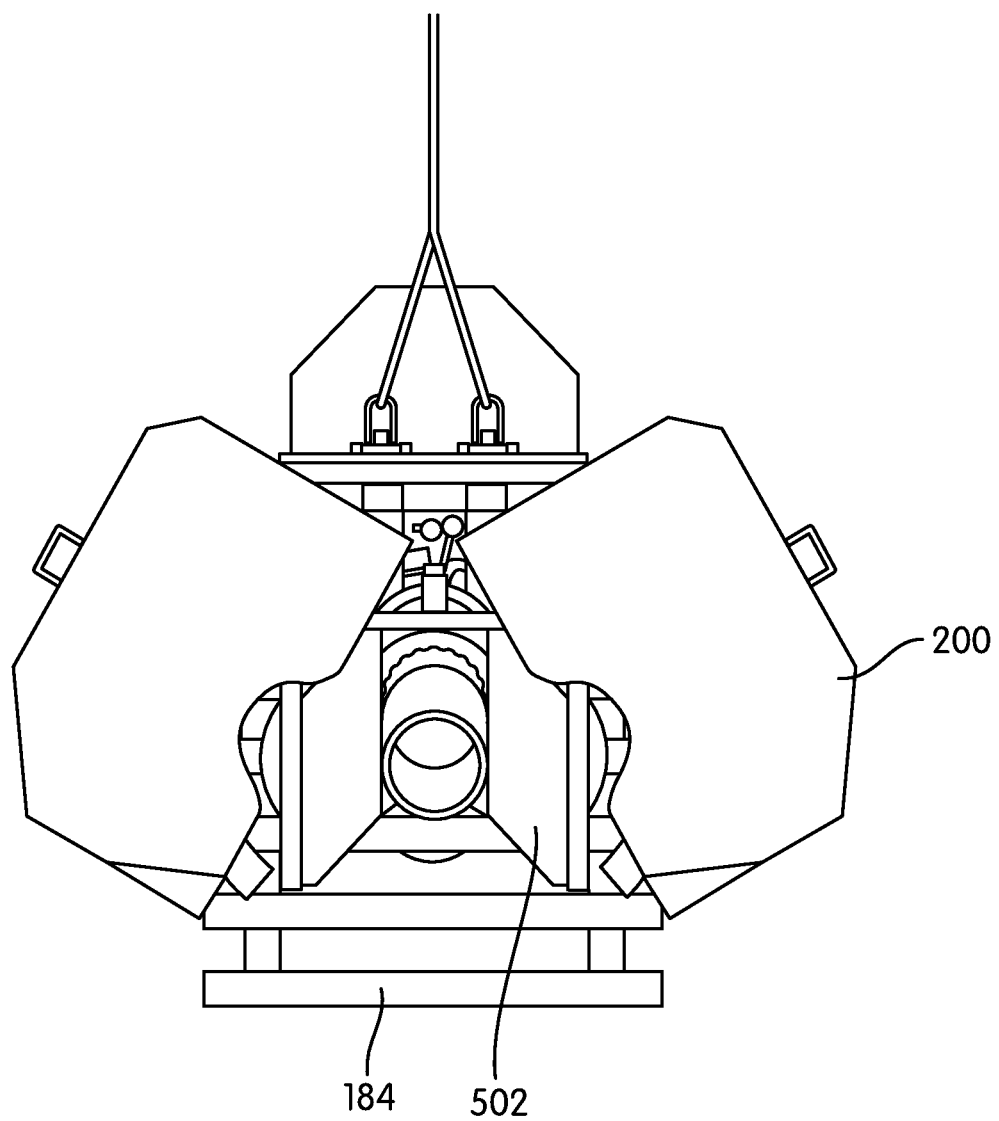
Figure 58:
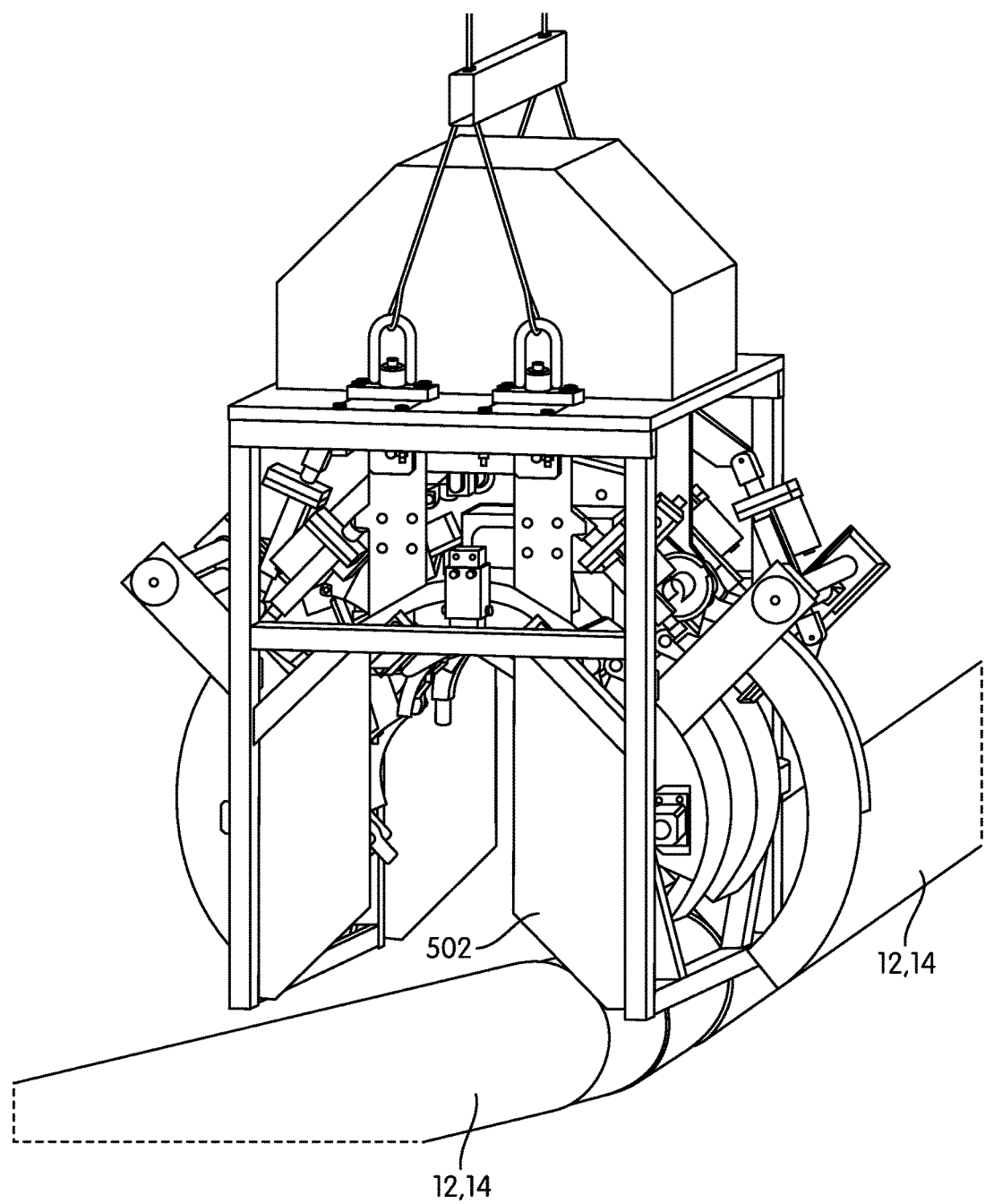
Figure 59:
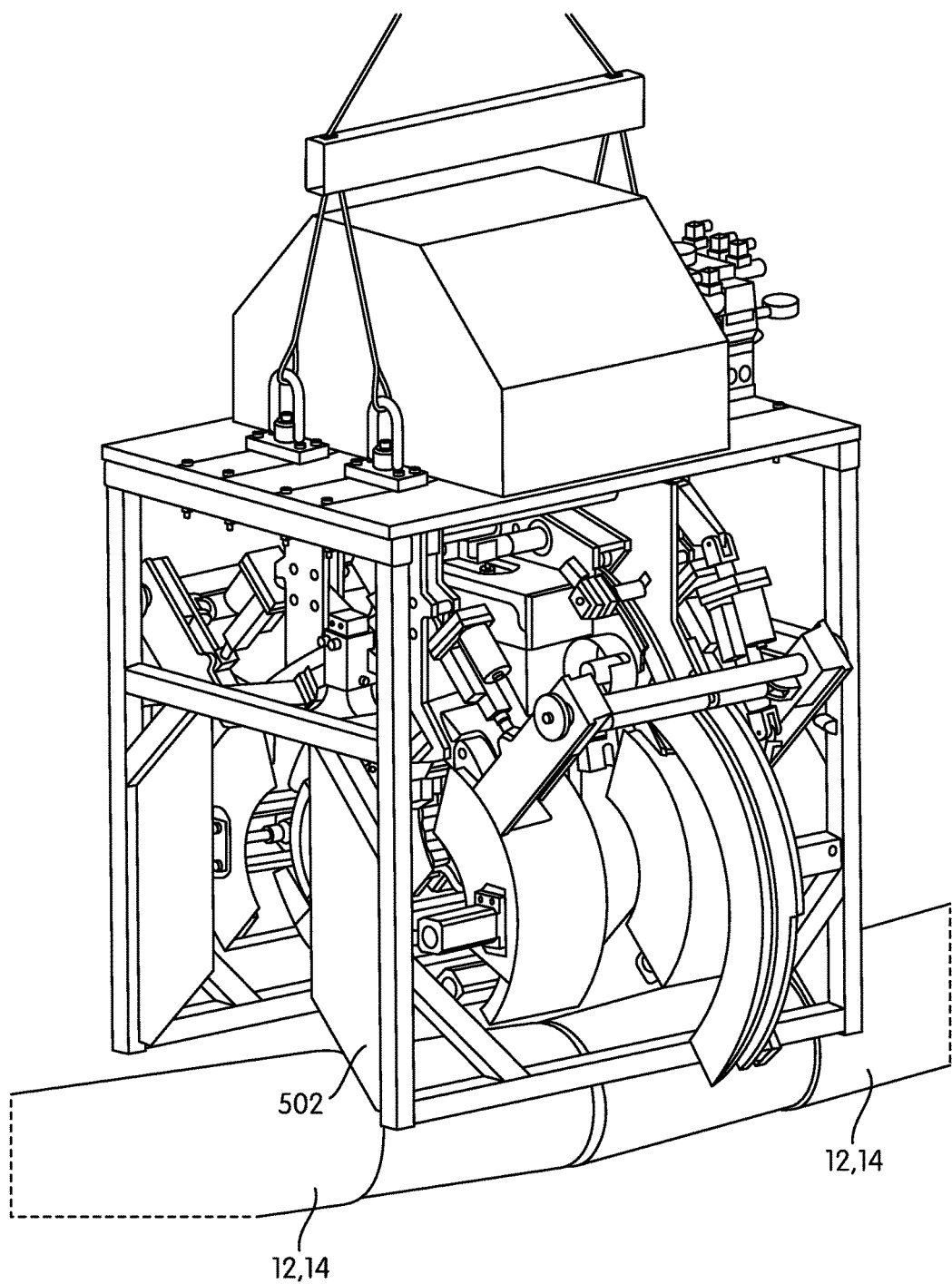

In one embodiment, as shown in FIGS. 55-59, ends of the enclosure 200 may have inverted-U shaped guides 502 to keep the system centered over the pipes 12, 14 when the enclosure 200 is being lowered of raised. Referring to FIGS. 55-59, the system of the present patent application also incorporates the guides 502 to assist with placing the enclosure 200 onto the pipes 12, 14. The guides 502 are incorporated into the frame members 204 of the enclosure 200 and are tapered on the bottom edge so that the guides 502 tend to push the pipes 12, 14 toward the center of the system as the system is being lowered onto the pipes 12, 14. Referring to FIG. 56, as the pipes 12, 14 near the center position, the guides 502 transition from angled to vertical. Referring to FIG. 57, once the pipes 12, 14 are centered, the vertical sides of the guides 502 keep it in place.

Figure 40:
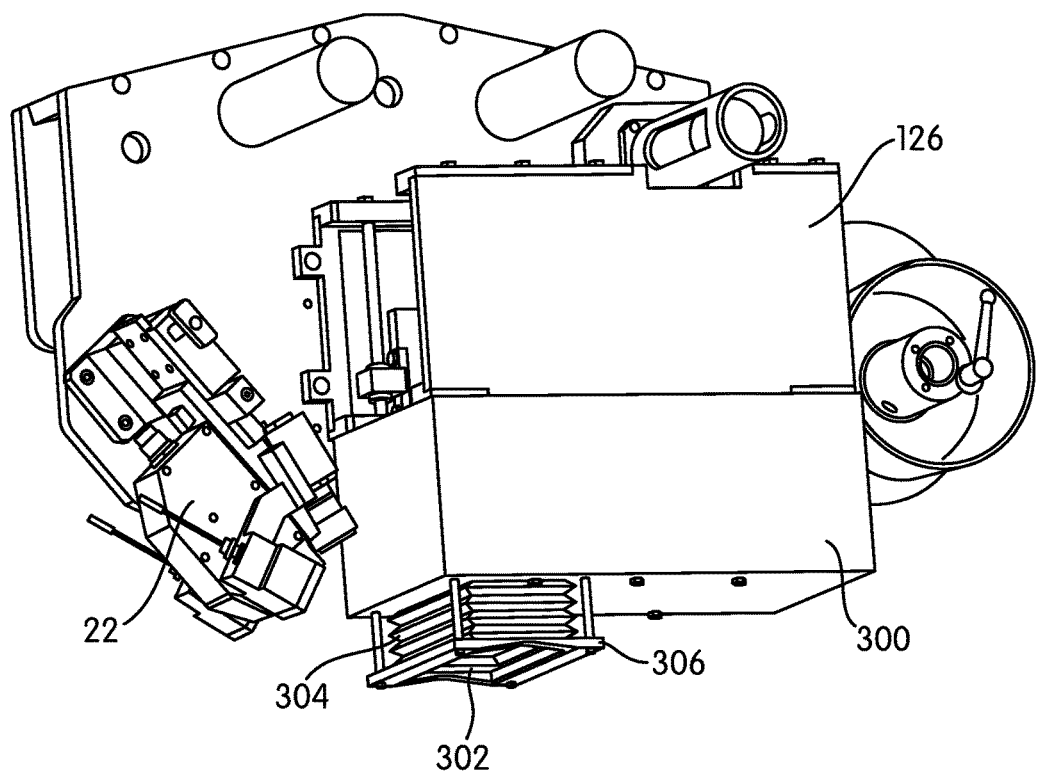
FIGS. 40 and 41 show a perspective view and a partial cross-sectional view of a weld enclosure that is configured to enclose the weld torch and the weld torch module in accordance with an embodiment of the present patent application.
Figure 41:
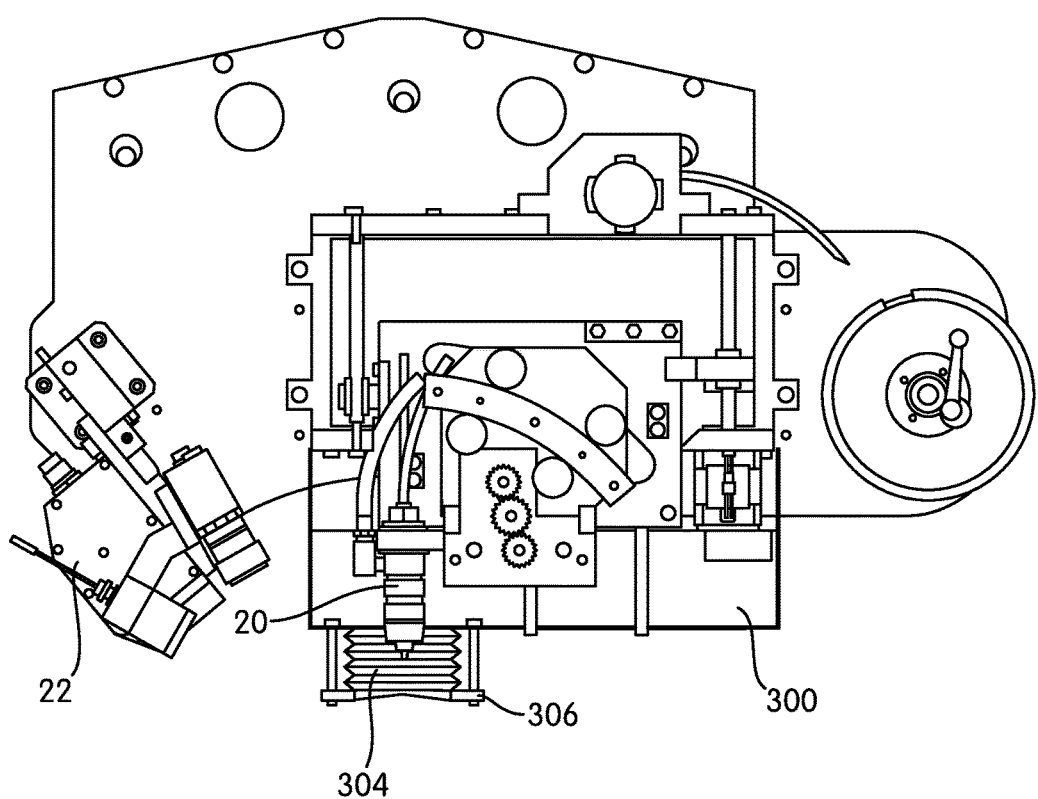

Referring to FIGS. 40 and 41, in one embodiment, the system 10 may include a local or weld enclosure 300 that is configured to be placed around just the weld torch 20. In one embodiment, the system 10 may also include the weld torch module enclosure 300 that is configured to be placed around the weld torch module 126.

In one embodiment, the weld torch module enclosure 300 may be formed from a sheet metal material. In one embodiment, the weld torch module enclosure 300 may have an opening 302 for the weld torch 20. In one embodiment, the opening 302 may be surrounded by a flexible member 304 that is configured to compress and extend based on the depth of the weld. For example, the flexible member 304 may include bellows.

In one embodiment, the bellows 304 are constructed and arranged to extend beyond the weld torch 20 when the system 10 is not welding. As the torch 20 is moved toward the pipe 12, 14, support 306 of the bellows 304 is configured to make contact with the pipe 12, 14 and stop moving. As the weld torch 20 continues to move, the bellows 304 are configured to compress until the weld torch 20 reaches the correct distance from the pipe 12, 14 for welding. In one embodiment, the support 306 of the bellows 304 may have a roller to keep it from sliding on the pipe 12, 14. In one embodiment, the support 306 of the bellows 304 may a flexible skirt to close small gaps between the support 306 of the bellows 304 and the pipe 12, 14.

In one embodiment, both enclosures 200 and 300 may be used at the same time. In another embodiment, only enclosure 200 is used. In yet another embodiment, only enclosure 300 is used. In another embodiment, if the welding is being performed in a building or there is some other form of environmental protection, the system may be configured to operate without any of the integrated enclosures 200 and 300.

Figure 50:
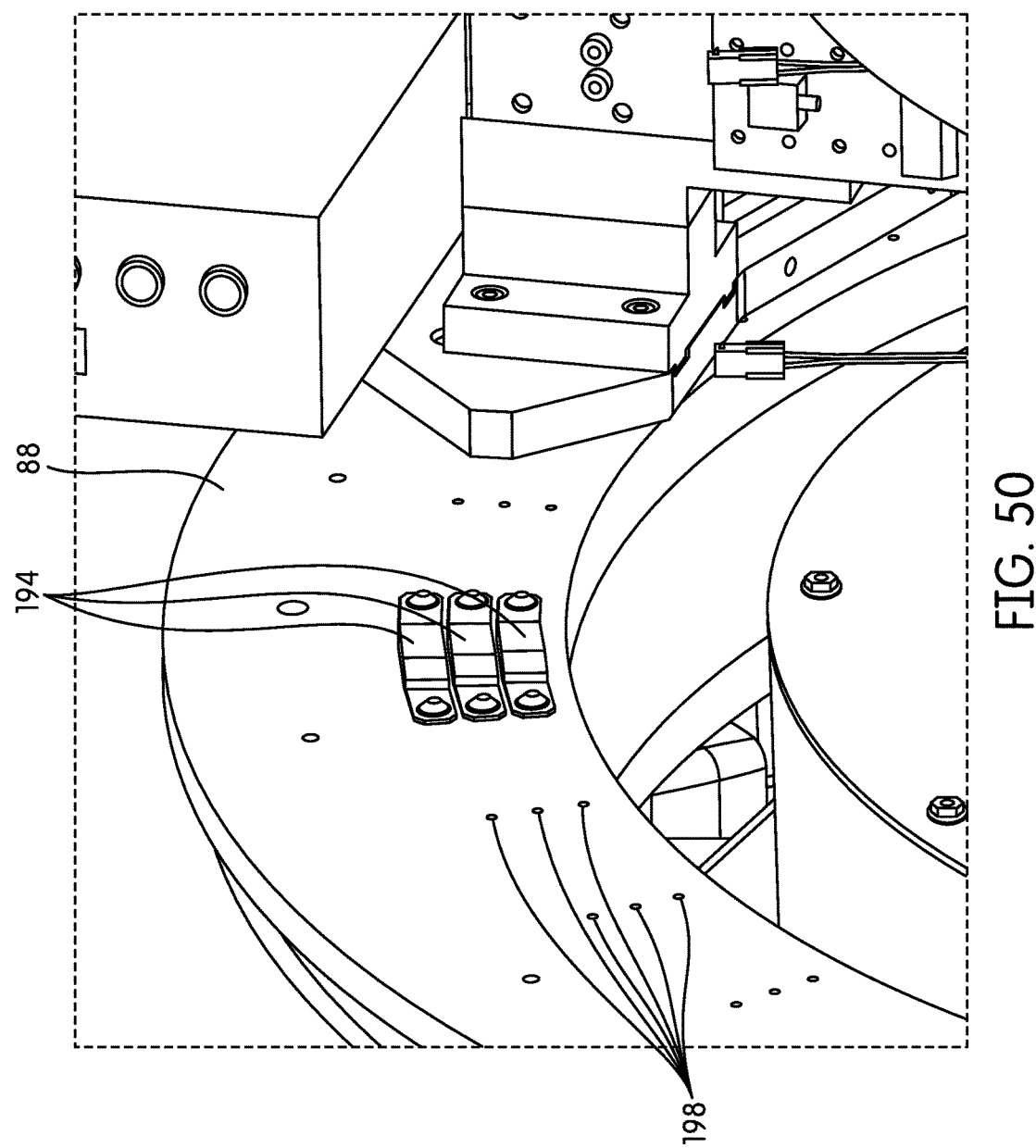
FIG. 50 shows switch triggers being mounted on the guide track channel in accordance with an embodiment of the present patent application.
Figure 51:
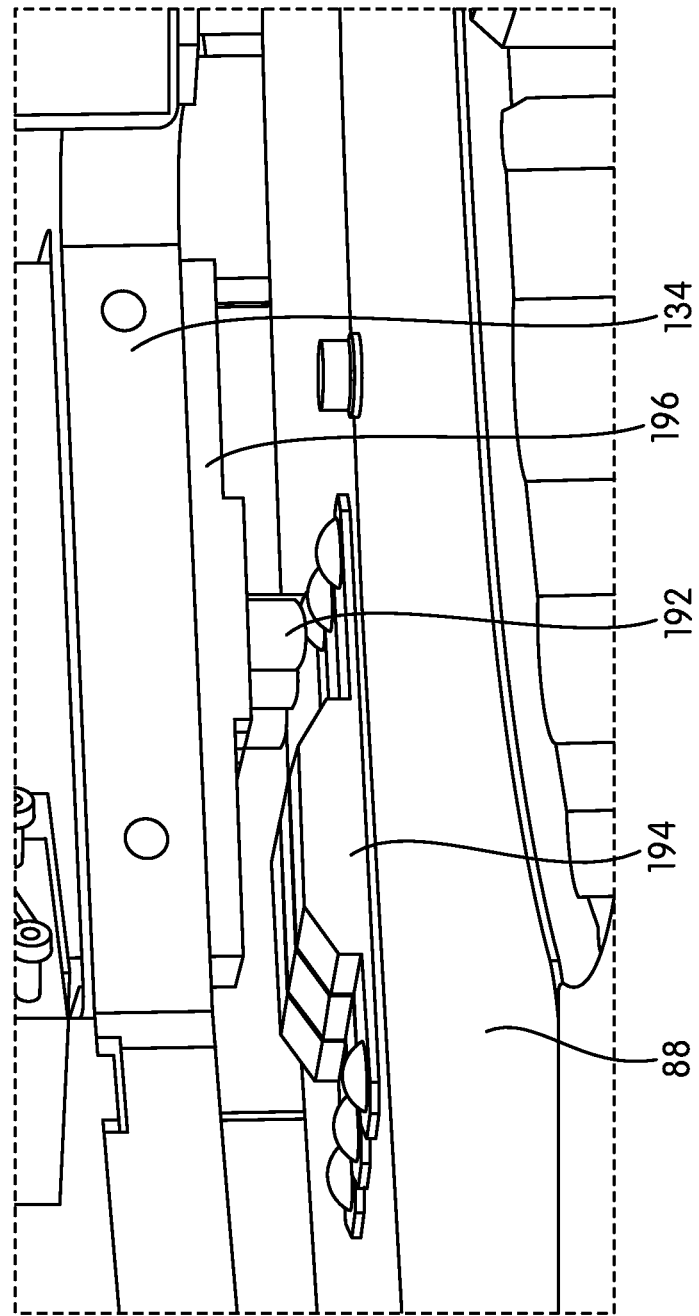
Figure 52:
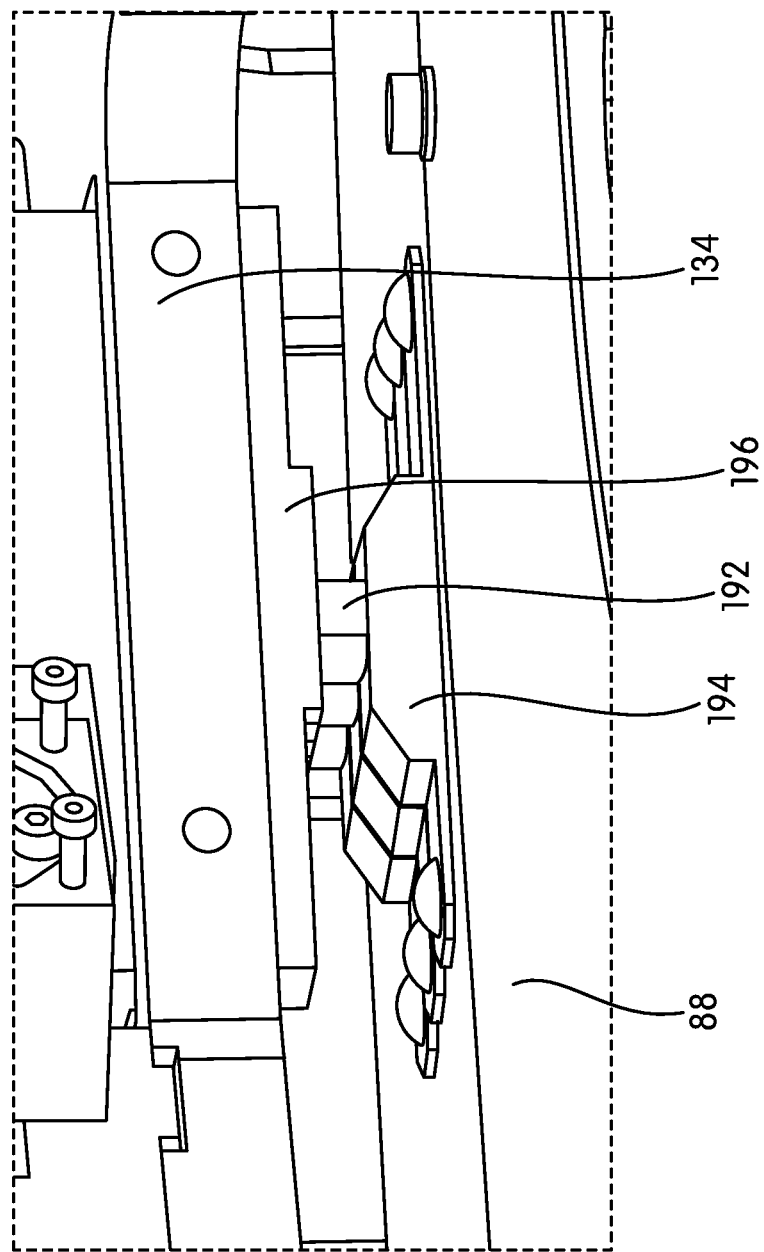

In one embodiment, the torch module includes a limit switch 192. In one embodiment, a provision for mounting triggers 194 to the U-shaped guide track channel 88 has been included in the system. This configuration provides a redundant method for ensuring the weld torch is at a safe position before the guide track 88 is either opened or closed. Referring to FIGS. 50-52, the carriage 134 may have a limit switch body 196 mounted thereon with one or more switches 192 installed on the limit switch body 196. The guide track 88 has rings of regularly spaced holes 198 so that one or more triggers 194 may be mounted in any position on the guide track 88. The triggers 194 are configured to activate one or more of the limit switches 192 when the carriage 134 is in a position that places the limit switch body 196 in proximity to the triggers 194. In this way, the triggers 194 are configured to indicate when the carriage 134 is in certain positions as will be appreciated by one skilled in the art. The triggers 194 are configured to be used singularly or in combination to define positions such as home, top, bottom, side, weld start, weld end, safe, or any other position as may be desired.

Figure 42:
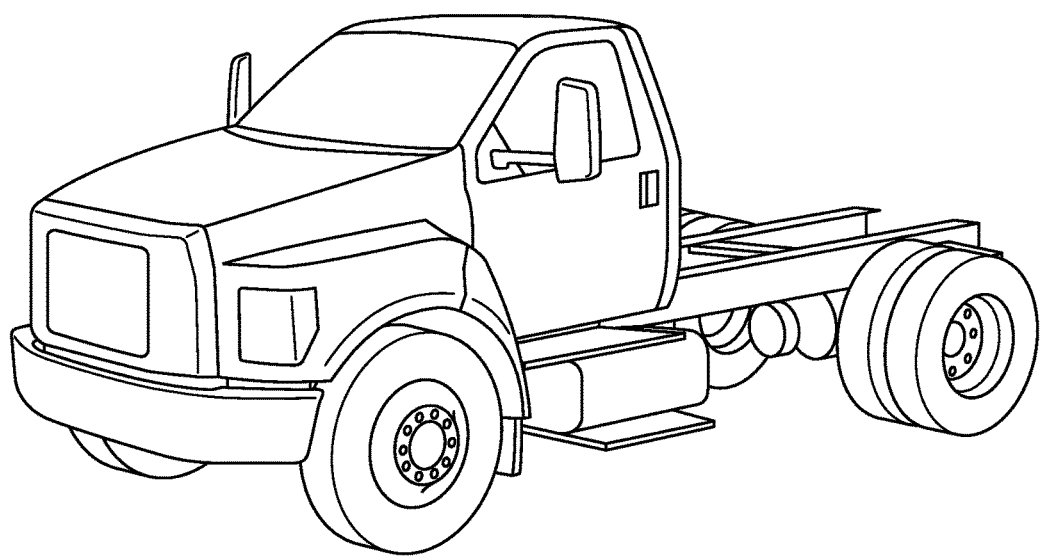
FIGS. 42-45 show various deployment systems that are used to deploy the system in accordance with an embodiment of the present patent application.
Figure 43:
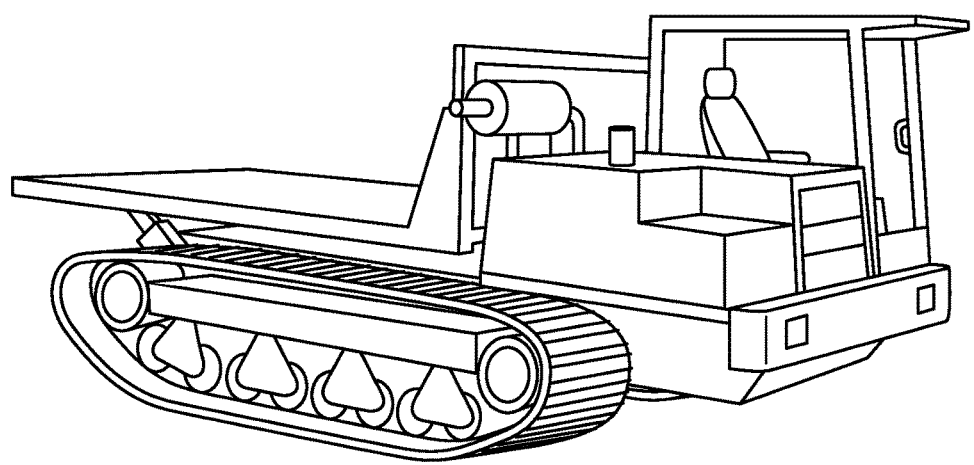
Figure 44:
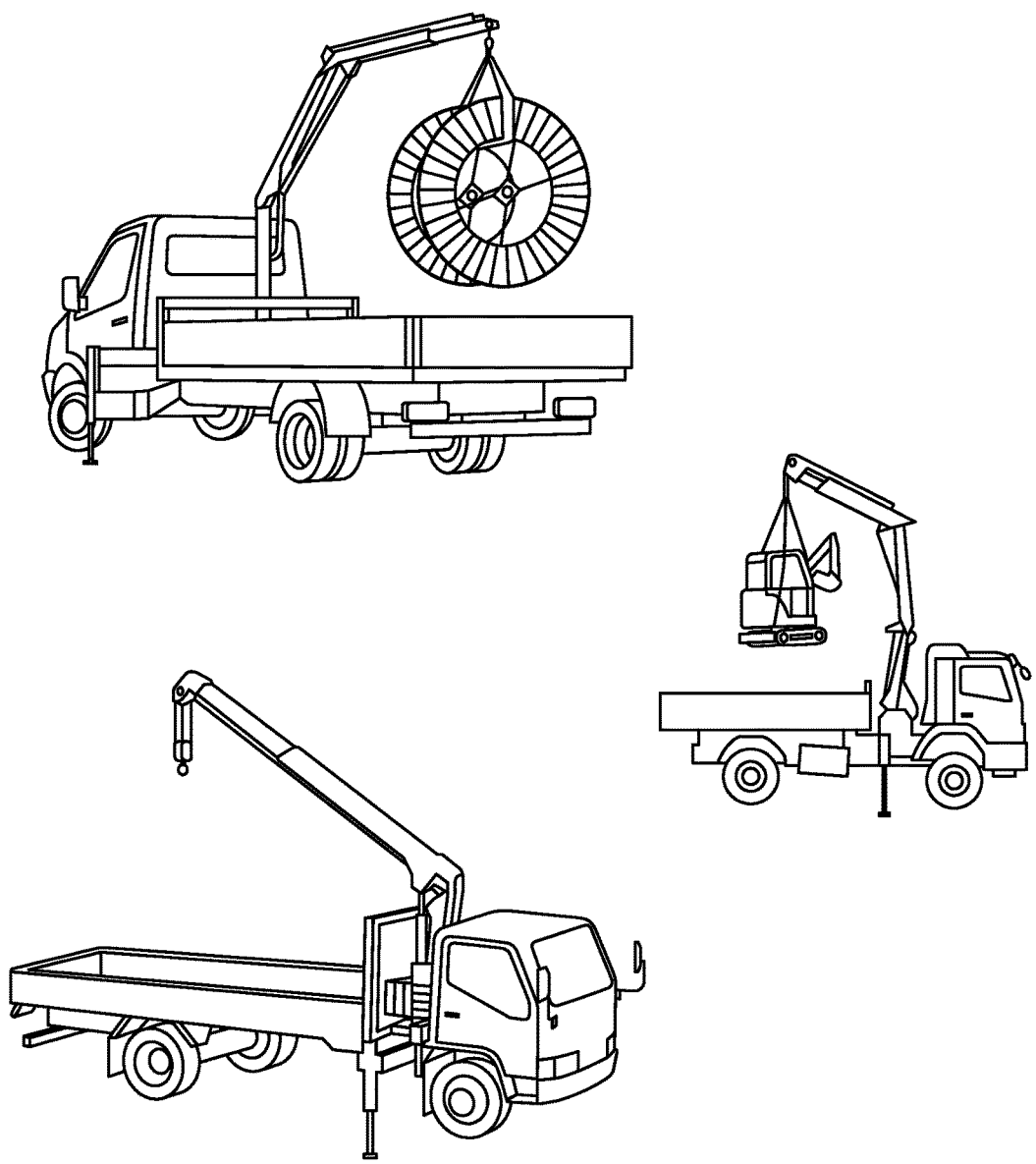
Figure 45:
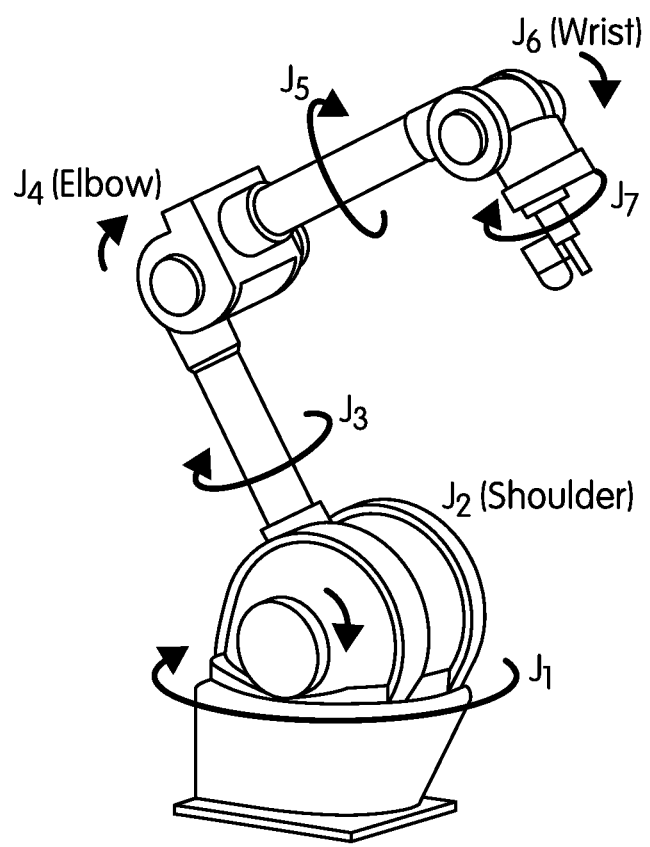

In one embodiment, a deployment system may be used to deploy the system 10. Small versions of the system 10 may be carried by a heavy duty pickup like the ones used as wreckers (as shown in FIG. 42). Large versions of the system 10 may be carried by a tracked vehicle (as shown in FIG. 43). In one embodiment, the system 10 may be installed in a fixed location such as at a spool base or on an off-shore pipe laying vessel. In such an embodiment, the system 10 stays in one place, and the pipeline moves past it. In another embodiment, the system 10 may be lifted by a small crane (as shown in FIG. 44). In yet another embodiment, the system 10 may be lifted by a multi-axis robotic positioner (as shown in FIG. 45).

In one embodiment, the system 10 may be configured to detect the location of the pipe using a visual camera, ultrasonic distance sensors, a laser camera, or any combination. In one embodiment, the system 10 is configured to allow fast travel speeds when there is a large distance to the pipe (greater than one foot) and limit travel to a slow speed when there is a small distance to the pipe (less than one foot). In one embodiment, the sensors may be mounted to the enclosure, clamps, guide track, lifting device, and/or transport vehicle. In one embodiment, the sensing devices may be remotely deployed, detect the location of target points on the system 10 and the pipe, and communicate the measurements to the deployment system wirelessly or by wire.

In one embodiment, the weld joint/bead may be inspected. In one embodiment, after each weld pass is complete, the inspection detector or laser 22 used to guide the weld torch 20 can be used to measure the outside profile of the completed weld. In one embodiment, after each weld pass is complete, the inspection camera or 2D camera 182 can be used to inspect the outside profile of the completed weld. In one embodiment, the inspection camera or 2D 182 may be co-mounted with the inspection detector or laser 22.

In one embodiment, after the final weld pass is complete, an eddy current transducer and receiver are configured to inspect or measure the quality of the weld. In one embodiment, the eddy current system configured to be mounted on any of the travelling modules (e.g., welding or grinding modules). In one embodiment, the eddy current system is configured to be mounted at a location where the inspection detector or laser of the travelling modules (e.g., welding or grinding modules) is generally positioned. In another embodiment, the eddy current system is configured to be mounted at a location next to the inspection detector or laser of the travelling modules (e.g., welding or grinding modules).

In one embodiment, the system 10 includes the inspection detector (laser and/or camera) for inspection of the weld. In another embodiment, the system 10 includes the eddy current system for inspection of the weld. In yet another embodiment, the system 10 includes both the eddy current system and the inspection detector (laser and/or camera) for inspection of the weld.

Surface flaws may be generally detected if the flaws are on the same side where the inspection is performed and the surface flaws cannot be detected if the flaws are on the opposite side of the inspection. For example, external inspection of the pipe cannot detect internal defect unless the pipe thickness is small (e.g., less than about ⅛") or unless the pipe is made of a non-ferromagnetic material. Non-ferromagnetic materials include Stainless steel (e.g., the 300 series) and other CRA materials.

In one embodiment, the eddy current system and the inspection detector (laser and/or camera) are used together as complementary inspection techniques. For example, in one embodiment, the eddy current system is configured to detect or inspect features of the weld joint that are not readily detected or inspected by the inspection detector or laser. For example, the inspection detector (laser and/or camera) are configured to inspect the shape of the weld, whereas the eddy current system is configured to inspect the weld flaws/defects including, but not limited to, copper flaw/defect, burn through flaw/defect, misfire (including LCP/IWM misfire or Pore/IWM misfire) flaw/defect, internal lack of fusion (or nonfusion) flaw/defect, cluster porosity flaw/defect, Copper/CP flaw/defect, etc., In one embodiment, after welding is complete, the system 10 is configured to inspect the weld using an ultrasonic device. In one embodiment, after welding is complete, the system 10 is configured to inspect the weld using an x-ray device.

In one embodiment, two pipe clamps of the system 10 are configured to be able to transfer a pipe aligning load from one pipe to another pipe through a connection between the pipe clamps. Otherwise, only one clamp may be used to support all of the equipment (e.g., track and various modules). In one embodiment, after the first one or two weld passes, the second, moveable clamp 18 is not needed. The alignment of the two pipes 12, 14 does not change and the weld joint is strong enough to support its own weight. In one embodiment, at this time, the system 10 with two clamps 16, 18 is moved to start the next joint. In one embodiment, a simpler system with only one clamp may be used to finish the weld at the existing joint. This one clamp system has better access to the weld and fewer space constraints on the tools that operate on the weld. Since this one clamp system applies the final weld pass, the one clamp system includes inspection tools mounted thereon to inspect the final weld created by the final weld pass procedure.

In one embodiment, as discussed above, the system 10 uses the two clamp arrangement at least during the pipe holding procedure (including pipe alignment and pipe shaping procedures) and during the first one or two weld passes. Thereafter, the alignment of the two pipes 12, 14 does not change. At this time, only one clamp may be used to finish the weld at the existing joint.

In one embodiment, the system 10 is configured to inspect the formed weld bead or joint using the inspection detector. That is, the one or more processors are configured to interact with the inspection detector 22 and/or inspection camera 182 to determine the profile of the interface region and/or the weld joint subsequent to a welding procedure to obtain a post-weld data. In one embodiment, the one or more processors are configured to cause, based on the post-weld profile data, grinding procedure to be performed (by the grinder) on the formed weld joint.

In one embodiment, the one or more processors are configured to interact with the inspection detector 22 and/or inspection camera 182 to determine the profile of the interface region and/or the weld joint subsequent to the grinding procedure to obtain a post-grind data. The post-grind data may be analyzed either manually or by one or more processors to ensure that excess weldment from the surfaces of the weld joint were removed during the grinding procedure and/or defects are ground away from the weld joint. In one embodiment, the one or more processors are configured to cause, based on the post-grind profile data, reweld procedure or another weld procedure to be performed on the affected region (after the grinding procedure).

In one embodiment, the one or more processors are configured to control the grinder to grind away the weld defects based on results from inspection detector. In one embodiment, the one or more processors are then configured to control the weld torch to reweld the affected area based on results from the inspection detector.

In another embodiment, the one or more processors are configured to control the grinder to grind away the weld defects based on instructions transmitted from a remote system to the one or more processors based on the inspection detector results transmitted from the system to the remote system. In one embodiment, the one or more processors are then configured to control the weld torch to reweld the affected area based on instructions transmitted from the remote system to the one or more processors based on the inspection detector results transmitted from the system to the remote system.

In one embodiment, the one or more processors are configured to cause, based on the post-weld profile data, another weld procedure to be performed on the interface region between the pipes (before the grinding procedure).

In one embodiment, the grinder may be a 60V brushless grinder. In one embodiment, the grinder may be a 60V battery operated grinder. In one embodiment, a 120V brushless grinder. In one embodiment, a 120V battery operated grinder. In one embodiment, the battery may be a lithium ion battery.

In one embodiment, the guide track member 88 may be positioned around and in-line with the interface region 38 between the pipes 12, 14 and/or the weld joint 36.

In one embodiment, the guide track member 88 may be configured to be positioned between the two clamps 16 and 18. In one embodiment, the weld torch 20 is configured to be mounted on the guide track member 88 between the two clamps 16 and 18 such that the weld torch 20 is positioned in-line with the interface region between the pipes 12, 14 and/or the weld joint 36.

In one embodiment, the one or more processors are configured to control the grinder to wait a predetermined period of time after the welding procedure is complete at a location and before the grinding procedure can begin at that location.

In another embodiment, the grinder 30 and the weld torch are positioned sufficiently spaced apart from each other on the guide track member to allow for the cooling of the weld bead/joint created by the weld torch at a location before the grinding procedure is performed at that location by the grinder. In one embodiment, the positioning between the weld torch and the grinder is controlled by the one or more processors.

In one embodiment, there is no additional wait time (i.e., predetermined period of time) needed beyond the time it takes for the weld torch to move out of the current position so the grinder can move and perform the grinding at that position. In one embodiment, the grinding procedure is started 10 seconds after the start of the weld procedure.

In one embodiment, the grinder 30 is radially positioned based on a predetermined (grinder to weld) pressure. In one embodiment, the one or more processors may be configured to sense the pressure. In another embodiment, the one or more processors may be configured to determine the pressure/force by relative positioning of the telescoping grinder parts/components and a spring constant. In one embodiment, one or more processors may determine a (grinder to weld) force/pressure load based on the weld joint inspection. In another embodiment, the grinder axial pressure is constant/standard.

In one embodiment, the one or more processors are configured to obtain information from tilt sensors, motor encoders, and/or limit switches. In one embodiment, the one or more processors, based on this information, are configured to determine the locations of all the traveling modules (including the weld torch module, the inspection module, and the grinder module) on the guide track member at any given time.

In one embodiment, when the clamps and/or the guide track member are being moved to their respective open positions, the one or more processors are configured to control one or more of the traveling modules (including the weld torch module, the inspection module, and the grinder module) such that the traveling modules are positioned away from the pivoting portions and/or the hinges of the clamps and/or the guide track member.

In one embodiment, the system 10 may include a grinder debris control system. For example, in one embodiment, the grinder debris control system may include a shroud that is configured to enclose the grinder so as to contain the dust and debris generated during the grinding procedure. In one embodiment, the shroud may include a vacuum port so that a vacuum system may be used to suction the dust and debris out of the shroud. In one embodiment, the grinder debris control system may include a vacuum system. In one embodiment, the vacuum system is configured to be contained entirely on the grinder module.

In one embodiment, the weld torch module of the present patent application may include a plurality of weld torches. For example, in one embodiment, the weld torch module may include two or dual weld torches that are configured to deposit two passes simultaneously.

In one embodiment, the grinding procedure may be performed by a grinder positioned within the pipes. That is, the grinding procedure may be performed by an internal grinder positioned within the pipes while the welding is performed from outside the pipes. In one embodiment, the grinder may be supported by grinder holders positioned within the pipes.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A system for welding two pipes, comprising:
    a weld system comprising:
        a first pipe clamp configured to engage the exterior surface of a first pipe to enable the first pipe clamp to be fixed relative to the first pipe;
        a second pipe clamp configured to engage the exterior surface of a second pipe to enable the second pipe clamp to be fixed relative to the second pipe;
        a weld torch configured to create a weld joint between the pipes at an interface region between the pipes, wherein the weld joint comprises weld material fixedly connecting the pipes;
        an inspection detector configured to emit an inspection beam of radiation;
        a motor operatively associated with the inspection detector to direct the inspection beam of radiation along the weld joint between the pipes;
        one or more processors operatively associated with the inspection detector and configured to cause the inspection detector to scan the weld joint including the weld material between the first pipe and the second pipe that are engaged with the first pipe clamp and the second pipe clamp, respectively, to determine a profile of the weld joint between the pipes; and
    a grinder system physically coupled to the weld system and comprising a grinder configured to grind at least a portion of the weld joint between the pipes based on the determined profile of the weld joint between the pipes,
    wherein the weld torch is configured to be mounted on a guide track member, and wherein the guide track member is disposed around the first pipe clamp or the second pipe clamp such that the weld torch is positioned between the first pipe clamp and the second pipe clamp and is positioned in-line with the interface region between the pipes, and
    wherein the guide track member is positioned between the first pipe clamp and the second pipe clamp.

2. A system for welding two pipes, comprising:
    a pipe clamp assembly, comprising a first pipe clamp and a second pipe clamp;
        the first pipe clamp configured to engage the exterior surface of a first pipe to enable the first pipe clamp to be fixed relative to the first pipe, and
        the second pipe clamp configured to engage the exterior surface of a second pipe to enable the second pipe clamp to be fixed relative to the second pipe;
    a weld torch operably connected to the pipe clamp assembly and configured to create a weld joint between the pipes at an interface region between the pipes; and
    an enclosure operably connected to the pipe clamp assembly and configured to enclose the first and the second pipe clamps, the weld torch and the interface region between the pipes,
    wherein the enclosure includes a top wall and peripherally surrounding side walls extending from the top wall, the top wall and the peripherally surrounding side walls defining an interior space to enclose the first and the second pipe clamps, the weld torch and the interface region between the pipes.

3. The system of claim 2, wherein the first pipe clamp includes a first non-pivoting portion and the second pipe clamp includes a second non-pivoting portion, and wherein the first non-pivoting portion and the second non-pivoting portion are constructed and arranged to be connected to each other using a guide member.

4. The system of claim 2, wherein the enclosure includes a frame, and wherein a portion of the frame is constructed and arranged to be connected to the guide member.

5. The system of claim 4, wherein the enclosure further comprises closure assemblies that are hingedly connected to the frame, wherein each closure assembly includes an access door.

6. A system for welding two pipes, comprising:
    a first pipe clamp configured to engage the exterior surface of a first pipe to enable the first pipe clamp to be fixed relative to the first pipe;
    a second pipe clamp configured to engage the exterior surface of a second pipe to enable the second pipe clamp to be fixed relative to the second pipe;
    wherein the first pipe clamp and the second pipe clamp are configured to hold the first pipe and the second pipe in a fixed position relative to one another in an end to end relationship, forming an interface region between the pipes ready for welding,
    a weld torch configured to create a weld joint between the pipes at the interface region between the pipes;
    an inspection detector configured to emit an inspection beam of radiation; and
    one or more processors operatively associated with the inspection detector and configured to cause the inspection detector to scan the interface region between the pipes subsequent to the first pipe clamp and the second pipe clamp engaging with the first pipe and second pipe, respectively, to determine a profile of the interface region between the pipes,
    wherein the one or more processors are configured to control a position and an orientation of the weld torch to create the weld joint between the pipes based on the determined profile of the interface region between the pipes wherein the one or more processors are configured to cause the inspection detector to scan the interface region between the pipes to determine the profile of the interface region between the pipes prior to, during and/or subsequent to a weld operation, to generate pre-weld profile data, on-the-fly weld profile data, and/or post-weld profile data based on the scanned data, and to control the position and the orientation of the weld torch based on the generated pre-weld profile data, on-the-fly weld profile data, or post-weld profile data.

7. The system of claim 2, wherein the enclosure, including the top wall, a front wall, a back wall, a left side wall, and a rear side wall, peripherally surrounds the weld torch on all sides of the weld torch.

8. The system of claim 7, wherein the enclosure does not include a bottom wall.

9. The system of claim 2, wherein the enclosure includes a bottom wall.

10. The system of claim 6, wherein the one or more processors are configured to cause the inspection detector to scan the interface region between the pipes to determine the profile of the interface region between the pipes prior to the weld operation, to generate pre-weld profile data based on the scanned data, and to control the position and the orientation of the weld torch based on the generated pre-weld profile data.

11. The system of claim 6, wherein the one or more processors are configured to cause the inspection detector to scan the interface region between the pipes to determine the profile of the interface region between the pipes during the weld operation, to generate on-the-fly weld profile data based on the scanned data, and to control the position and the orientation of the weld torch based on the generated on-the-fly weld profile data.

12. The system of claim 6, wherein the one or more processors are configured to cause the inspection detector to scan the interface region between the pipes to determine the profile of the interface region between the pipes subsequent to the weld operation, to generate post-weld profile data based on the scanned data, and to control the position and the orientation of the weld torch based on the generated post-weld profile data.

13. The system of claim 6, wherein the one or more processors are configured to cause the inspection detector to scan the interface region between the pipes to determine the profile of the interface region between the pipes prior to, during and subsequent to a weld operation, to generate pre-weld profile data, on-the-fly weld profile data, and post-weld profile data based on the scanned data, and to control the position and the orientation of the weld torch based on the generated pre-weld profile data, on-the-fly weld profile data, or post-weld profile data.

* * * * *